(12) United States Patent  
Sommerville et al.

(10) Patent No.: US 7,921,888 B2
(45) Date of Patent: Apr. 12, 2011

(54) ROUTER TABLE

(75) Inventors: Thomas Sommerville, Port Perry (CA); Sean Hill, Towson, MD (US); Anthony Smith, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 318 days.

(21) Appl. No.: 12/027,109

(22) Filed: Feb. 6, 2008

(65) Prior Publication Data

US 2008/0210337 A1 Sep. 4, 2008

Related U.S. Application Data

(60) Provisional application No. 60/899,943, filed on Feb. 7, 2007, provisional application No. 60/934,208, filed on Jun. 12, 2007.

(51) Int. Cl.
B25H 1/00 (2006.01)

(52) U.S. Cl. .................. 144/253.1; 144/286.5

(58) Field of Classification Search ............... 144/253.1, 144/253.5, 253.6, 253.9, 285, 286.1, 286.5, 144/287; 83/438, 440.2, 469, 471, 471.2; 108/54.1, 149

See application file for complete search history.

(56) References Cited

U.S. PATENT DOCUMENTS

| 436,145 | A |   | 9/1890  | McBean  |          |
|---------|---|---|---------|---------|----------|
| 727,337 | A |   | 5/1903  | Forster |          |
| 1,664,969 | A |  | 4/1928  | Conover |          |
| 2,744,549 | A | * | 5/1956  | Johnson | 83/438   |
| 2,764,190 | A | * | 9/1956  | Howard  | 83/438   |
| 2,799,305 | A |   | 7/1957  | Groehn  |          |
| 2,805,479 | A | * | 9/1957  | Droste  | 33/444   |
| 3,250,141 | A |   | 5/1966  | Luenberger |        |
| 3,538,968 | A |   | 11/1970 | Gluck   |          |
| 3,734,151 | A | * | 5/1973  | Skripsky | 144/286.5 |
| 4,335,765 | A | * | 6/1982  | Murphy  | 144/286.1 |
| 4,516,612 | A | * | 5/1985  | Wiley   | 144/1.1  |

(Continued)

FOREIGN PATENT DOCUMENTS

DE 20219977 U1 4/2003

(Continued)

OTHER PUBLICATIONS

International Search Report and Written Opinion for International Application Serial No. PCT/US2008/053218, mailed Aug. 27, 2008, 22 pgs.

(Continued)

*Primary Examiner* — Shelley Self
(74) *Attorney, Agent, or Firm* — Brake Hughes Bellermann LLP

(57) ABSTRACT

Various example embodiments are disclosed. According to one example embodiment, a router table may comprise a table top, a mounting can, a sleeve, and an adjustment mechanism. The table top may have an aperture and a plurality of support members; the support members may be configured to support the table top. The mounting can may be attachable to the table top in a vicinity of the aperture. The sleeve may be engaged to the mounting can, and may be configured to receive a router and to position a router bit of the router along an axis extending through the aperture. The adjustment mechanism may be configured to move the sleeve within the mounting can and relative to the table top to thereby move the router along the axis and position the router bit at one of a plurality of positions relative to the table top.

19 Claims, 59 Drawing Sheets

U.S. PATENT DOCUMENTS

| | | | |
|---|---|---|---|
| 4,521,006 A * | 6/1985 | Waters | 269/304 |
| 4,537,234 A | 8/1985 | Onsrud | |
| 4,693,288 A | 9/1987 | Buechele et al. | |
| 4,719,951 A | 1/1988 | Woltanski | |
| 4,738,571 A | 4/1988 | Olsen et al. | |
| 5,016,693 A | 5/1991 | Haffely et al. | |
| 5,224,531 A | 7/1993 | Blohm | |
| 5,282,408 A | 2/1994 | Shiotani et al. | |
| 5,289,861 A | 3/1994 | Hendrick | |
| 5,398,740 A | 3/1995 | Miller | |
| 5,425,405 A | 6/1995 | Brodsky, Sr. | |
| 5,553,644 A | 9/1996 | Adams | |
| 5,725,038 A | 3/1998 | Tucker et al. | |
| 5,765,273 A | 6/1998 | Mora et al. | |
| 5,768,966 A | 6/1998 | Duginske | |
| 5,779,407 A | 7/1998 | Tucker et al. | |
| 5,823,239 A | 10/1998 | Smith | |
| 5,855,366 A | 1/1999 | Chang | |
| 5,890,524 A | 4/1999 | Tucker et al. | |
| 5,954,106 A * | 9/1999 | Huang | 144/286.5 |
| 5,967,717 A | 10/1999 | Tucker et al. | |
| 6,053,587 A | 4/2000 | Boerder | |
| 6,305,447 B1 | 10/2001 | Rousseau | |
| 6,305,449 B1 | 10/2001 | Stover | |
| 6,357,328 B1 | 3/2002 | Ceroll et al. | |
| 6,382,276 B1 | 5/2002 | Daniels | |
| 6,398,469 B1 | 6/2002 | Bain | |
| 6,505,659 B1 | 1/2003 | Hummel | |
| 6,520,224 B2 | 2/2003 | Smith | |
| 6,520,225 B1 | 2/2003 | Dembicks | |
| 6,523,447 B2 | 2/2003 | Judge | |
| 6,550,154 B1 | 4/2003 | Smith | |
| 6,557,601 B1 | 5/2003 | Taylor | |
| 6,647,847 B2 * | 11/2003 | Hewitt et al. | 83/446 |
| 6,688,350 B2 | 2/2004 | Heinlen et al. | |
| 6,739,066 B2 | 5/2004 | Smith | |
| 6,786,122 B2 * | 9/2004 | Svetlik | 83/468 |
| 6,792,984 B2 | 9/2004 | Fontaine | |
| RE38,612 E | 10/2004 | Tucker et al. | |
| 6,851,345 B1 * | 2/2005 | Kennelly et al. | 83/438 |
| 6,880,442 B2 | 4/2005 | Duginske | |
| 6,884,010 B1 | 4/2005 | Hosier et al. | |
| 6,901,680 B2 | 6/2005 | Locaputo | |
| 6,948,892 B2 | 9/2005 | Hummel | |
| 6,994,006 B2 * | 2/2006 | Ceroll et al. | 83/438 |
| 7,165,763 B2 | 1/2007 | Yonezawa et al. | |
| 7,263,922 B2 * | 9/2007 | Hewitt et al. | 83/438 |
| 7,392,830 B2 * | 7/2008 | Lei et al. | 144/253.8 |
| 2002/0050201 A1* | 5/2002 | Lane et al. | 83/477.2 |
| 2005/0115639 A1 | 6/2005 | Bagnall | |
| 2006/0086425 A1 | 4/2006 | Hyde | |
| 2006/0144470 A1 | 7/2006 | Fontaine | |
| 2009/0050235 A1 | 2/2009 | Sommerville et al. | |

FOREIGN PATENT DOCUMENTS

| | | |
|---|---|---|
| WO | 2008/098080 A2 | 8/2008 |
| WO | 2008/098080 A3 | 8/2008 |

OTHER PUBLICATIONS

Johnson, Roland "Fine wood Working Tools & Shops", Fine Woodworking Tools & Shops Annual Issue (Winter 2005/2006), 2 pgs.

Dun & Bradstreet Business Information Report: Bench Dog Inc, (Sep. 12, 2005), 4 pgs.

Dun & Bradstreet International Business Information Report: Jessem Products Limited, (Jan. 26, 2006), 5 pgs.

Warner, Patrick, "Routers for Router Tables: choose a fixed-base model over a plunge router", Fine Woodworking Magazine, Issue 142, (May/Jun. 2000), 5 pgs.

Books by Pat Warner, (2006), 2 pgs.

Johnstone, Rob "Uplifting News on the Router Front", Woodworkers Journal eZine Issue 2.18, www.woodworking.com, (Oct. 23, 2001), 2 pgs.

"Freud 3-1/4 HP Electronic Variable Speed Plunge Router FT2000EP Review at Epinions.com", (Online) www.epinions.com, (retrieved Jan. 26, 2006), 4 pgs.

"Milwaukee Fixed-Base Production Router", (Online) www.mytoolstore.com/milwauke/5625-20.html, (retrieved Jan. 27, 2006), 3 pgs.

Klenck, Thomas "Router Roundup; we test seven fixed-base routers for performance, features and handling", (Online) www.popularmechanics.com; PM Comparison Test: 7 Fixed-Base Routers, (Dec. 16, 2003), 4 pgs.

"Router Mania: Routers, Router Tables and Router Bits", (Online) www.routermania.com/index_cfm?sid=AF092, (retrieved Feb. 1, 2006) 2 pgs.

Rout-R-Lift, "No more searching under your router table to adjust the height of your router!", (Online) www.woodworktools.com, (retrieved Feb. 1, 2006), 4 pgs.

"Router Raizer RZ-100 Router Depth Adjustment System", (Online) http://www.simplyknives.com/Router-Raizer-RZ-100-Router-Depth-Adjustment-System.html, (retrieved Feb. 1, 2006), 4 pgs.

"The Router Table: Woodworking", (Online) http://patwarner.com/router_table. html, (2005) 5 pgs.

Hintz, Tom "Tool Review: Bosch #RA1165 Under-Table Router Base: A Welcome Answer to a Common Problem", (Online) www.newwoodworker.com/review/bsch1165ryu.html, (retrieved Feb. 1, 2006), 3 pgs.

"Tools that make a difference: Rout-R-Lift", (Online) www.jessem.com/rout_r_lift.html, (retrieved Feb. 3, 2006), 3 pgs.

International Preliminary Report on Patentability for Application No. PCT/US2008/053218, mailed Aug. 20, 2009, 9 Pages.

Non-Final Office Action for U.S. Appl. No. 12/027,114, mailed Apr. 29, 2010, 27 pages.

* cited by examiner

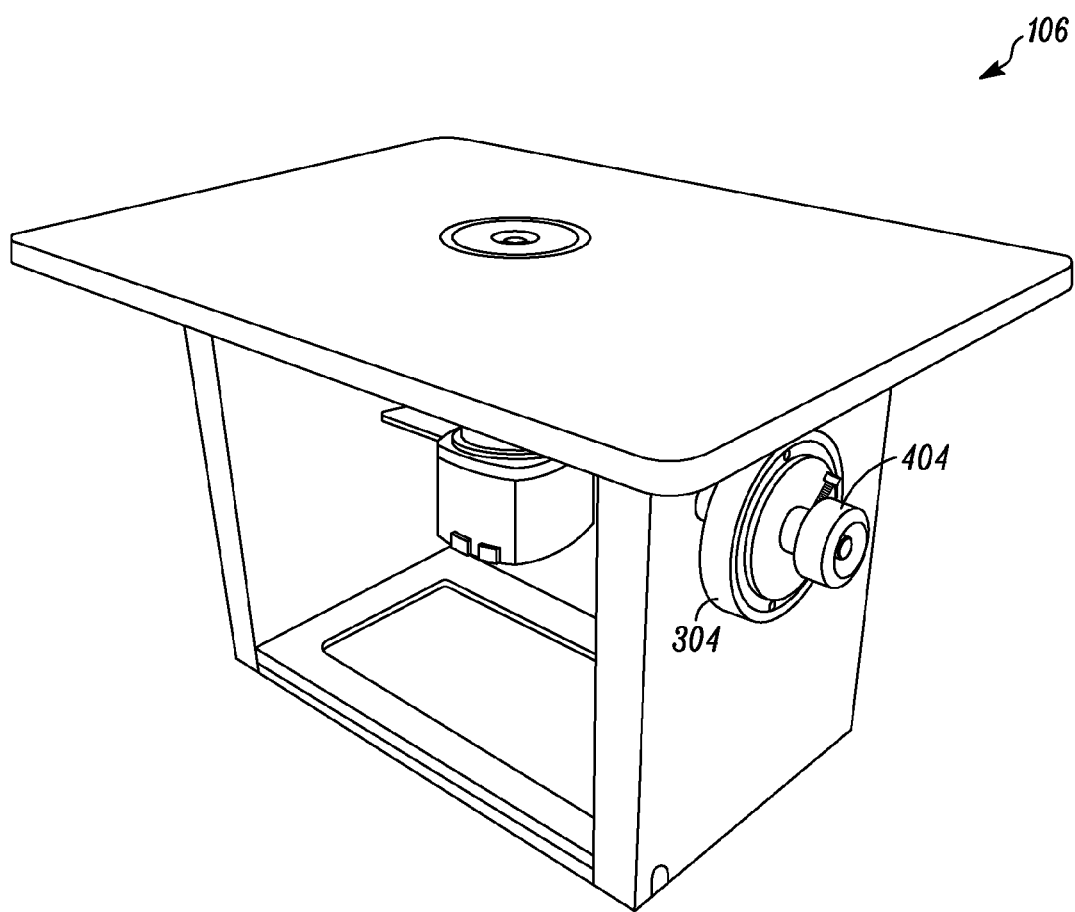
FIG. 4.1

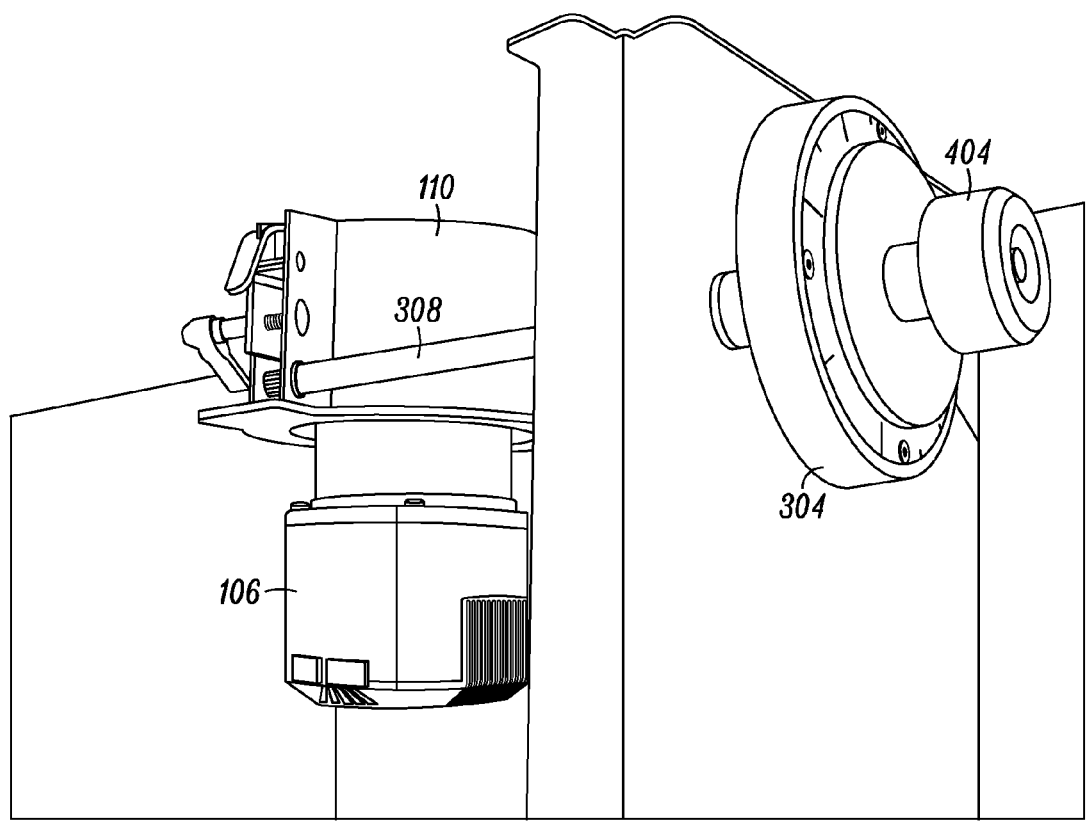
FIG. 4.2

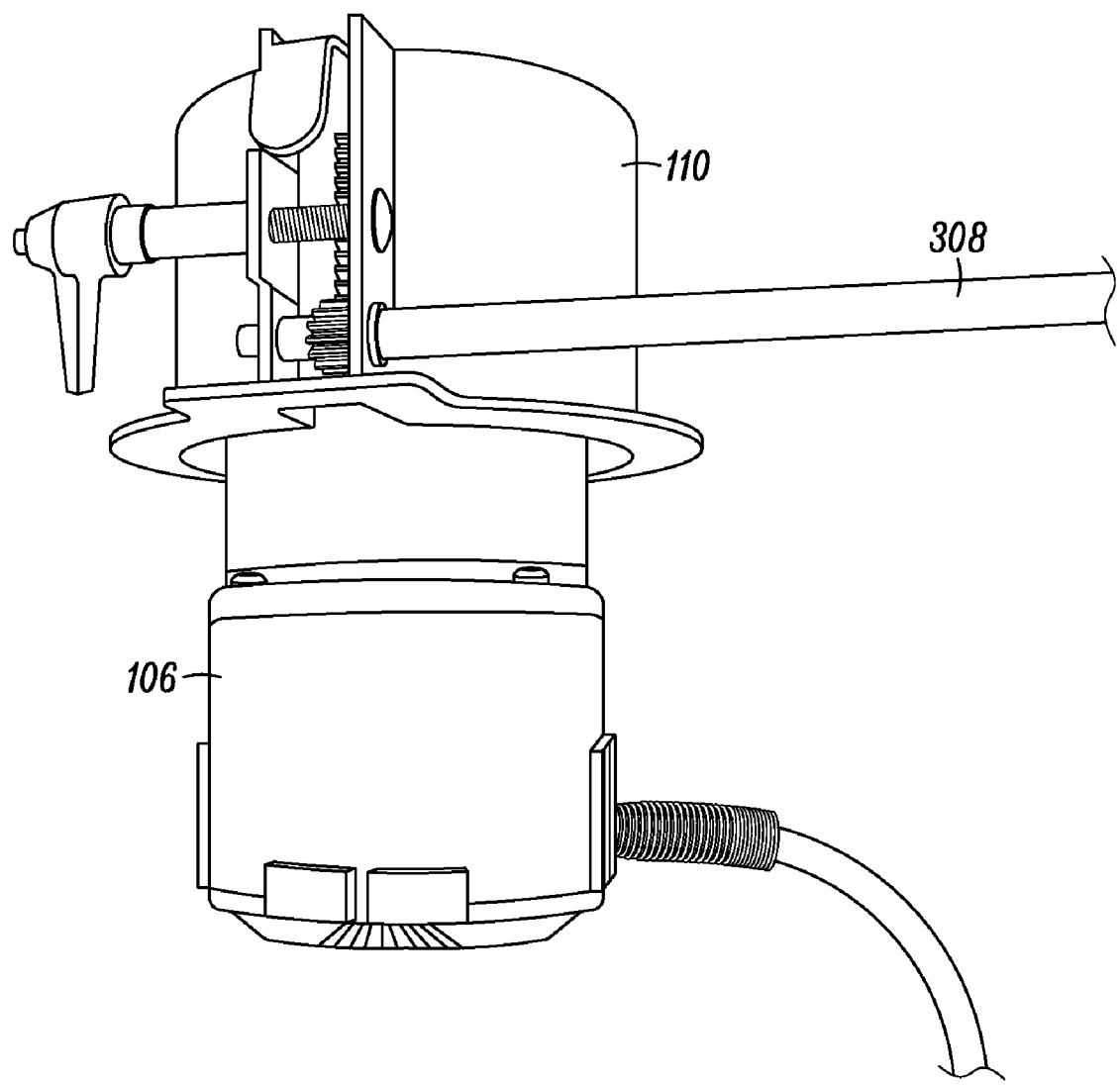
FIG. 4.3

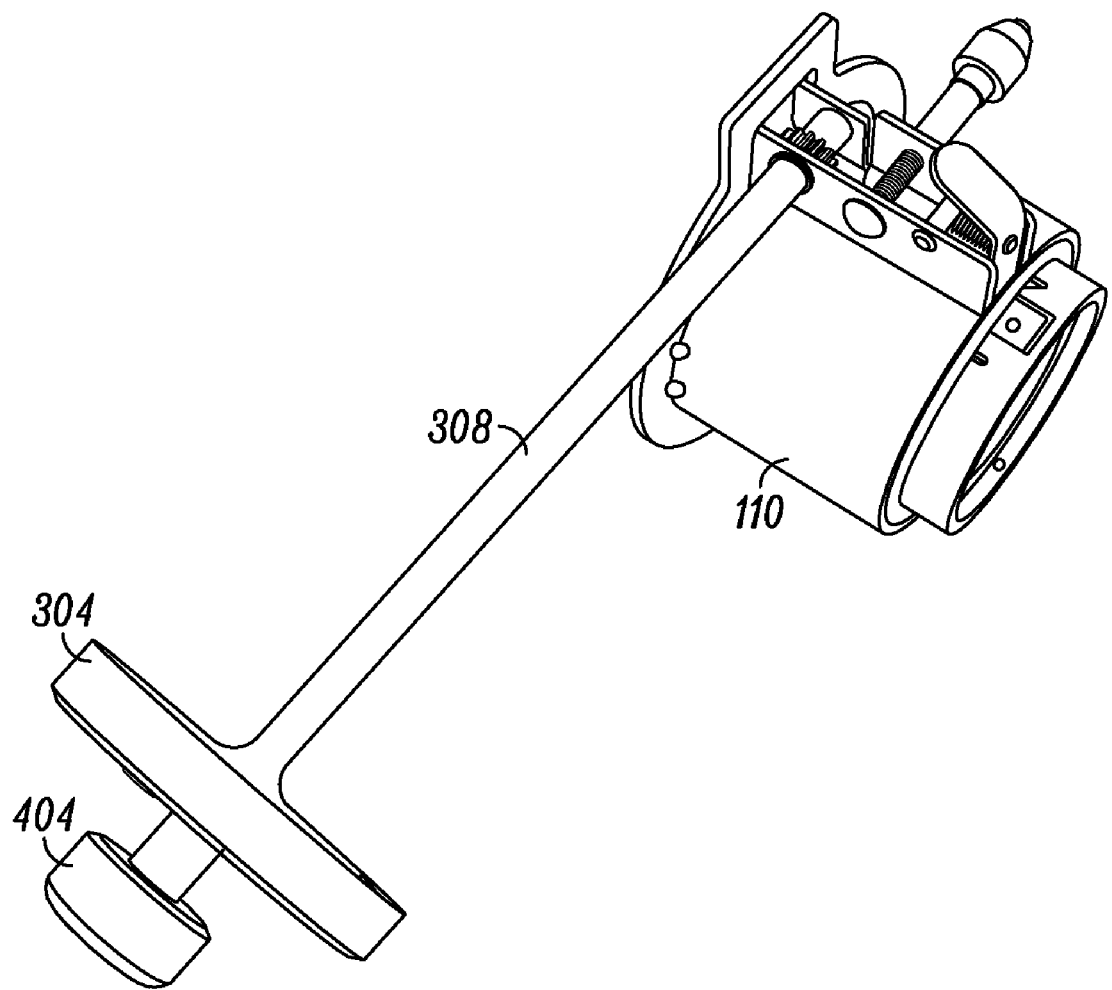
FIG. 4.4

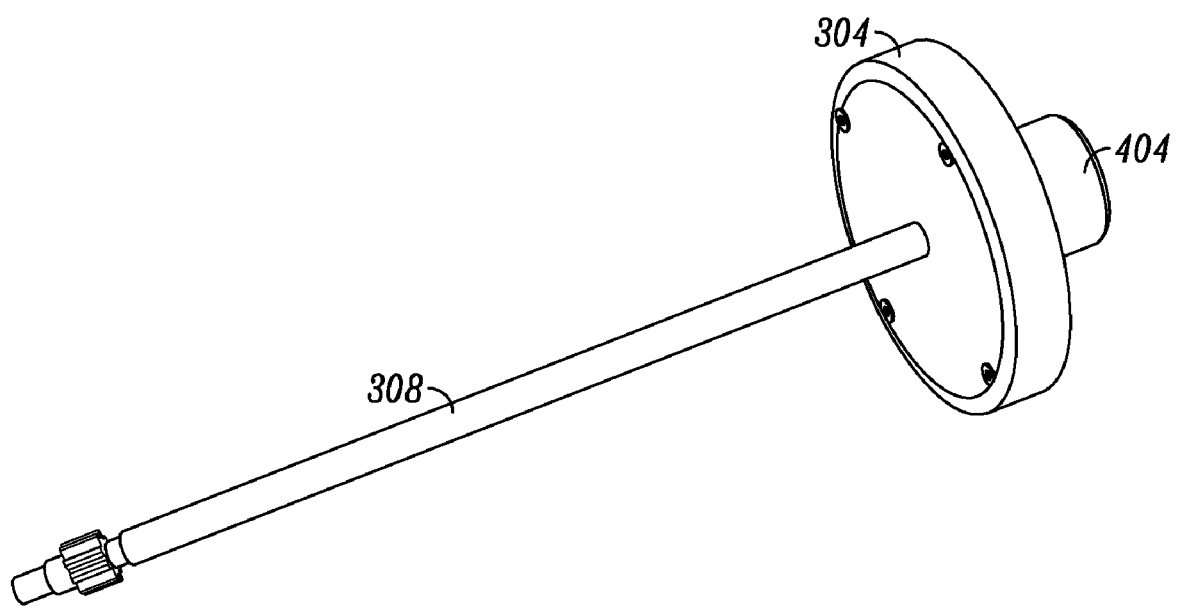
FIG. 4.5

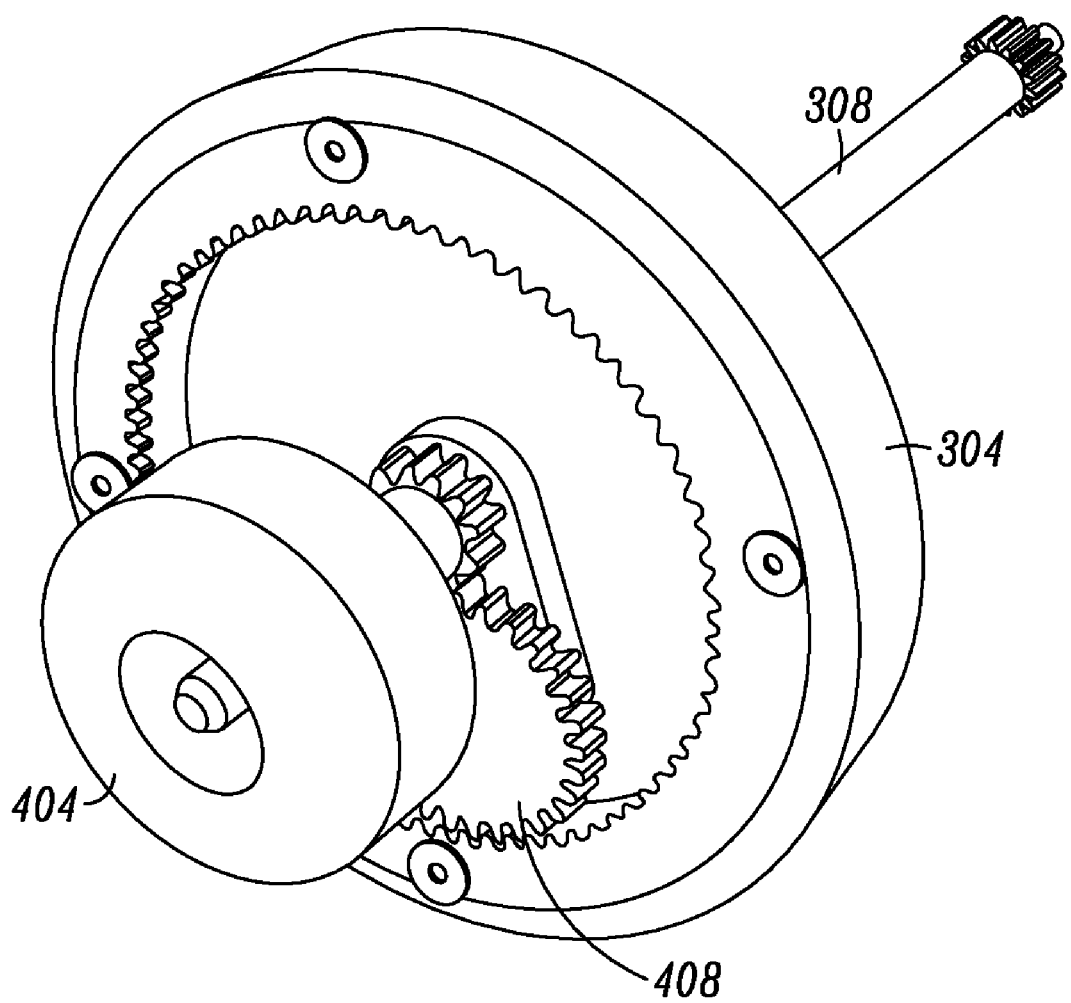
FIG. 4.6

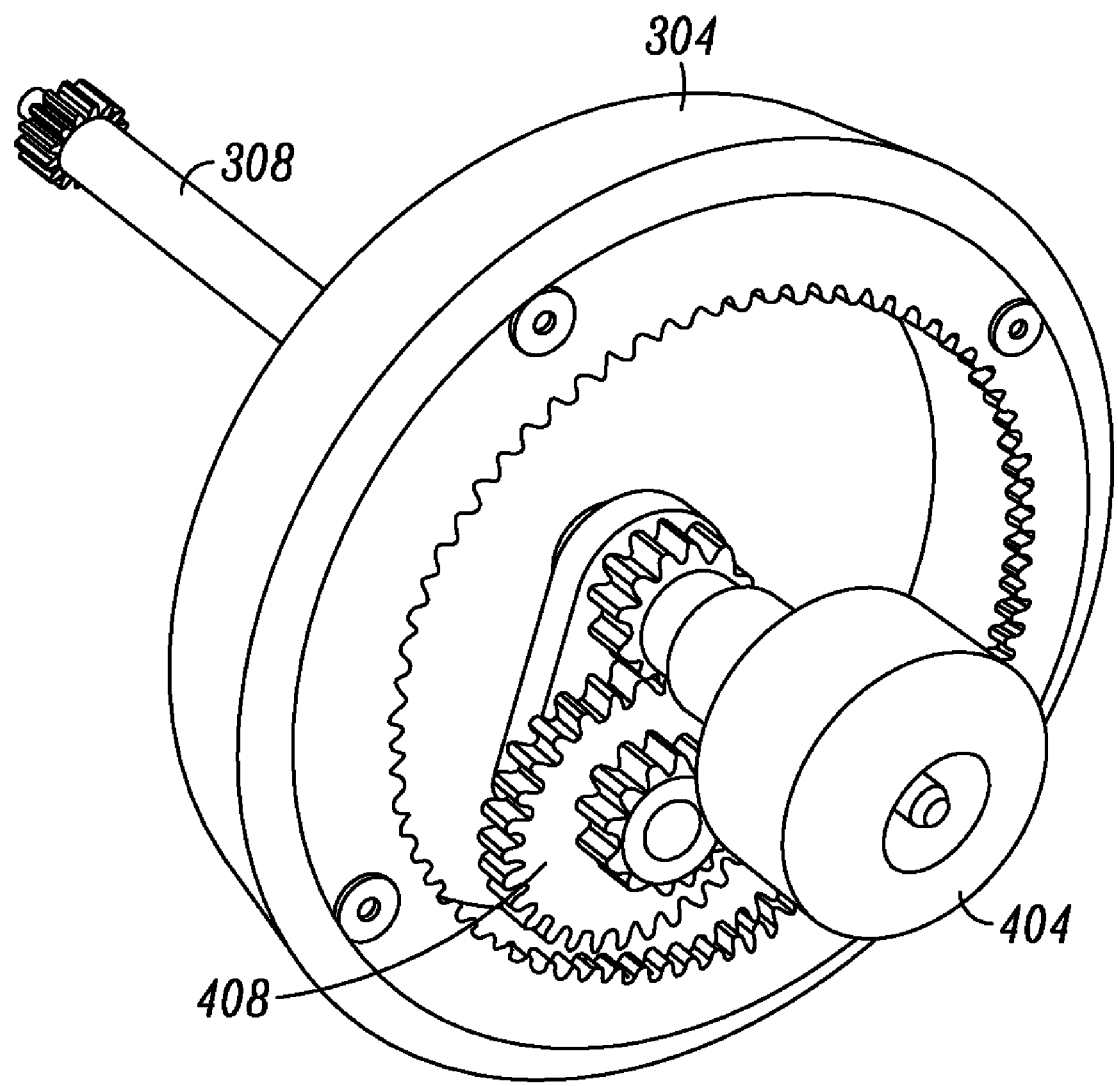
FIG. 4.7

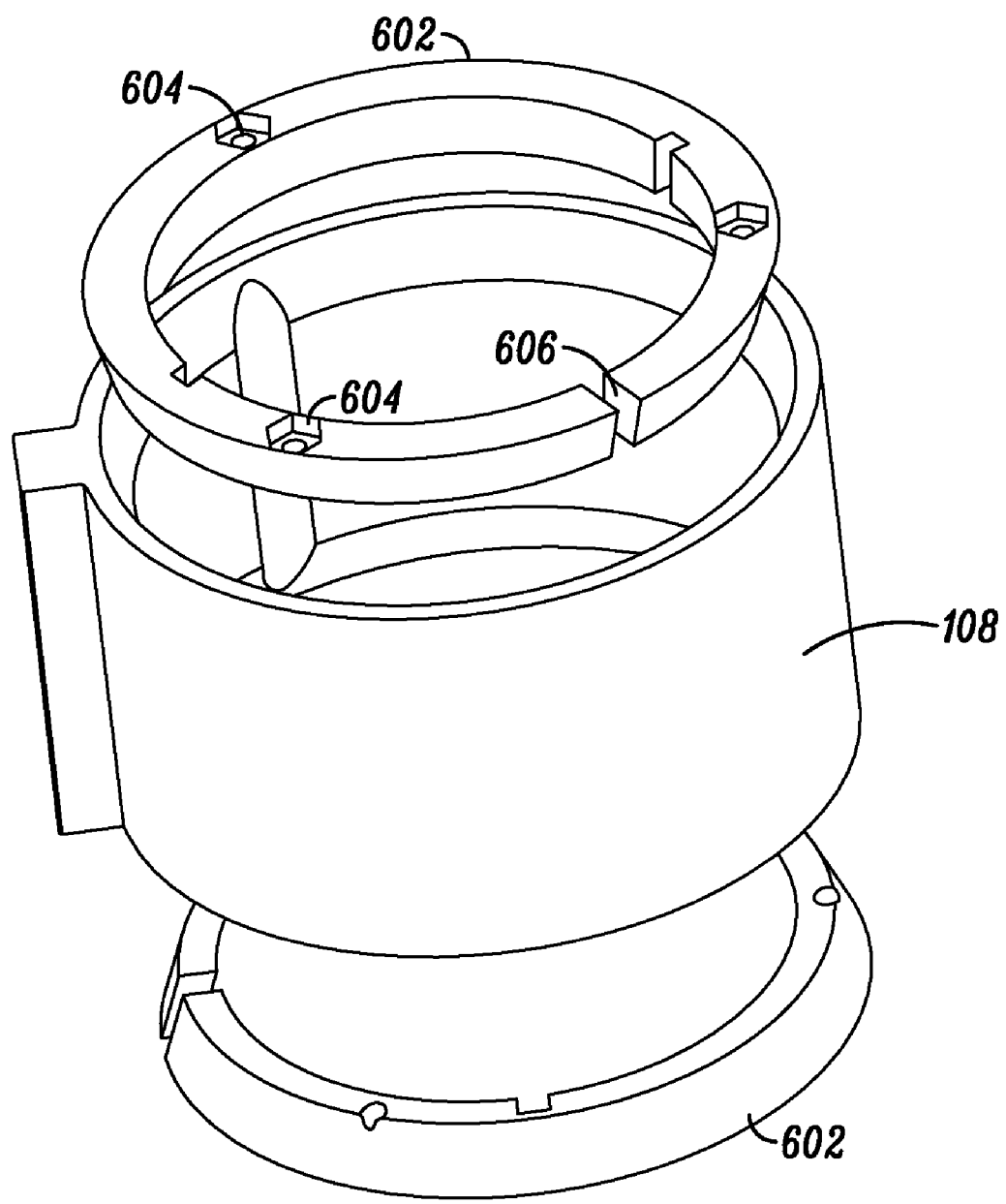
FIG. 6.1

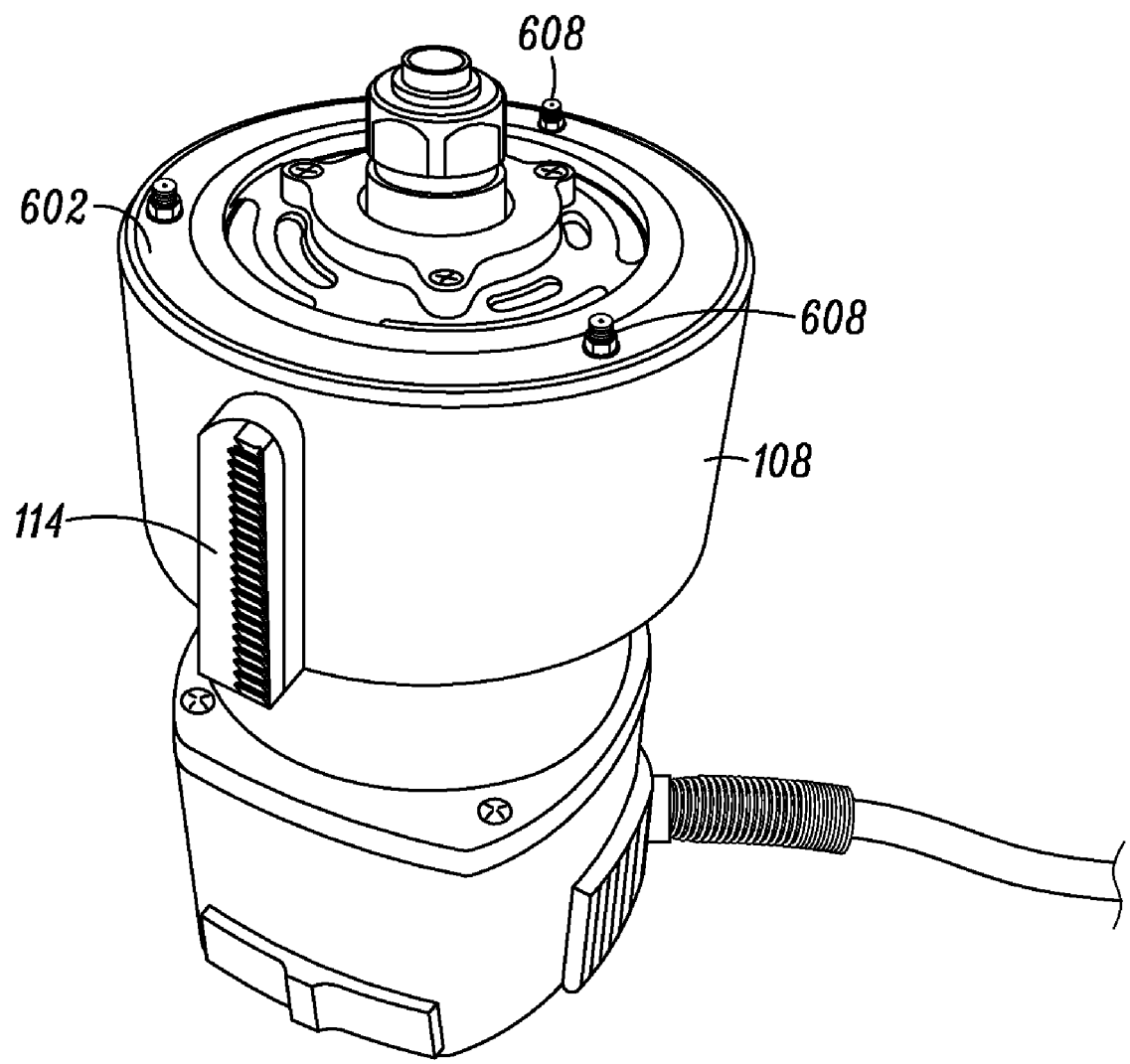
FIG. 6.2

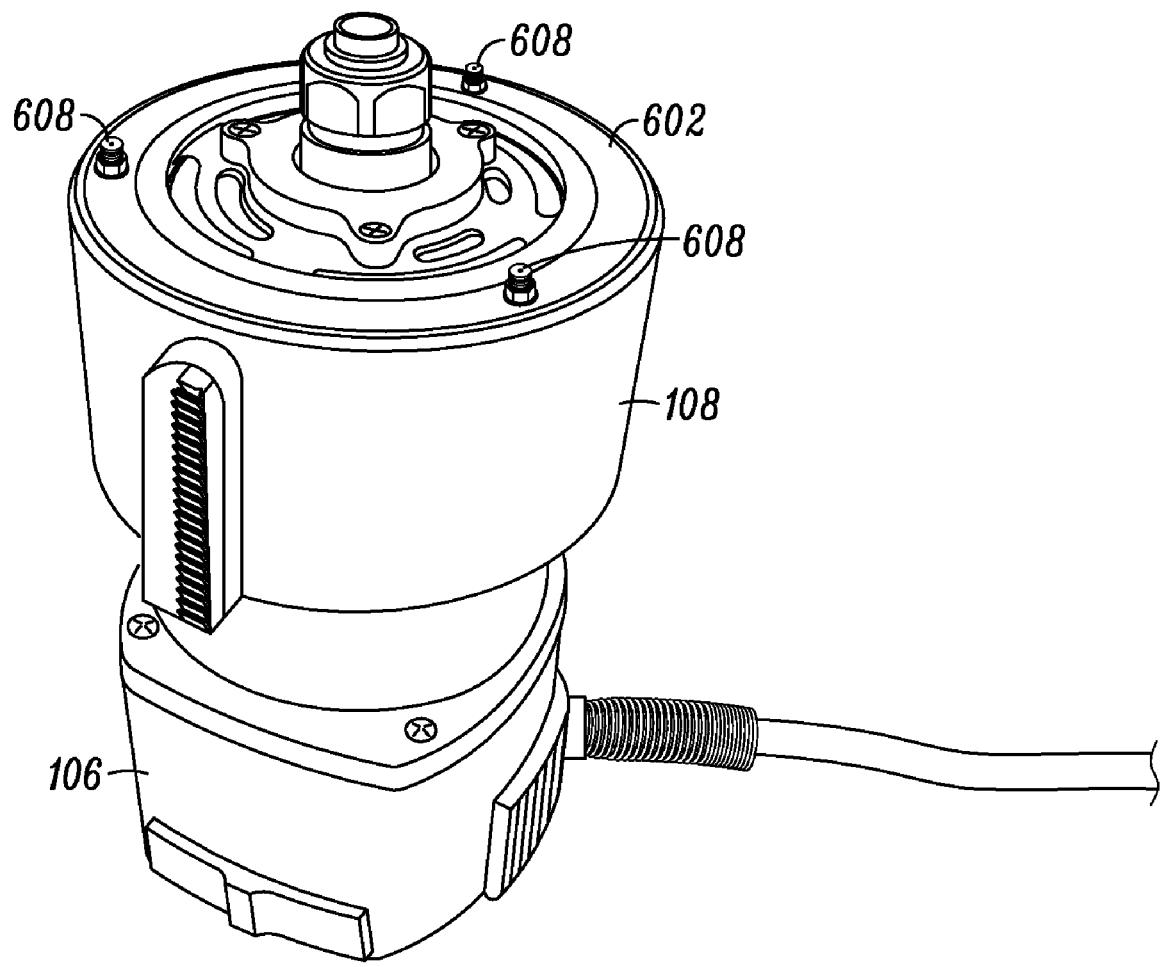
FIG. 6.3

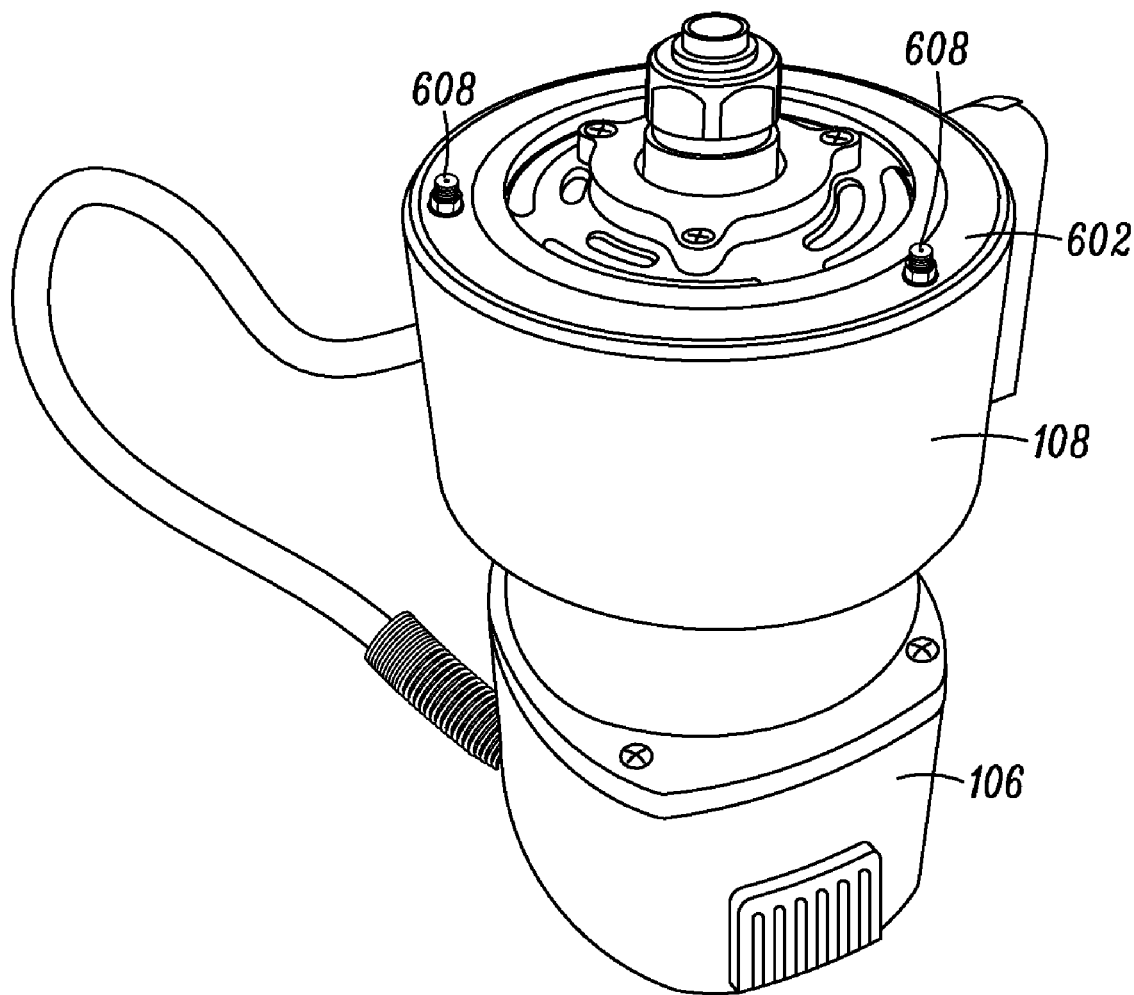
FIG. 6.4

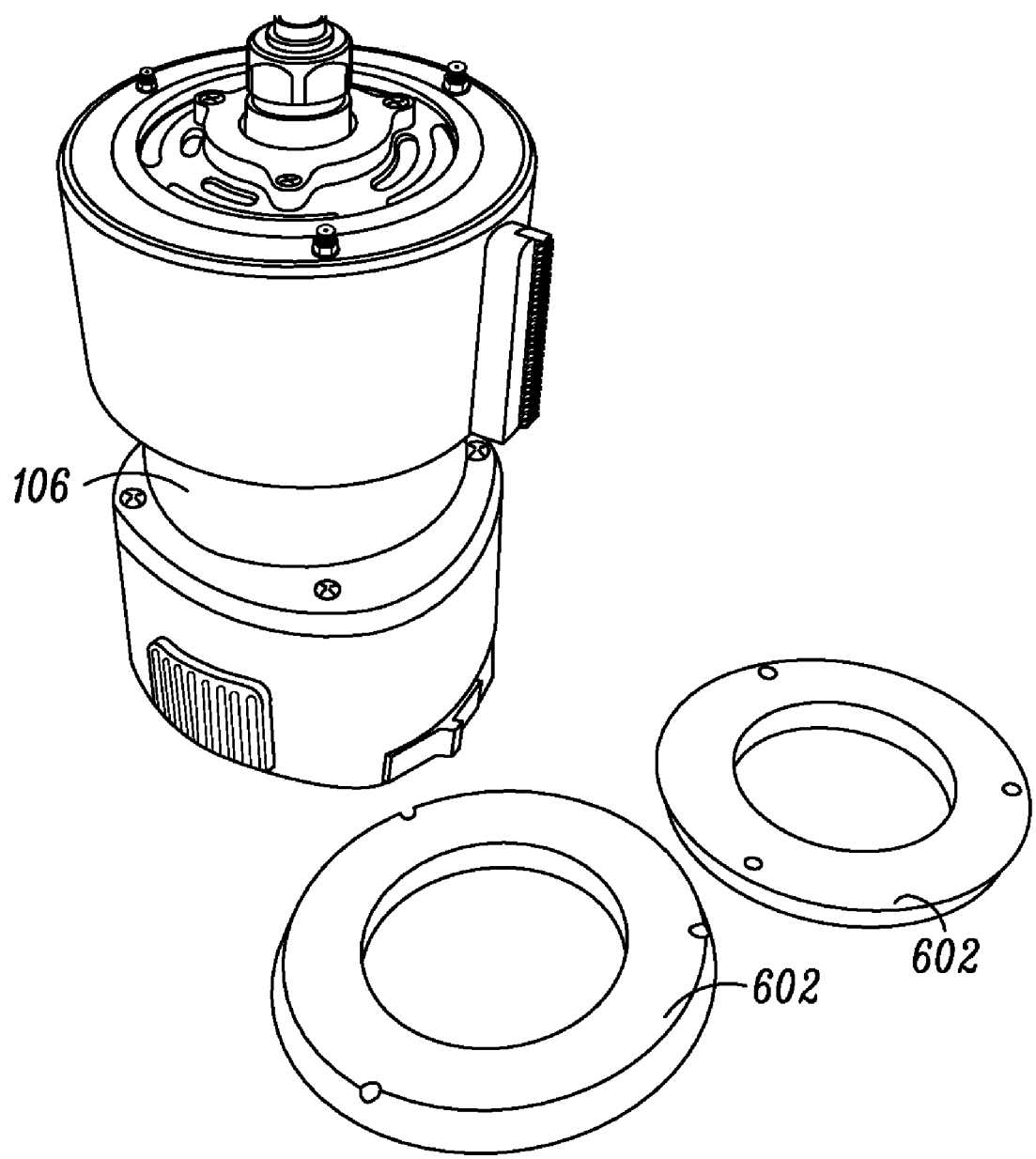
FIG. 6.5

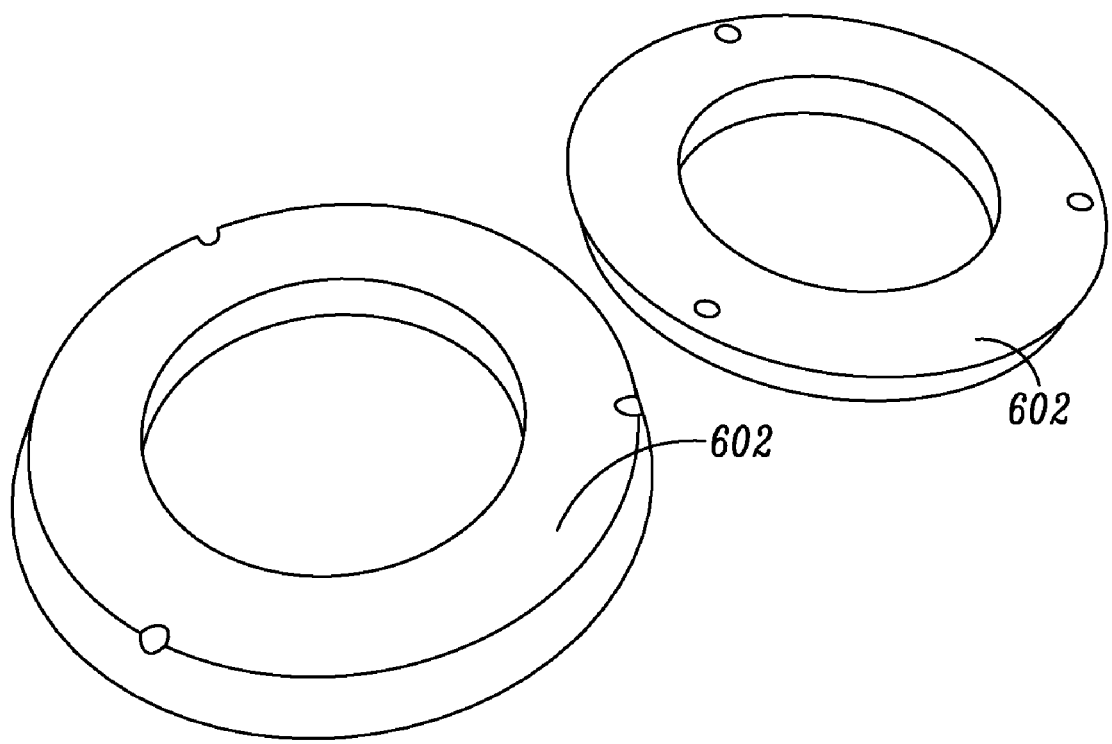
FIG. 6.6

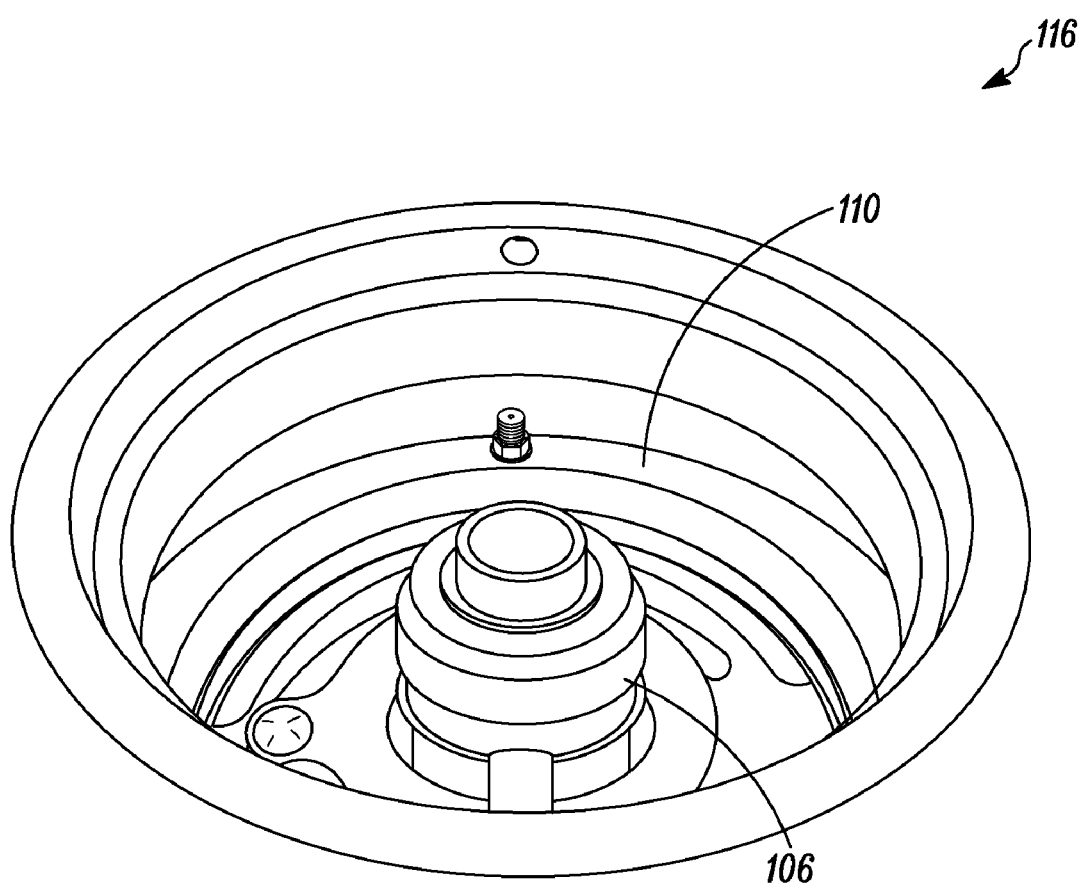
FIG. 9.1

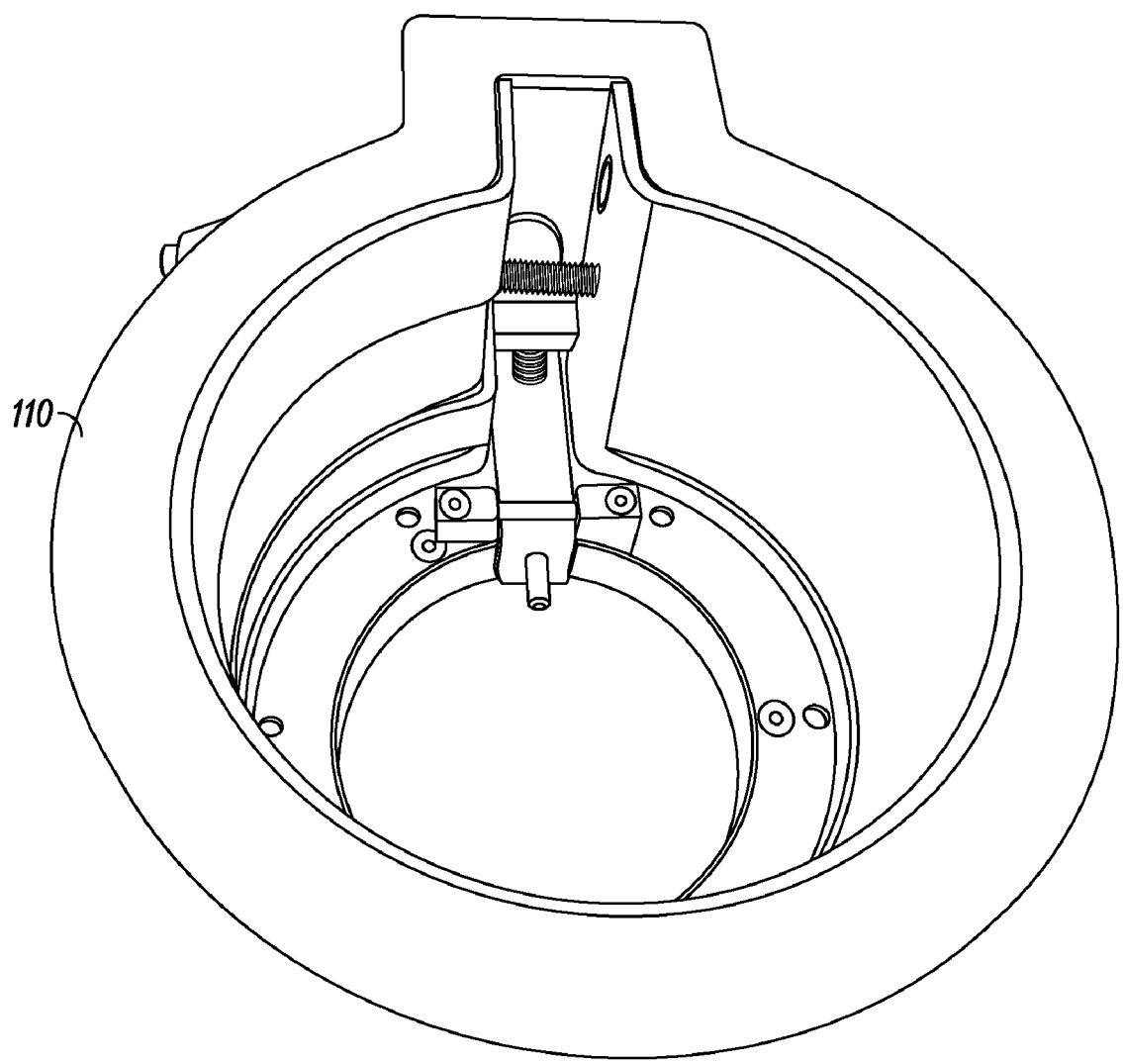
FIG. 9.2

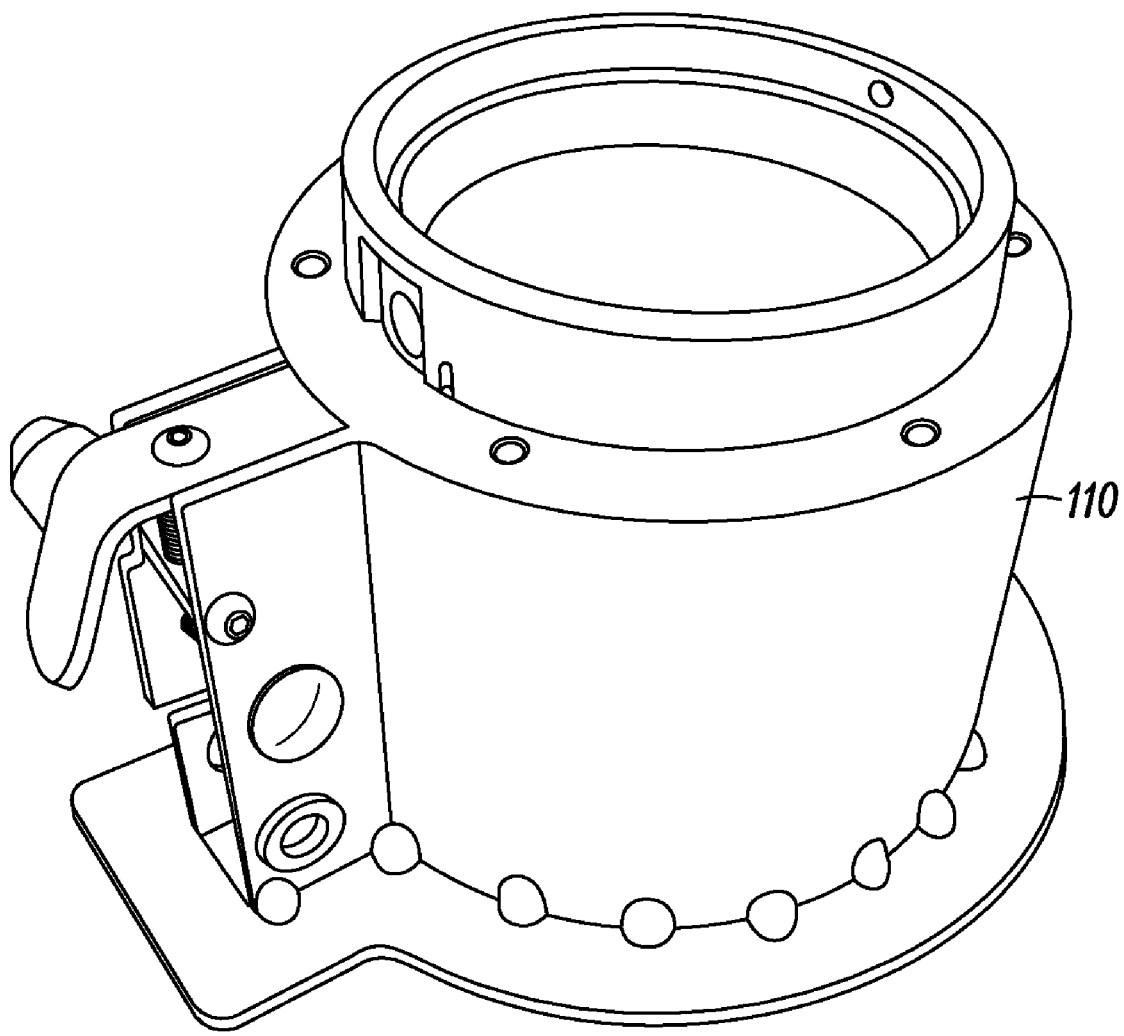
FIG. 9.3

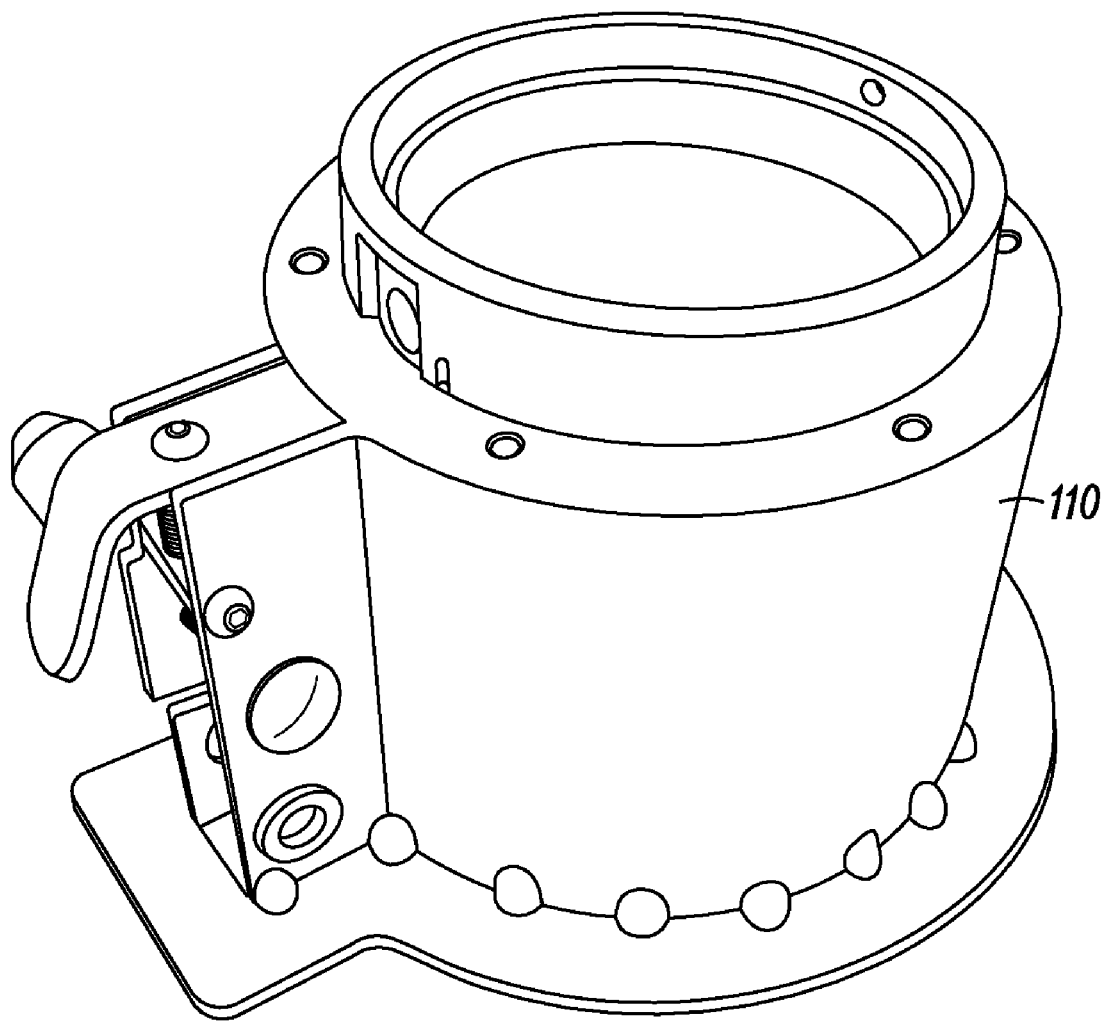
FIG. 9.4

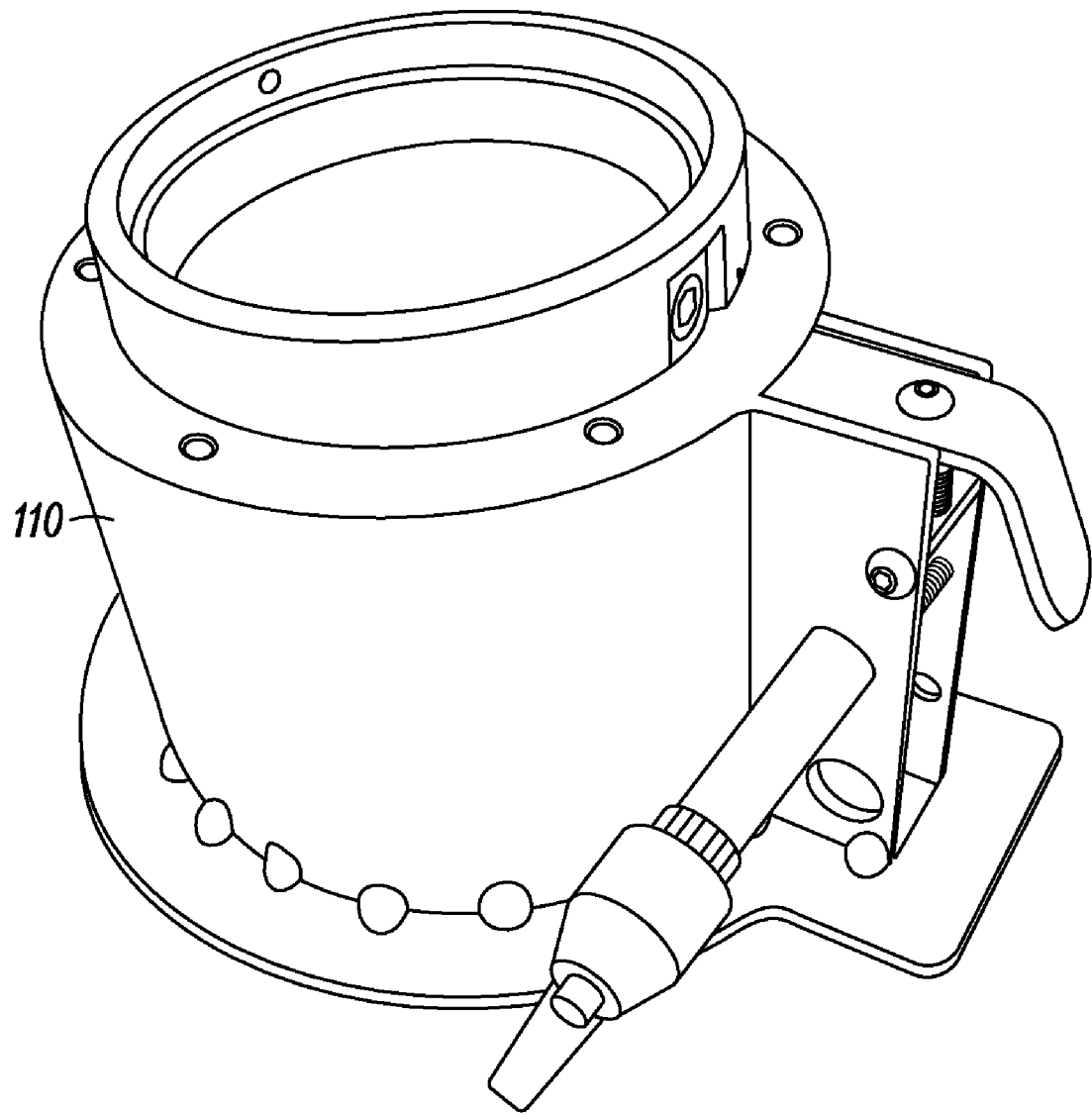
*FIG. 9.5*

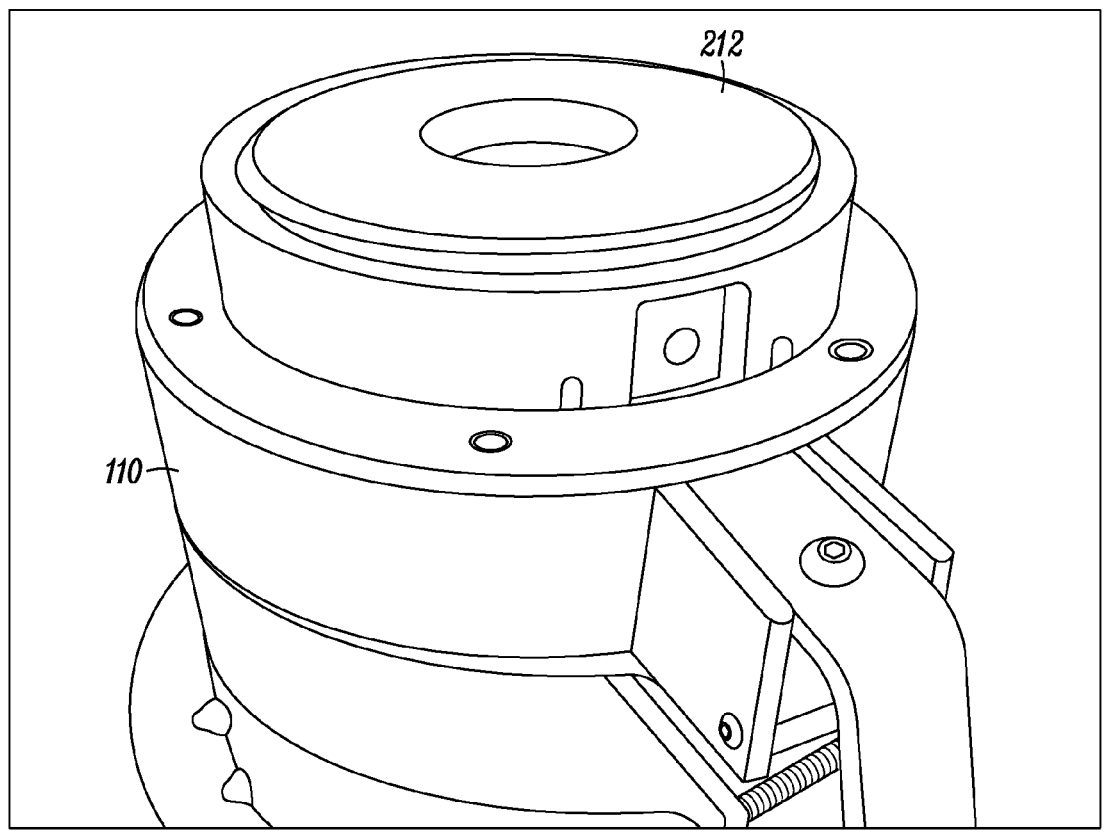
FIG. 9.6

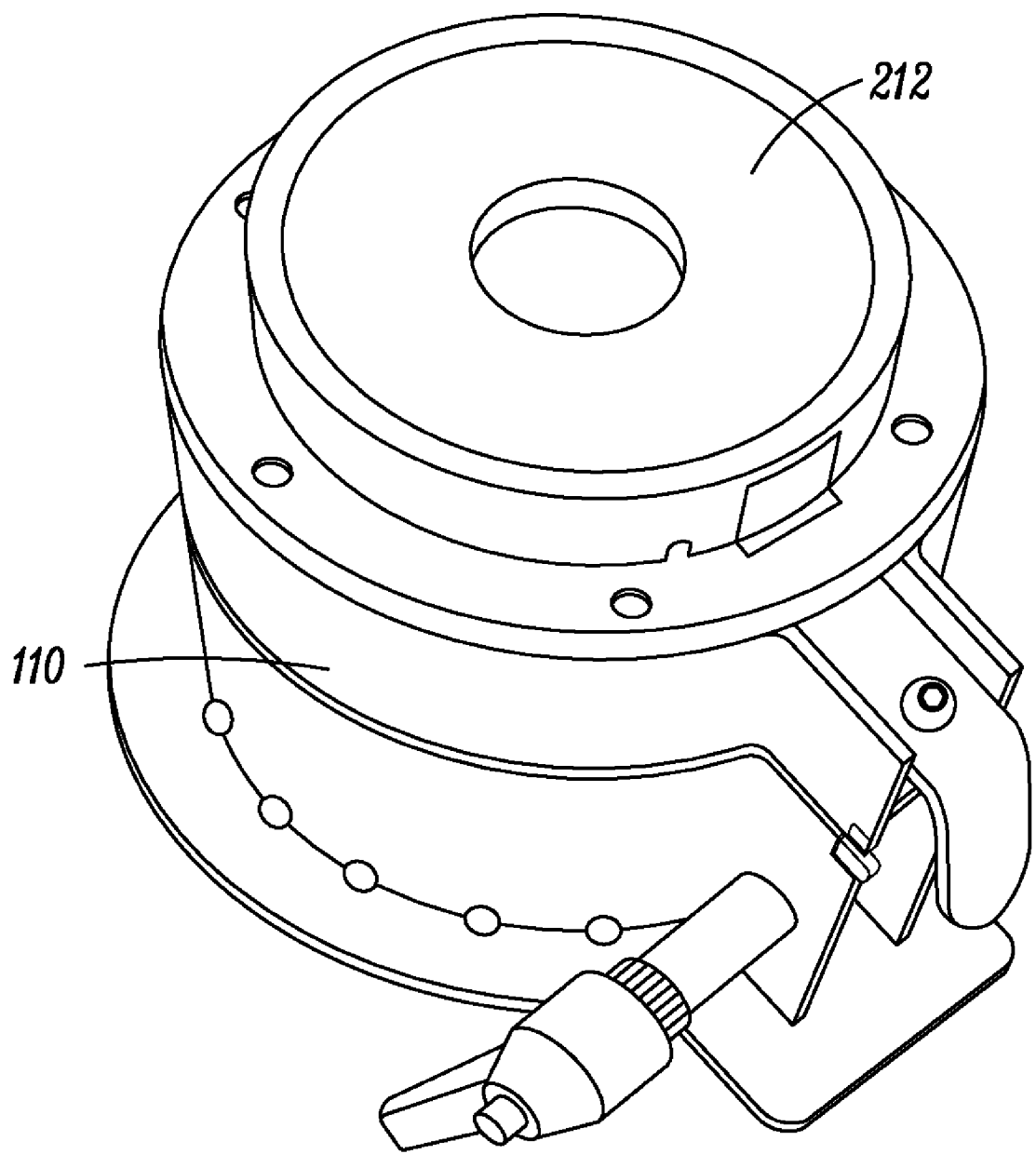
FIG. 9.7

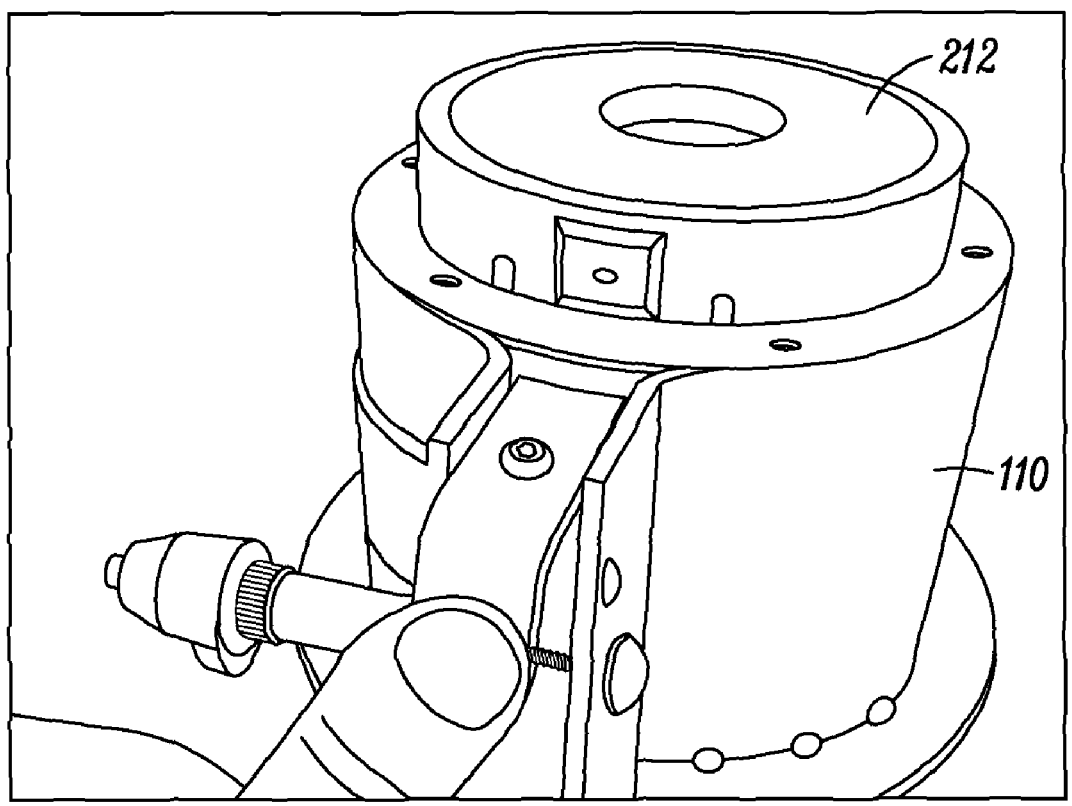
FIG. 9.8

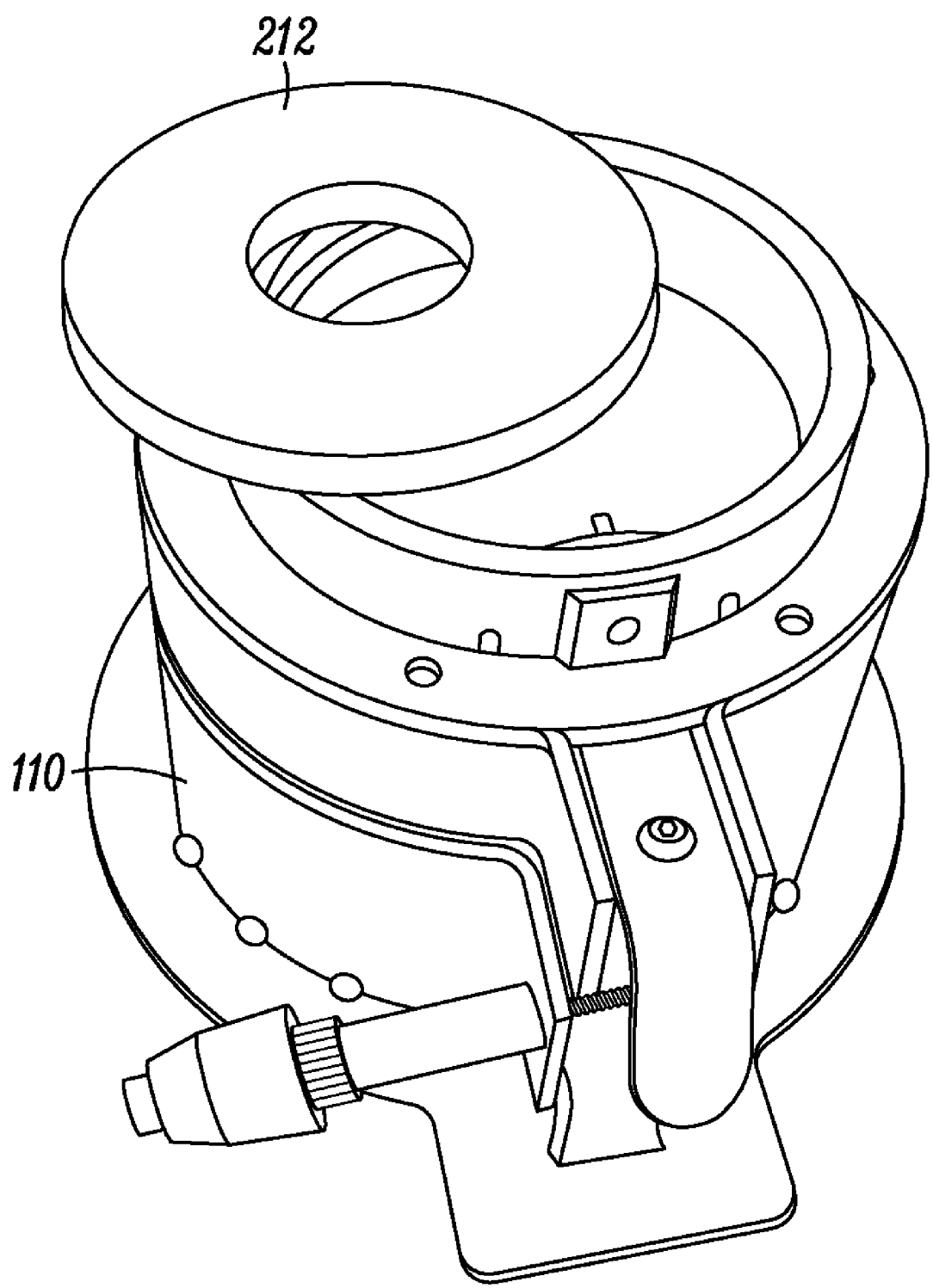
FIG. 9.9

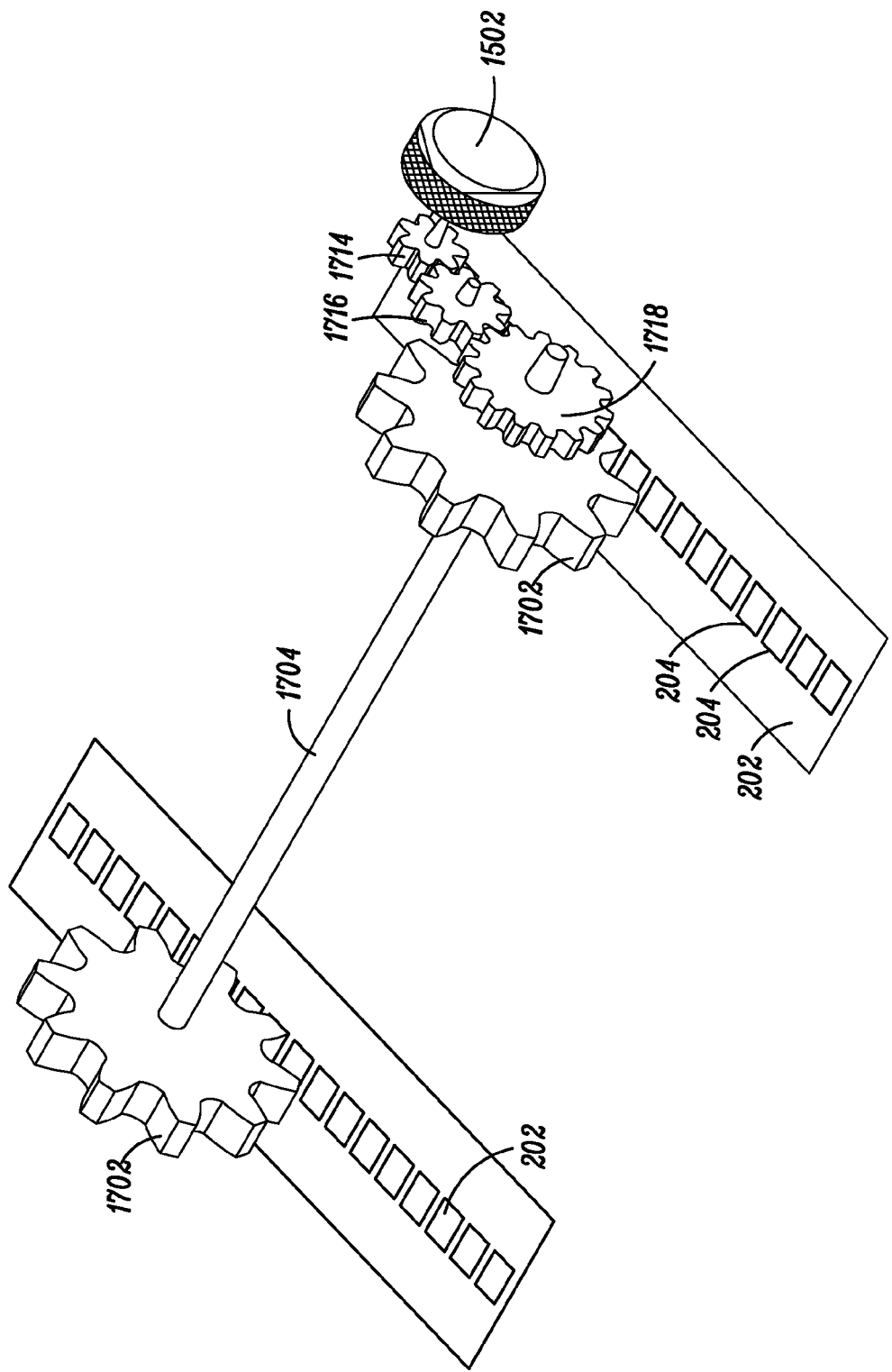
FIG. 17.1A

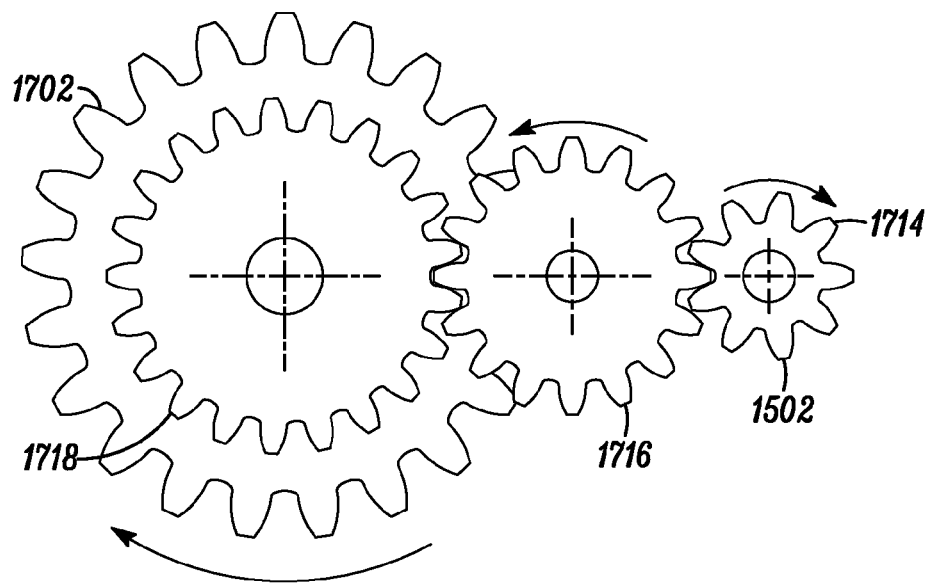
FIG. 17.1B
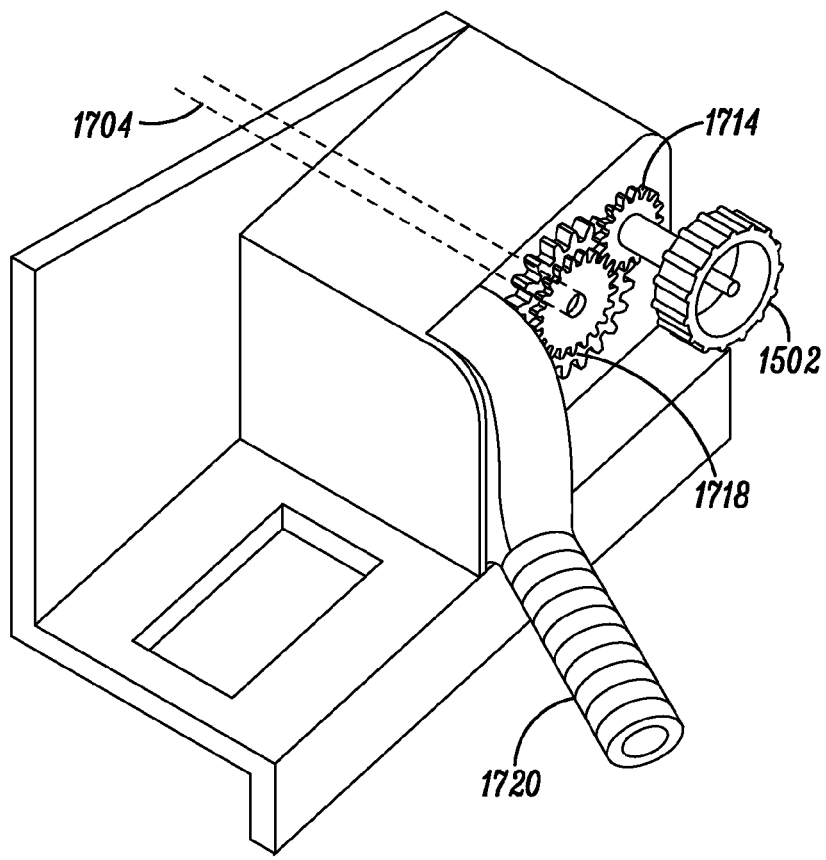
FIG. 17.2

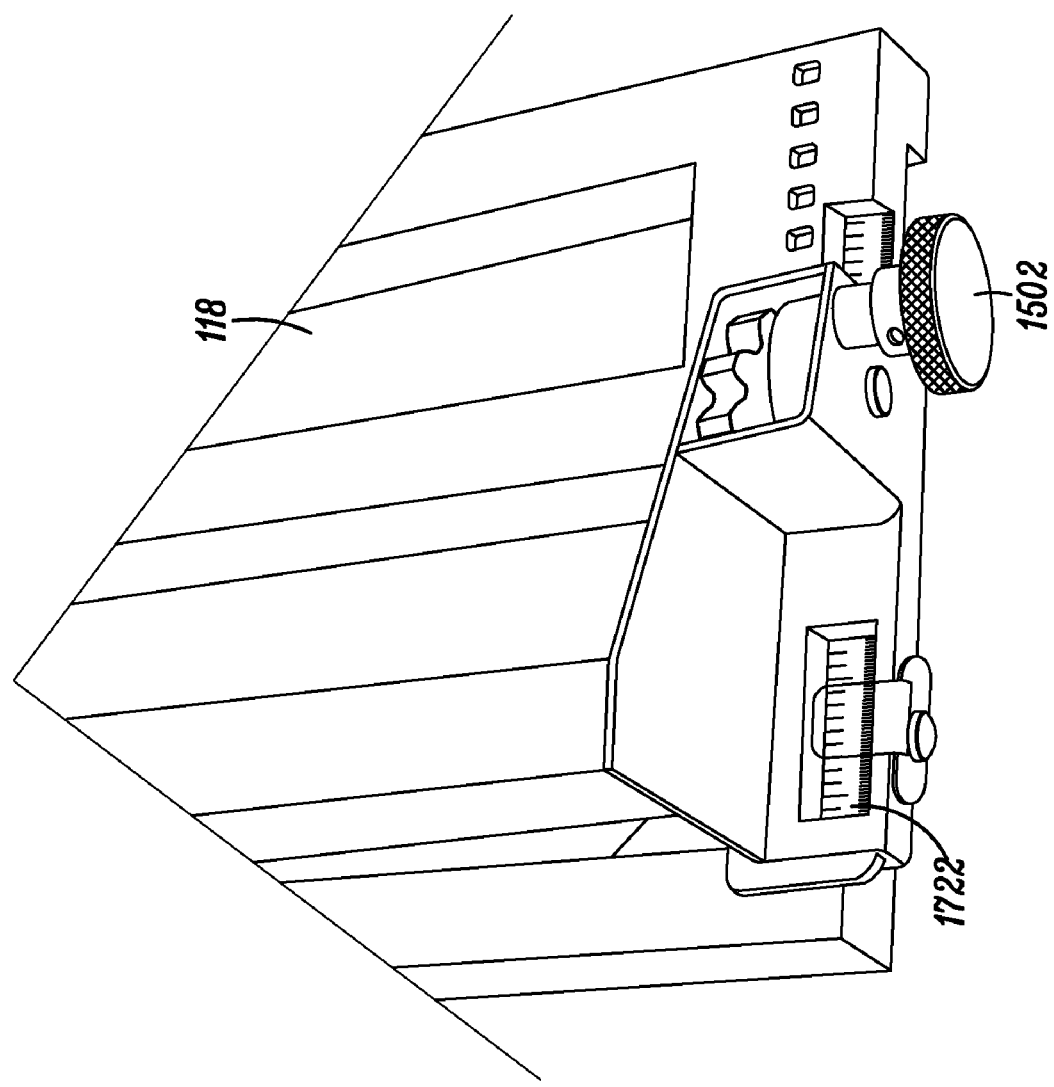
FIG. 17.3

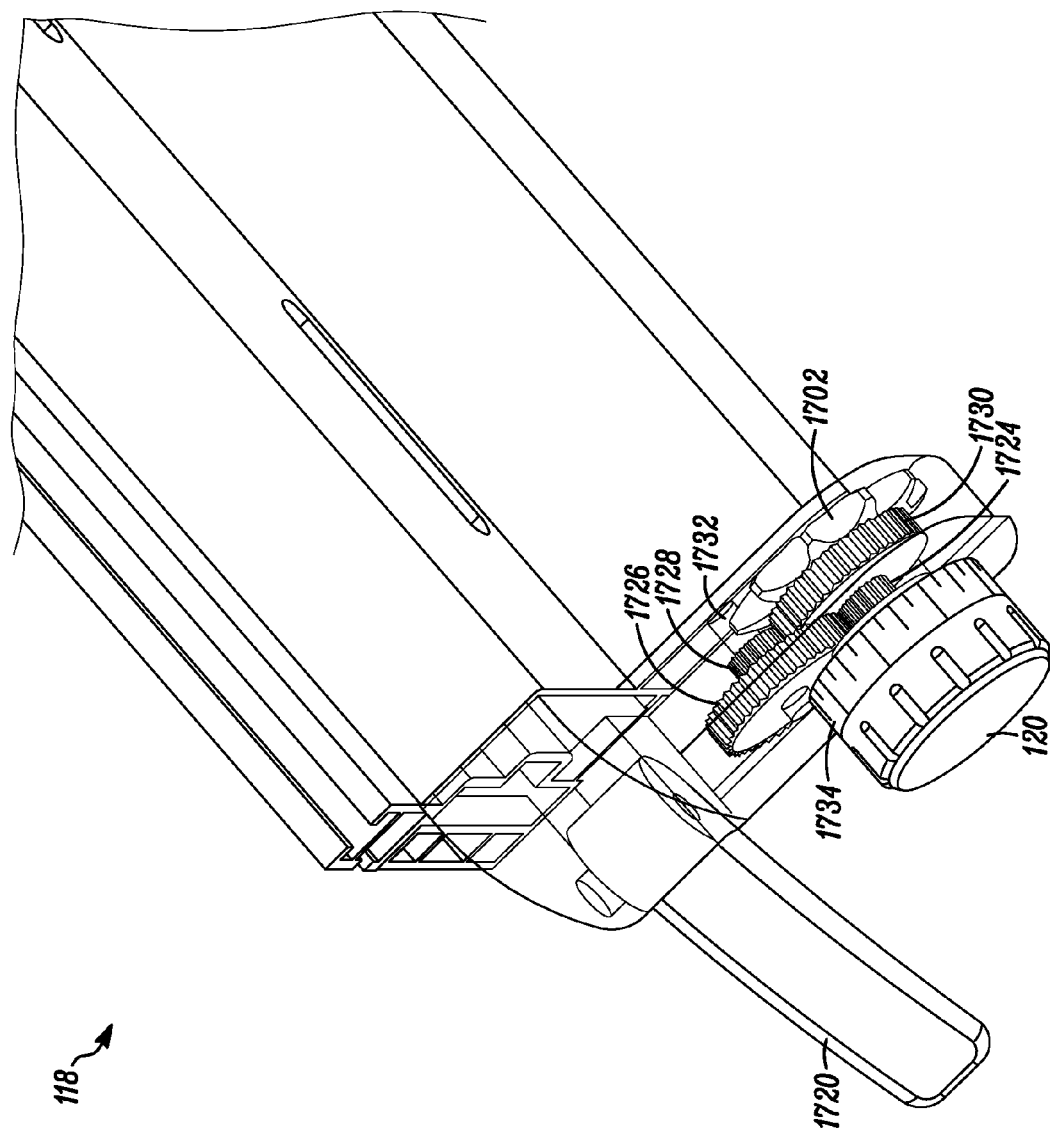
FIG. 17.4

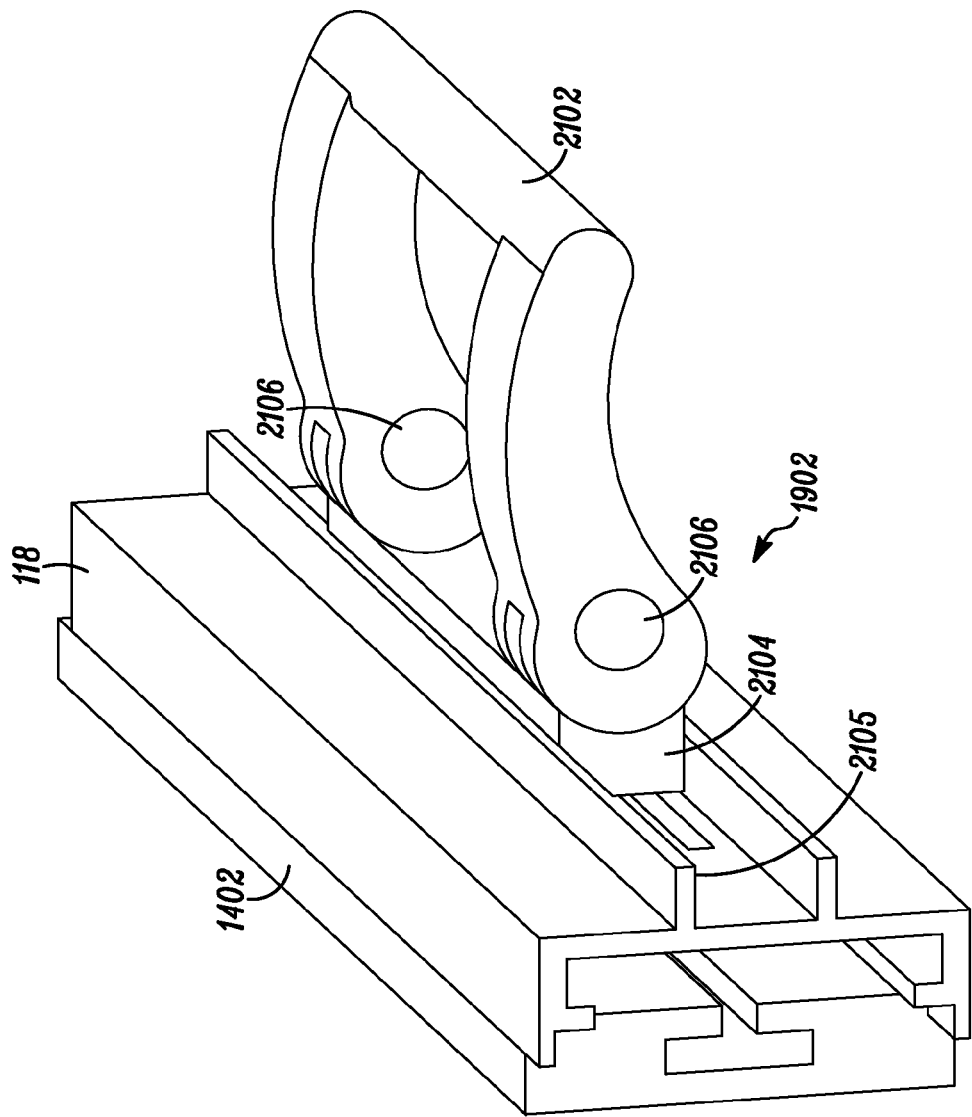
FIG. 21.1

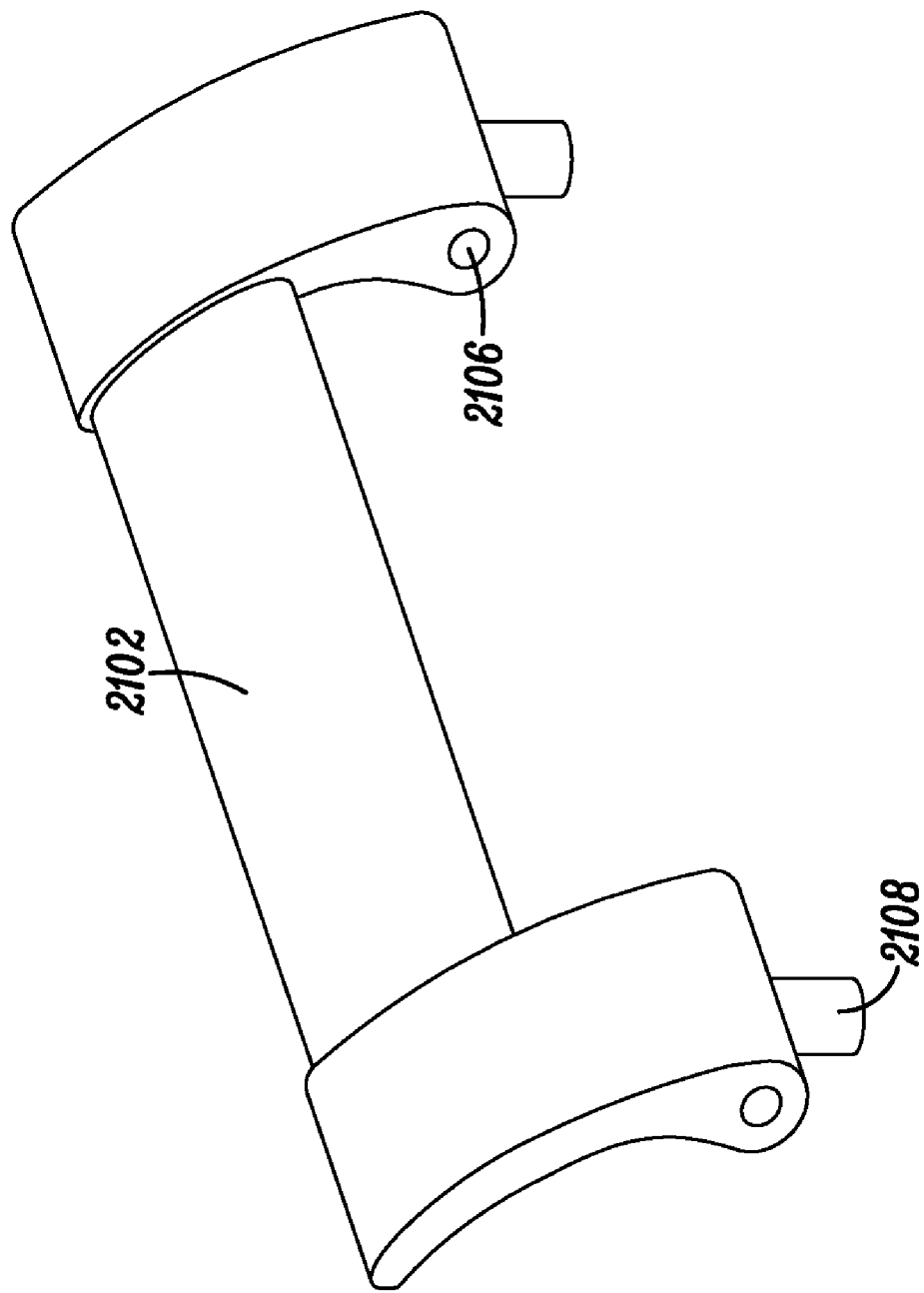
FIG. 21.2

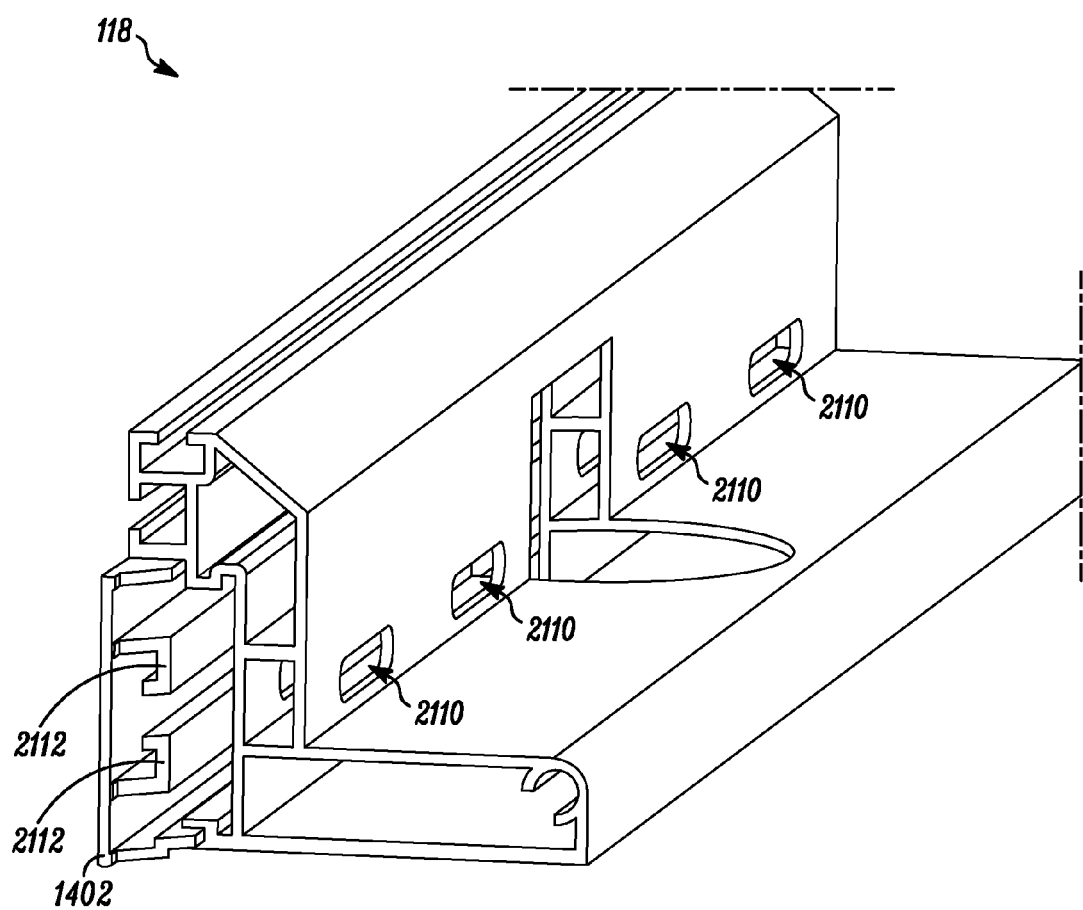
FIG. 21.3

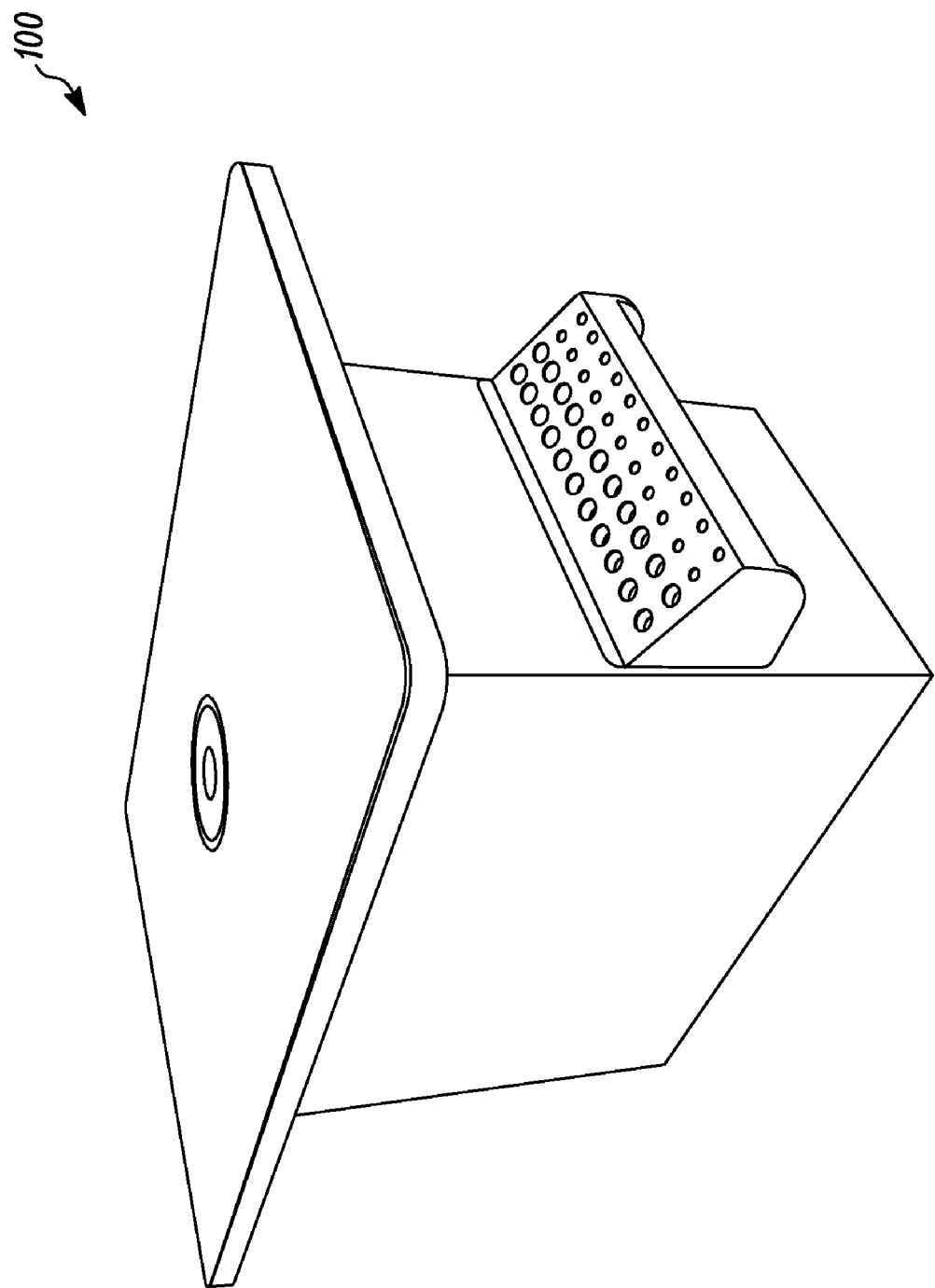
FIG. 24.1

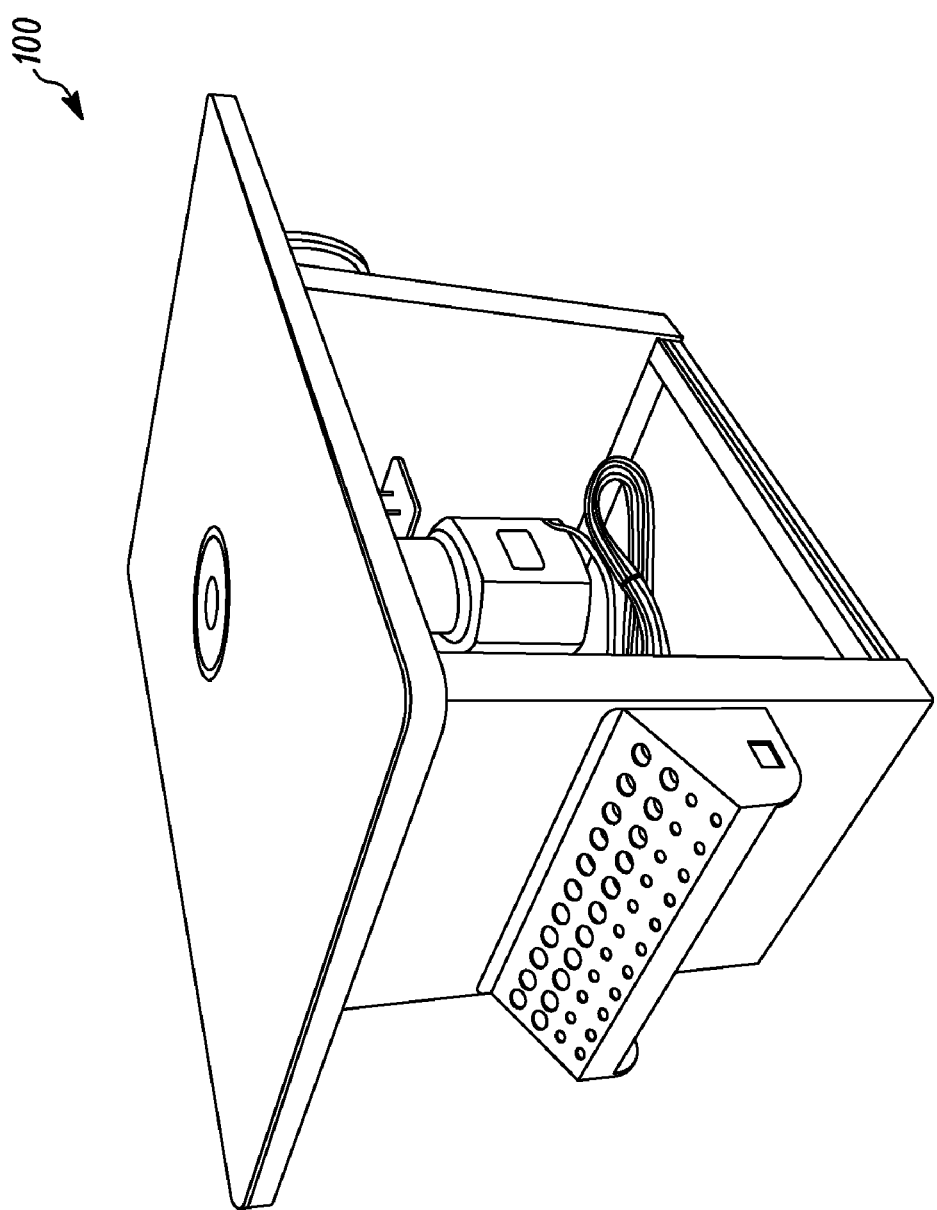
FIG. 24.2

ROUTER TABLE

CROSS-REFERENCE TO RELATED APPLICATION

This application is related to U.S. Non-Provisional patent application Ser. No. 12/027,114, entitled "Router Table," filed on Feb. 6, 2008.

PRIORITY CLAIM

The present application claims the benefit of priority based on U.S. Provisional Application No. 60/899,943, filed on Feb. 7, 2007, entitled "Router Table," and U.S. Provisional Application No. 60/934,208, filed on Jun. 12, 2007, entitled "Router Table," the disclosures of which are hereby incorporated by reference.

The present application was developed pursuant to a joint research agreement between Black & Decker (U.S.) Inc. and Ingenious Devices Effects And Solutions, Inc., which was in effect at the time the invention was made.

TECHNICAL FIELD

The present disclosure relates to router tables.

BACKGROUND

Routers may be used to remove wood from a workpiece. A router table may include a table top on which the workpiece may be laid to perform routing operations. The router table may secure the router in a position under the table top, so that a router bit of the router extends beyond a surface of the table top. In this way, a woodworker may more easily position and move the workpiece in a desired manner, relative to the router bit, to achieve a desired cutting of the workpiece.

SUMMARY

According to one general aspect, a router table may comprise a table top, a mounting can, a sleeve, and an adjustment mechanism. The table top may have an aperture and a plurality of support members; the support members may be configured to support the table top. The mounting can may be attachable to the table top in a vicinity of the aperture. The sleeve may be engaged to the mounting can, and may be configured to receive a router and to position a router bit of the router along an axis extending through the aperture. The adjustment mechanism may be configured to move the sleeve within the mounting can and relative to the table top to thereby move the router along the axis and position the router bit at one of a plurality of positions relative to the table top.

Implementations of this aspect may include one or more of the following features. An outer circumference of the sleeve may be engaged to an inner circumference of the mounting can. The sleeve may be slidably engaged to the mounting can. The adjustment mechanism may comprise a rack and pinion mechanism. The adjustment mechanism may include a pinion lock configured to prevent the sleeve from moving. The adjustment mechanism may include a lever. The sleeve may be configured to secure the router inside the sleeve. The inner diameter of the sleeve may be approximately equal to an outer diameter of a base of the router. The mounting can may be secured to the table top by fasteners. The table top may include an insert which includes the aperture, and the mounting can may be secured to the insert plate. The router table may further comprise a fence configured to move toward or away from the aperture. The fence may include an adjustment knob configured to translate rotational movement of the adjustment knob into movement of the fence toward or away from the aperture. The fence may include independently adjustable subfences. The router table may further comprise at least two tracks, and the fence and the at least two tracks may be configured to cause two end portions of the fence to move along the at least two tracks in tandem. The router table may further comprise a vacuum port extending through a hole in the fence. The router table may further comprise a vacuum port configured to receive dust particles created by the router bit routing a workpiece.

According to another general aspect, a router table may comprise a table top, a mounting can, and a sleeve. The table top may have an aperture and a plurality of support members configured to support the table top. The mounting can may be attachable to the table top in a vicinity of the aperture. The sleeve may have an outer circumference engaged to an inner circumference of the mounting can, and may be configured to receive a router and to position a router bit of the router along an axis extending through the aperture.

Implementations of this aspect may include one or more of the following features. An inner diameter of the sleeve may be approximately equal to an outer diameter of a base of the router. The sleeve may be slidably engaged to the mounting can. The mounting can may be secured to the table top by fasteners. The router table may further comprise a fence configured to move toward or away from the aperture.

According to another general aspect, a router table may comprise a table top, a router mount, and a geared mechanism. The table top may have an aperture and a plurality of support members configured to support the table top. The router mount may be attached to the table top and configured to receive a router. The geared mechanism may comprise a knob and a driveshaft and be configured to position the router along an axis passing through the aperture in response to rotation of the driveshaft by the knob.

Implementations of this aspect may include one or more of the following features. The geared mechanism may further include a measurement indicator including indicia. The geared mechanism may further comprise a fine adjustment knob and a gear reduction mechanism; the gear reduction mechanism may be configured to translate rotation of the fine adjustment knob into rotation of the driveshaft by a ratio of less than one rotation of the driveshaft for each rotation of the fine adjustment knob. The table top may include an insert plate which includes the aperture, and the router mount may be attached to the insert plate. The router table may further comprise a pinion lock configured to lock the knob in place. The router table may further comprise at least one ring-shaped collet secured to the router mount by fasteners. The at least one ring-shaped collet may include a compression aperture between ends of the at least one ring-shaped collet configured to adjust a radius of the at least one ring-shaped collet.

According to another general aspect, a router table may include a table top, an insert plate, and a mounting plate. The table top may have an aperture and a plurality of support members configured to support the table top. The insert plate may be received by the table top. The mounting plate may be rotationally mounted to the insert plate.

Implementations of this aspect may include one or more of the following features. The insert plate may comprise a plurality of insert plate tables, the mounting plate may comprise a plurality of mounting plate tables configured to mate with the insert plate tables, and the mounting plate may be mounted to the insert plate by engagement of the mounting plate tabs to the insert plate tabs. The router table may further comprise a throat plate resting on a mounting shelf of the mounting plate. The throat plate may be secured to the mounting plate by a release tab; the release tab may be configured to release the throat plate in response to a user pulling on the release tab. The throat plate may be secured to the mounting plate by a spring-loaded release tab; the spring-loaded release tab may be configured to release the throat plate in response to a user pulling on a trigger of the spring-loaded release tab.

According to another general aspect, a router table may include a table top, a fence, and an adjustment mechanism. The table top may have an aperture and a plurality of support members configured to support the table top. The fence may extend across a portion of the table top in a first direction and include a first end portion engaged to a first portion of the table top by a first gear mechanism and a second end portion engaged to a second portion of the table top by a second gear mechanism. The first gear mechanism and the second gear mechanism may be coupled to each other by a drive shaft. The adjustment mechanism may be configured to drive at least one of the first gear mechanism, the second gear mechanism, and the driveshaft.

Implementations of this aspect may include one or more of the following features. The first gear mechanism and the second gear mechanism may comprise rack and pinion mechanisms. The table top may further include an accessory gage slot. The adjustment mechanism may be configured to move the first end portion and the second end portion an equal distance. The router table may further comprise at least one subfence configured to move toward or away from the fence. The router table may further comprise at least two ramps interposed between the fence and the at least one subfence. The at least two ramps may be located between the fence and the at least one subfence; the at least two ramps may include wedges configured to mate with the wedges of the other ramp. The at least one subfence may be configured to receive a fastener; the fence may include a slot configured to receive the fastener. The adjustment mechanism may include a fence adjustment knob and a fine fence adjustment knob. The first end portion of the fence may be engaged to a first track of the table top by the first gear mechanism and the second end portion of the fence may be engaged to a second track of the table top by the second gear mechanism. The adjustment mechanism may include at least one knob coupled to the drive shaft by interlocking gears. The router table may further comprise a clamp lever configured to secure the fence in place by frictional engagement with the table top. The fence may include a measurement indicator.

According to another general aspect, a router table may include a table top, a fence, and an adjustment mechanism. The table top may have an aperture and a plurality of support members configured to support the table top. The fence may extend across a portion of the table top. The adjustment mechanism may include a first knob and a second knob. The first knob may be configured to cause the fence to move a first distance across the table top per rotation of the first knob. The second knob may be configured to cause the fence to move a second distance across the table top per rotation of the knob.

Implementations of this aspect may include one or more of the following features. The adjustment mechanism may be configured to move the fence toward or away from the aperture. The fence may include independently adjustable subfences. The router table may further comprise at least two tracks, and the adjustment mechanism may be configured to cause two end portions of the fence to move along the at least two tracks in tandem. The router table may further comprise a vacuum port extending through a hole in the fence. The router table may further comprise a mounting can attachable to the table top in a vicinity of the aperture and a sleeve engaged to the mounting can; the sleeve may be configured to receive a router and to position a router bit of the router along an axis extending through the aperture.

According to another general aspect, a router table may include a table top, a fence, and a first subfence and a second subfence connected to the fence. The table top may have an aperture and a plurality of support members configured to support the table top. The fence may extend across a portion of the table top. The first subfence and the second subfence may each be configured to move toward or away from the fence independently of the other.

Implementations of this aspect may include one or more of the following features. The router table may further comprise a first clamp and a second clamp secured to portions of the fence opposite from the first subfence and second subfence, respectively, each of the first clamp and the second clamp including a sliding block, and handle hingedly attached to the sliding block, and at least two T-bolts configured to pull the first or second subfence toward the first or second clamp, respectively, when the handle is pushed. The first and second clamp may each further include trunnions configured to pull the at least two T-bolts when the handle is pushed, causing the T-bolts to pull the first or second subfence toward the first or second clamp, respectively. The trunnions may include eccentric pivot drawbolts.

According to another general aspect, a router table may comprise a table top, a fence, a subfence connected to the fence, and at least two ramps sandwiched between the fence and subfence. The table top may have an aperture and a plurality of support members configured to support the table top. The fence may extend across a portion of the table top. The at least two ramps may be configured to cause the subfence to move toward or away from the fence in response to movement of one of the at least two ramps relative to each other.

Implementations of this aspect may include one or more of the following features. The at least two ramps may be located between the fence and the subfence by a spring-loaded mechanism. The router table may further comprise a clamp which may be secured to portions of the fence opposite from the subfence, respectively; the clamp may include a sliding block, a handle hingedly attached to the sliding block; and at least two T-bolts configured to pull the subfence toward the clamp when the handle is pushed.

According to another general aspect, an apparatus may comprise a housing, a fulcrum support comprising a fulcrum, a coil or spring between the housing and the fulcrum support, a fastener, and a lever. The fastener may extend through the housing, the coil, and the fulcrum support. The fastener may include an end portion configured to prevent the fulcrum support from sliding off of the fastener. The lever may be pivotally connected to the housing, and may be configured to cause the fulcrum housing to slide along the coil toward the spring when the lever is pressed against the fulcrum.

Implementations of this aspect may include one or more of the following features. The fastener may include a bolt. The fulcrum support may comprise at least two fulcrums on opposite sides of the lever.

According to another general aspect, a router table may comprise a table top and a mounting can. The table top may have an aperture and a plurality of support members configured to support the table top. The mounting can may be secured to a side of the table top which faces the plurality of support members. The mounting can may include a vacuum port configured to route air and dust from inside the mounting can to a vacuum.

According to another general aspect, a router table may comprise a table top, a fence, and a vacuum tube. The table top may have an aperture and a plurality of support members configured to support the table top. The fence may extend across the table top with a hold near a center of the fence. The vacuum tube may extend through the hole. According to an example Implementation, the vacuum tube may extend away from the fence at an angle between thirty and ninety degrees.

According to another general aspect, a router table may comprise a table top, a fence, and a pouch or dust collector attached to the fence. The table top may have an aperture and a plurality of support members configured to support the table top. The fence may extend across the table top and include a hold near a center of the fence. The dust collector may be attached to a side of the fence opposite from the aperture of the table top. The dust collector may be configured to receive dust through a hole in the fence, and may include a vacuum port on a side of the dust collector opposite from the fence.

Implementations of this aspect may include one or more of the following features. The vacuum port may extend away from the fence at an angle between thirty and sixty degrees. The fence may be configured to move toward or away from the aperture.

According to another general aspect, a router table may comprise a table top, a first vacuum port, a component including a second vacuum port, and a vacuum tube. The table top may have an aperture and a plurality of support members configured to support the table top. The first vacuum port may be near a side of the table top opposite from the plurality of support members in a vicinity of the aperture. The component may be mounted to a side of the table top facing the plurality of support members. The vacuum tube may include a first opening connected to the first vacuum port, a second opening connected to the second vacuum port, and a third opening configured to connect to a vacuum.

Implementations of this aspect may include one or more of the following features. The vacuum port may extend away from the fence at an angle between thirty and sixty degrees. The fence may be configured to move toward or away from the aperture.

BRIEF DESCRIPTION OF THE DRAWINGS

FIG. 4.1 is a perspective view of the router table showing the coarse height adjustment knob and the fine height adjustment knob according to an example embodiment.

FIG. 4.2 is a lower perspective view of the router table showing the router mounted in the mounting can, the driveshaft, the coarse height adjustment knob, and the fine height adjustment knob according to an example embodiment.

FIG. 4.3 is a front view of the router table showing the router mounted in the mounting can and a portion of the driveshaft according to an example embodiment.

FIG. 4.4 is a perspective view of the mounting can, driveshaft, coarse height adjustment knob, and fine height adjustment knob according to an example embodiment.

FIG. 4.5 is a perspective view of the driveshaft, coarse height adjustment knob, and fine height adjustment knob according to an example embodiment.

FIG. 4.6 is a perspective view of the driveshaft, coarse height adjustment knob, fine height adjustment knob, and planetary gear reduction according to an example embodiment.

FIG. 4.7 is another perspective view of the driveshaft, coarse height adjustment knob, fine height adjustment knob, and planetary gear reduction according to an example embodiment.

FIG. 6.1 is an exploded perspective view of the sleeve and two collets according to an example embodiment.

FIG. 6.2 is a perspective view of the router mounted in the sleeve according to an example embodiment.

FIG. 6.3 is another perspective view of the router mounted in the sleeve according to an example embodiment.

FIG. 6.4 is another perspective view of the router mounted in the sleeve according to an example embodiment.

FIG. 6.5 is a perspective view of the router mounted in the sleeve and two collets according to an example embodiment.

FIG. 6.6 is a perspective view of two collets according to an example embodiment.

FIG. 9.1 is a top perspective view of a portion of the insert plate, a portion of the mounting can with an aperture for receiving the throat plate, and router according to an example embodiment.

FIG. 9.2 is a lower perspective view of the mounting can showing a mechanism for securing the throat plate according to an example embodiment.

FIG. 9.3 is a side perspective view of the mounting can showing the mechanism for securing the throat plate according to an example embodiment.

FIG. 9.4 is another side perspective view of the mounting can showing the mechanism for securing the throat plate according to an example embodiment.

FIG. 9.5 is a side perspective view of the mounting can showing a clamp lock according to an example embodiment.

FIG. 9.6 is an upper side perspective view showing the throat plate engaged with the mounting can according to an example embodiment.

FIG. 9.7 is an upper perspective view showing the throat plate engaged with the mounting plate according to an example embodiment.

FIG. 9.8 is an upper side perspective view showing a user lock the throat plate into the mounting can according to an example embodiment.

FIG. 9.9 is an upper side perspective view showing the throat plate resting on the mounting can according to an example embodiment.

FIG. 17.1A is a perspective view of the fence track, fence drive shaft, fence pinion and associated gears according to an example embodiment.

FIG. 17.1B is a side view of the fence pinion and associated gears according to the example embodiment shown in FIG. 17.1A.

FIG. 17.2 is a perspective side view of a fence according to an example embodiment which includes a clamp lever.

FIG. 17.3 is a perspective view of an example embodiment of a fence which includes a measurement indicator.

FIG. 17.4 is a perspective view of the fence according to another example embodiment.

FIG. 21.1 is a perspective view of another alternative example embodiment of the clamp of FIGS. 20 and 21.

FIG. 21.2 is another perspective view of the example embodiment of the clamp shown in FIG. 21.1.

FIG. 21.3 is a perspective view showing the fence according to an example embodiment.

FIG. 24.1 is a perspective view of a router table according to another example embodiment.

FIG. 24.2 is another perspective view of the router table according to another example embodiment.

DETAILED DESCRIPTION

Figure 1:
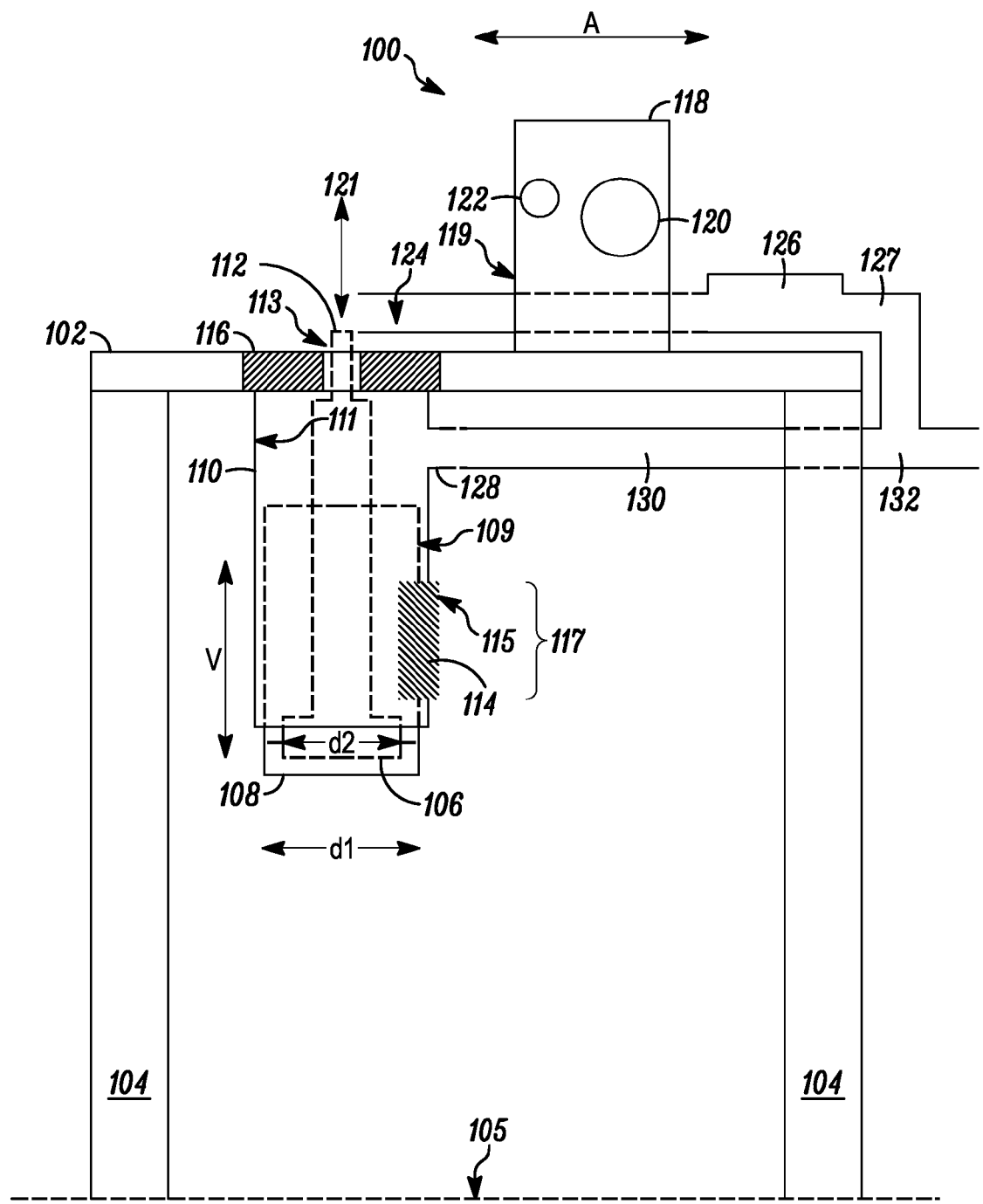
FIG. 1 is a block diagram of a side view of a router table according to an example embodiment.

FIG. 1 is a block diagram of a side view of a router table 100 according to an example embodiment. Dashed lines show cross-sectional features which may not be visible from a side view.

This router table 100 may include a table top 102 and a plurality of support members 104. The table top 102 may be configured to support a workpiece (not shown), upon which routing operations may be performed. The table top 102, for example, may be planar, with a generally flat surface which allows the workpiece to slide across the table top 102 during routing operations. In an example embodiment, the table top 102 may be rectangular; however, it is envisioned that the table top 102 may comprise other shapes, such as a circle, polygon, or virtually any other shape that would be convenient or desirable for performing routing operations.

In an example embodiment, the support members 104 may be configured to support the table top 102, such as in an elevated position above a ground surface 105. In the example embodiment shown in FIG. 1, the support members 104 support the table top 102 in a position above the ground surface 105 wherein the table top 102 is parallel to the ground surface 105.

In one example embodiment, the support members 104 may comprise a plurality, such as four, elongated members extending from a bottom surface of the table top 102, such as perpendicularly from the table top 102. In another example embodiment, the support members 104 may comprise a plurality, such as four, planar members extending from the table top 102, and an additional planar member attached to ends of the planar members opposite from the table top 102 to form a table bottom (not shown). The additional planar member may contact the ground surface 105. In this embodiment, one of the four planar members may be further divided into two planar members each hingedly attached to one of the other three planar members. This latter embodiment creates a cabinet-like structure which may be used for storage, as described below with reference to FIG. 23.

The router table 100 may be configured to mount a router 106 on the bottom surface of the table top 102. The router 106 may be mounted onto the router table 100 in such a manner as to enable the router 106 to route a workpiece lying across a top surface of the table top 102.

The router 106 may be supported by, and/or received within, a sleeve 108. In an example embodiment, the sleeve 108 may be cylindrical, with openings at both ends of the sleeve 108, and may enclose the router 106 in horizontal directions, the horizontal directions being parallel to the table top 102 and ground surface 105. However, it is envisioned that the sleeve 108 may be shaped other than cylindrically, and still enclose the router 106 in the horizontal direction. The sleeve 108, for example, may be a rectangular box or other prism with open ends. The router 106 may be secured inside the sleeve 108 by, for example, frictional engagement, or by fasteners such as bolts (not shown). The dashed lines between the router 106 and the sleeve 108 illustrate the securement of the router 106 to the sleeve 108. An inner diameter d1 of the mounting sleeve 108 may be approximately equal to an outer diameter d2 of a base (and/or other portion) of the router 106.

The sleeve 108 may enable a user to adjust the position of the router 106 in a vertical direction (denoted 'V' in FIG. 1), the vertical direction V being perpendicular to the table top 102 and the ground surface 105. The sleeve 108 may be limited to vertical movement by a mounting can 110, to which the sleeve 108 may be slidably engaged. In the example embodiment in which the sleeve 108 is cylindrical, at least a portion of the mounting can 110 may also be cylindrical. An outer circumference 109 of the sleeve 108 may be engaged to an inner circumference 111 of the mounting can 110. In another embodiment, at least a portion of the inner surface of the sleeve 108 may slide along at least a portion of the outer surface of the mounting can 110, as the sleeve 108 and router 106 move in the vertical direction V.

The sleeve 108 may accommodate different sized routers 106. The sleeve 108 may accommodate different sized routers 106 by, for example, including an insert portion (not shown) to bridge a distance between the inner diameter d1 of the mounting sleeve 108 and the outer diameter d2 of the base portion of the router 106. In another example, different sleeves 108 may be used which have the same outer circumference 109 to engage to inner circumference 111 of the mounting can 110, but have different inner diameters d1 to accommodate different outer diameters d2 of different routers 106.

In the example embodiment shown in FIG. 1, the mounting can 110 may be secured to the table top 102. The mounting can 110 may be secured to the table top 102 by fasteners, such as screws or bolts (not shown), or by frictional or rotational engagement. In these embodiments in which the mounting can 110 is secured to the table top 102, movement of the router 106 and sleeve 108 relative to the mounting can 110 translates into movement of the router 106 and the sleeve 108 relative to the table top 102, as well.

Such vertical movement of the router 106 relative to the table top 102 allows a router bit 112 of the router 106 to extend beyond the table top 102. The extension of the router bit 112 beyond the table top 102 may be adjusted by moving the position of the sleeve 108 and router 106. Thus, it will be appreciated that a user may adjust the depth of routing by the router bit 112 into the workpiece by adjusting the position of the router 106 and the sleeve 108, or, similarly, the user may retract the router bit 112 below a surface of the table top 102, such as when the router table 102 is not currently being used.

The sleeve 108 may be configured to receive the router 106 and position the router bit 112 along an axis 121 extending through an aperture 113 of the table top 102. An adjustment mechanism 117 may be configured to move the sleeve 108 within the mounting can 110 and relative to the table top 102 to thereby move the router 106 along the axis 121 and position the router bit 112 at one of a plurality of positions relative to the table top 102.

The adjustment mechanism 117 may adjust the position of the router 106 and sleeve 108 using, for example, a geared mechanism such as a rack and pinion mechanism or a lever mechanism. In the example embodiment shown in FIG. 1, the sleeve 108 is associated with a rack gear 114 which may extend through a slot 115 of the mounting can 110 and allow the position of the sleeve 108 to be adjusted by a geared mechanism, as discussed with reference to FIGS. 3-6. An embodiment in which the adjustment mechanism 117 includes a lever mechanism is discussed with reference to FIG. 7. The adjustment mechanism 117 may allow a user to adjust the router bit 112 without remounting the router 106 to the router table 100.

The table top 102 may include an insert plate 116 which facilitates the extension of the router bit 112 through the table top 102. The insert plate 116 may be a separate component from the mounting can 110. The mounting can 110 may be connected to the insert plate 116 by, for example, frictional or rotational engagement of tabs, a threaded securement mechanism, or bolts, which may facilitate quick insertion and removal of the router 106. The insert plate 116 and associated components are discussed with reference to FIGS. 8-12. These components may facilitate quick mounting of the router 106 to the router table 100.

Figure 2:
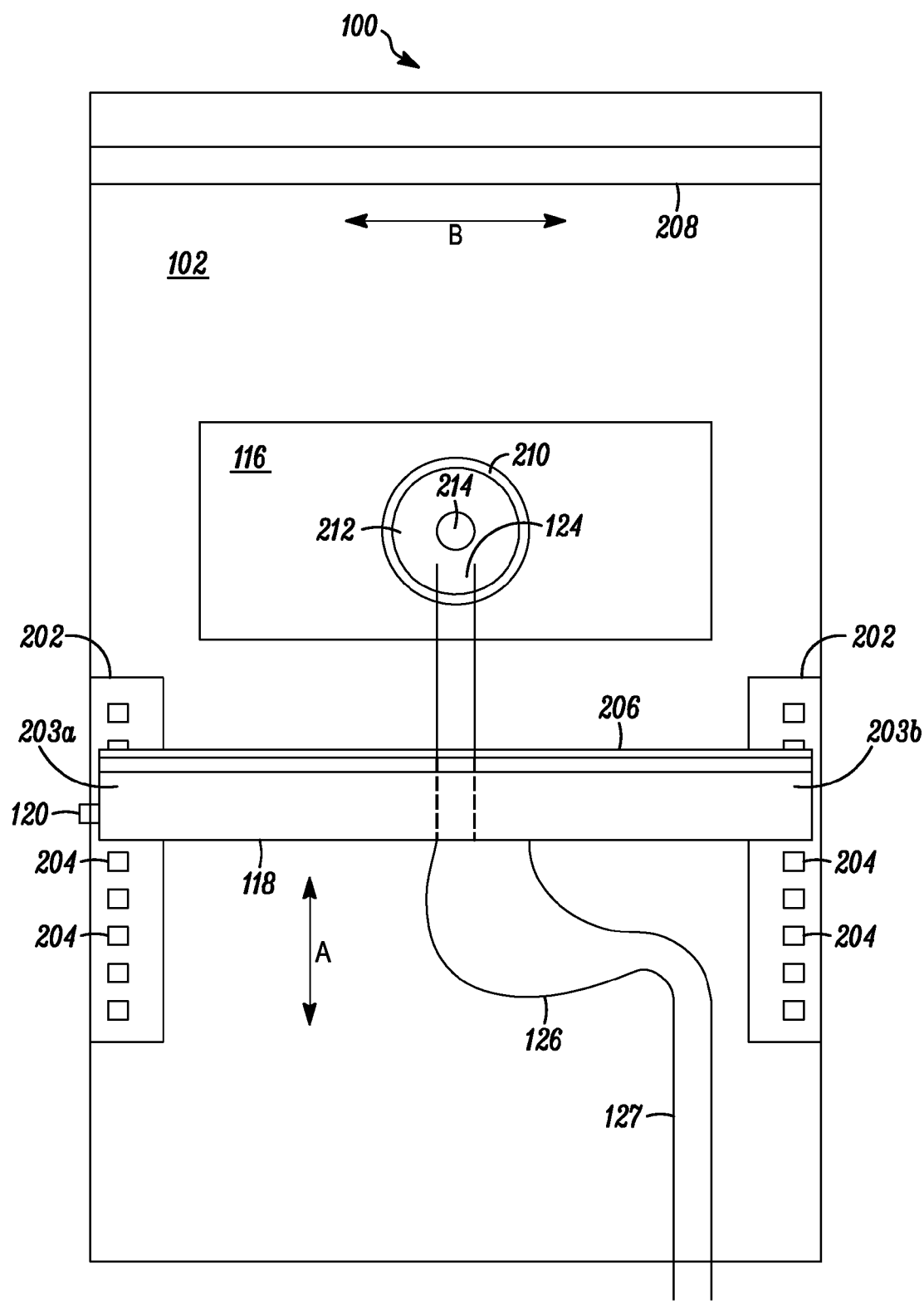
FIG. 2 is a block diagram of a top view of the router table of FIG. 1, according to an example embodiment.
Figure 14:
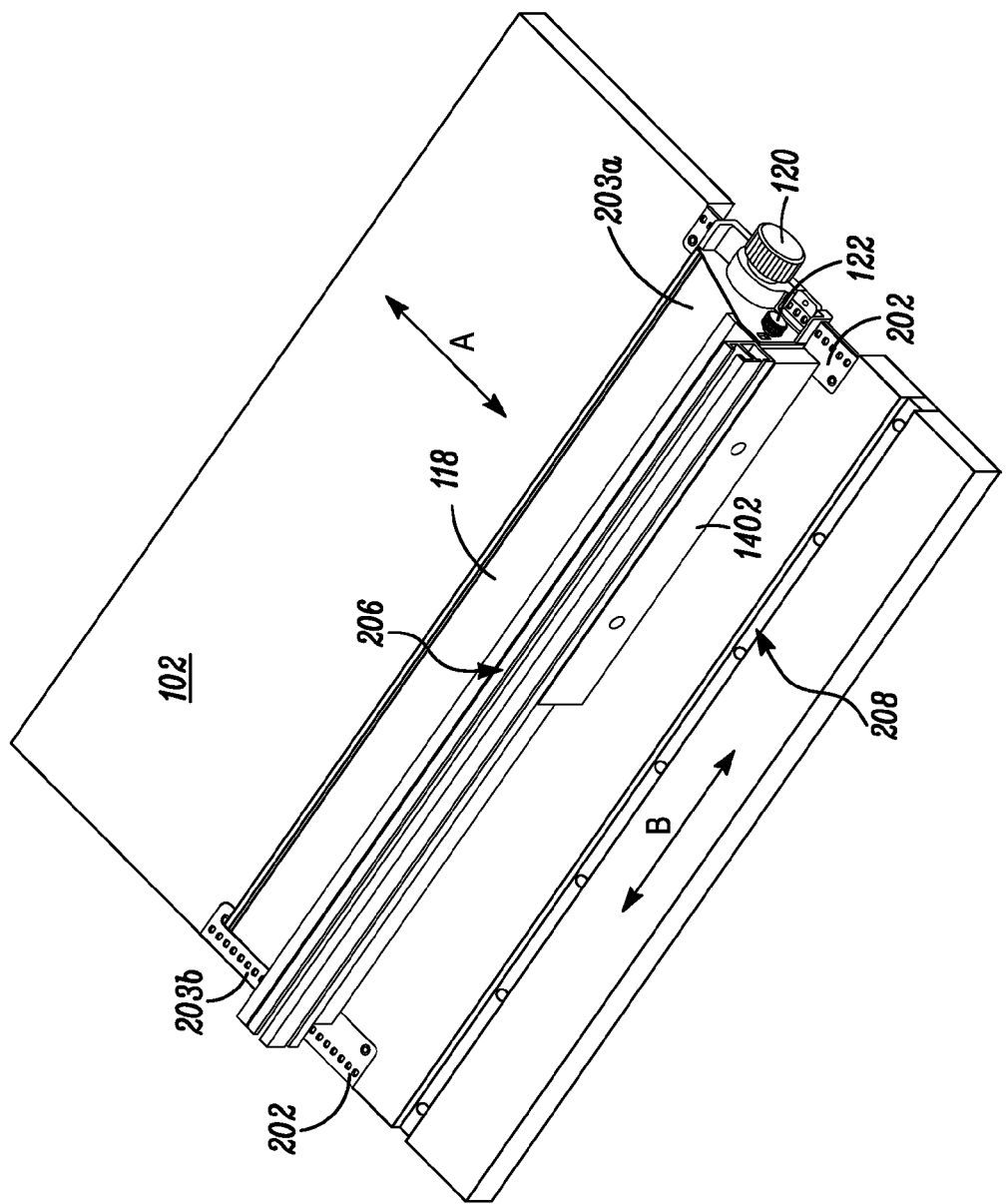
FIG. 14 is a top perspective view of the table top and fence according to an example embodiment.
Figure 16:
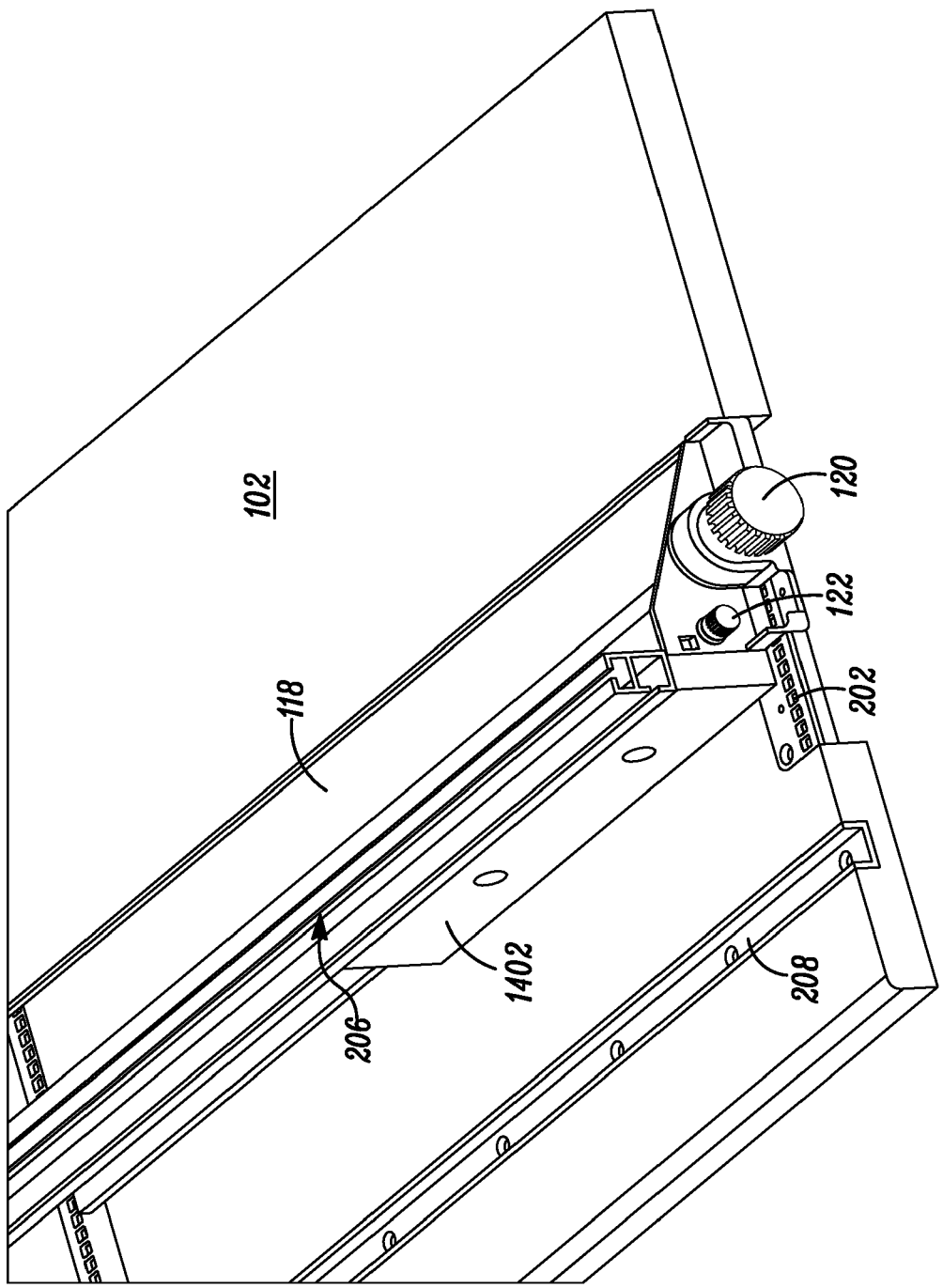
FIG. 16 is an upper side perspective view of the fence according to an example embodiment.

The router table 100 may include a fence 118 which may be used to align the workpiece across the table top 102. The fence 118 may be elongated and extend across all or a portion of the table top 102, as shown in FIGS. 2, 14, and 16. The fence 118 may include a front surface 119 which faces toward the insert plate 116. The front surface 119 may be generally flat, and may lie along a plane perpendicular to the plane of the table top 102. In use, the workpiece may lie flush against the front surface 119 while routing operations are performed on the workpiece using the router bit 112.

The fence 118 may be configured to move in a forward or reverse direction (denoted 'A' in FIG. 1), which is perpendicular to a lengthwise direction of the fence 118, toward or away from the router bit 112. Moving the fence 118 along direction A may adjust the position in the workpiece at which the router bit 112 routes the workpiece. The fence 118 may include an adjustment knob 120 which is configured to translate rotational movement of the adjustment knob 120 into forward or reverse movement of the fence 118 along direction A. The adjustment knob 120 may include a coarse adjustment feature and a fine adjustment feature, and is discussed further with reference to FIGS. 14-17.

The front surface 119 of the fence 118 may include one or more subfences (not shown in FIG. 1), which may cause portions of the front surface 119 to be independently adjustable. The fence 118 may include a subfence adjustment knob 122 which is configured to move the subfence(s) along direction A by, for example, translating rotational movement of the subfence adjustment knob 122 into movement of the subfence(s) along direction A. The subfence adjustment knob 122 and the subfences themselves are illustrated and discussed, for example, with reference to FIGS. 17 and 18(A,B).

The router table 100 may include a fence vacuum port 124 which is configured to receive dust particles created by the routing of the workpiece by the router bit 112. The fence vacuum port 124 may, for example, be cylindrical, and may extend through a hole in the fence 118 to allow dust particles to be vacuumed from one side of the fence 118 to the other side of the fence 118. A fence dust collector 126 may be attached to the fence vacuum port 124 on the side of the fence 118 opposite from the router bit 112. The fence dust collector 126 may include a table top vacuum port 127 configured to attach to a vacuum (not shown). The fence dust collector 126 is discussed further with reference to FIGS. 13A and 13B.

The mounting can 110 may include a mounting can vacuum port 128 configured to attach to a vacuum tube 130. The vacuum tube 130 may be part of, or may be configured to attach to, the vacuum. In various embodiments, the fence vacuum port 124 and the mounting can vacuum port 128, and corresponding vacuum-related elements of FIG. 1, or other vacuum-related elements, may be used together or separately. In the example embodiment shown in FIG. 1, the table top vacuum port 127 and the vacuum tube 130 may join together in a Y-joint or vacuum joint 132, which enables one vacuum to remove dust particles from both the table top 102 and the mounting can 110. The mounting can vacuum port 128 is discussed further with reference to FIGS. 3-5. Embodiments of these structures may enable a user to vacuum dust particles from above the table top 102, below the table top 102, or from both above and below the table top 102.

FIG. 2 is a block diagram of a top view of the router table 100 according to another example embodiment. In this example, the router table 100 includes a plurality perpendicular to a lengthwise direction of the fence 118. A first end portion 203a and a second end portion 203b of the fence 118 lie along each of the tracks 202. In an example embodiment, the tracks 202 are configured to allow the fence 118 to move forward and backward along direction A. In this example, the fence 118 and tracks 202 are configured so that the two end portions 203a, 203b move along the tracks 202 in tandem, causing the fence 118 to maintain the same angle relative to the table top 102 and direction A.

The tracks 202 may each include a plurality of slots 204. The fence 118 may include pinions (not shown in FIG. 2) which engage the slots 204. The fence adjustment knob 120 may drive the pinions and cause the fence 118 to move along the tracks 202. These mechanisms are discussed further with reference to FIGS. 14-17.

The fence 118 may also include one or more accessory slots 206. The accessory slots 206 may extend the entire length or a portion of the fence 118. The accessory slots 206 may include flanges configured to secure accessories to the accessory slots 206. Accessories which may be secured to the accessory slots 206 may include, for example, a drill, sander, or any tool which may complement operations of a router.

The router table 100 may also include an accessory gauge slot 208 extending across the table top 102 along direction B, which is perpendicular to direction A, along a portion of the table top 102 which is on an opposite side of the insert plate 116 than the fence 118. The accessory gauge slot 208 may be used to attach, position, and/or guide accessories such as, for example, a miter gauge (not shown).

The insert plate 116 may rest in a recessed portion of the table top 102. In the example embodiment shown in FIG. 2, the insert plate 116 is rectangular in shape. However, other shapes are envisioned, such as, for example, another polygon, a circle, or an oval. In the embodiment shown in FIG. 2, a mounting plate 210 is secured to a bottom of the insert plate 116, and is partially viewable in FIG. 2 through an aperture within the insert plate. Also in FIG. 2, a throat plate 212 is secured to the mounting plate 210. The throat plate 212 includes a throat 214 or hole through which the router bit 112 (shown in FIG. 1) may extend. These components are discussed further with reference to FIGS. 8-11.

Figure 3:
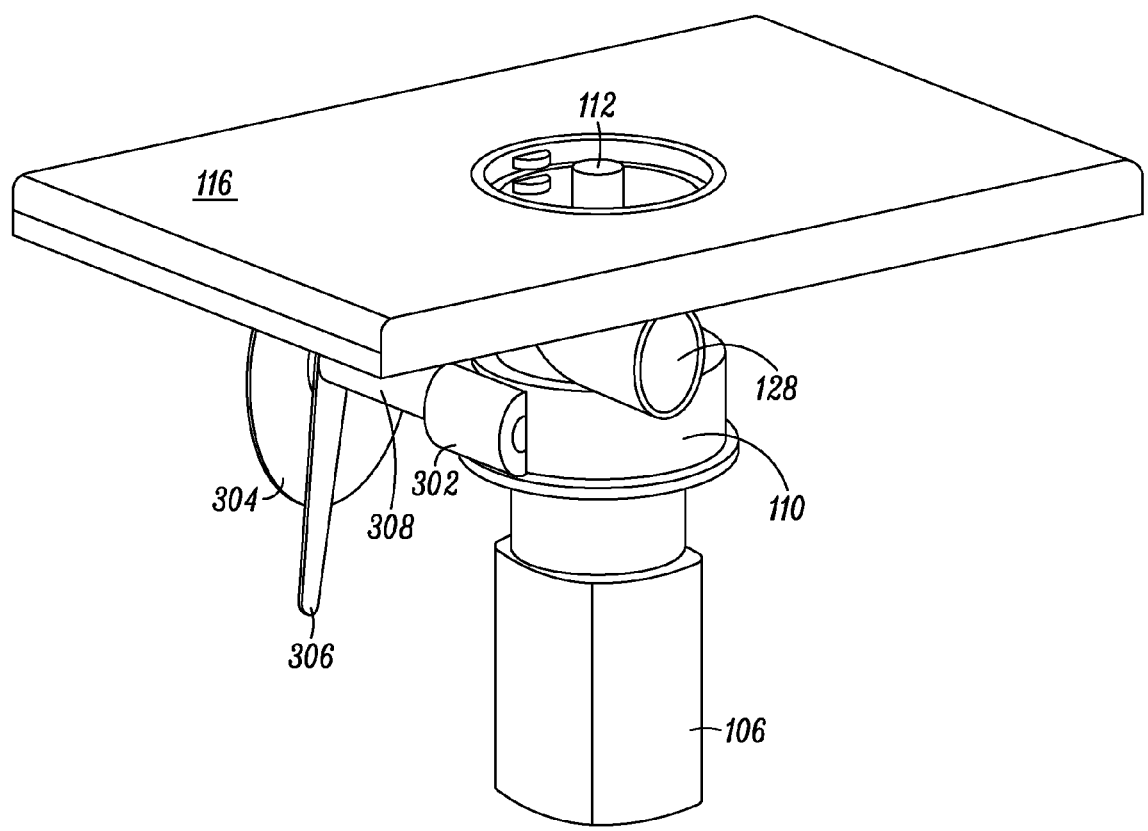
FIG. 3 is a side perspective view of a mounting can, sleeve, and table top, according to an example embodiment.

FIG. 3 is a side perspective view of the mounting can 110, sleeve 108, and insert plate 116 according to an example embodiment. In this embodiment, the mounting can vacuum port 128 extends in a horizontal direction from the mounting can 108. The router bit 112 extends through a hole in the insert plate 116.

The embodiment shown in FIG. 3 includes a height adjustment mechanism, as an example of the adjustment mechanism 117 of FIG. 1, which may be configured to elevate the router 106 with respect to the table top 102. In this example embodiment, the height adjustment mechanism includes a pinion 302 configured to engage the rack gear 114 (not shown) and thereby adjust the height of the sleeve 108.

This example embodiment further includes a coarse height adjustment knob 304, which comprises a disk which may be rotated by a user's hand. The height adjustment mechanism is configured to translate rotation of the coarse height adjustment knob 304 into rotation of the pinion 302, which then moves along the rack gear 114 and thereby adjusts the height of the sleeve 108 (and the router 106) within the mounting can 110. The coarse height adjustment knob 304 may, for example, be directly coupled to the pinion 302.

The height adjustment mechanism may further include a pinion lock 306, in an example embodiment. In this example, the pinion lock 306 may be configured to lock the coarse height adjustment knob 304 in place, which may prevent the pinion 302 from rotating and thereby may prevent the sleeve 106 from moving.

The example embodiment shown in FIG. 3 also includes a drive shaft 308. The drive shaft 308 may be an elongated member, such as a cylinder, connected to both the pinion 302 and the coarse height adjustment knob 304. The drive shaft 308 may translate the rotation of the coarse height adjustment knob 304 into rotation of the pinion 302, and described in more detail, below.

Figure 4:
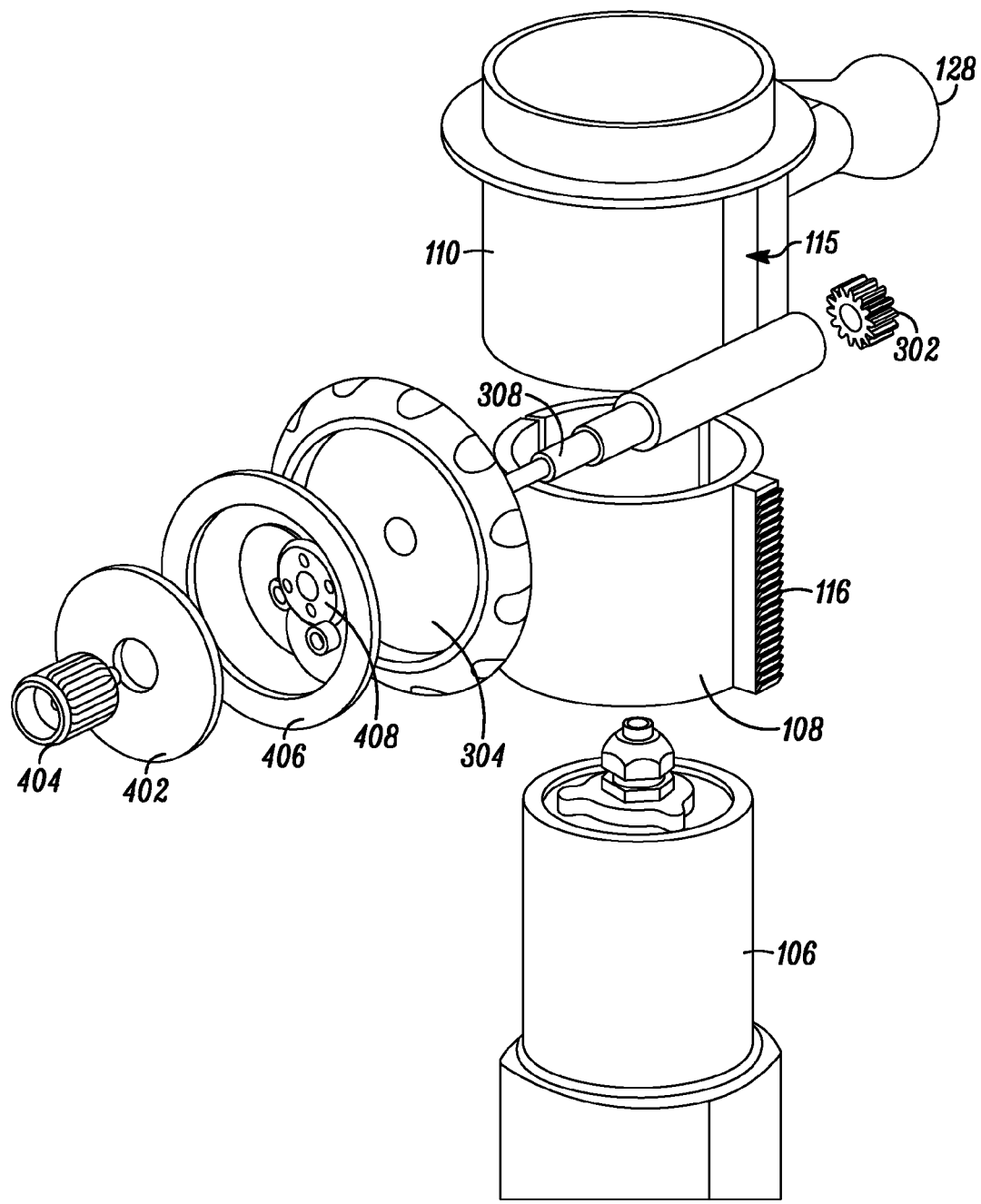
FIG. 4 is an exploded perspective view of the router, sleeve, mounting can, and a height adjustment mechanism according to an example embodiment.
Figure 5:
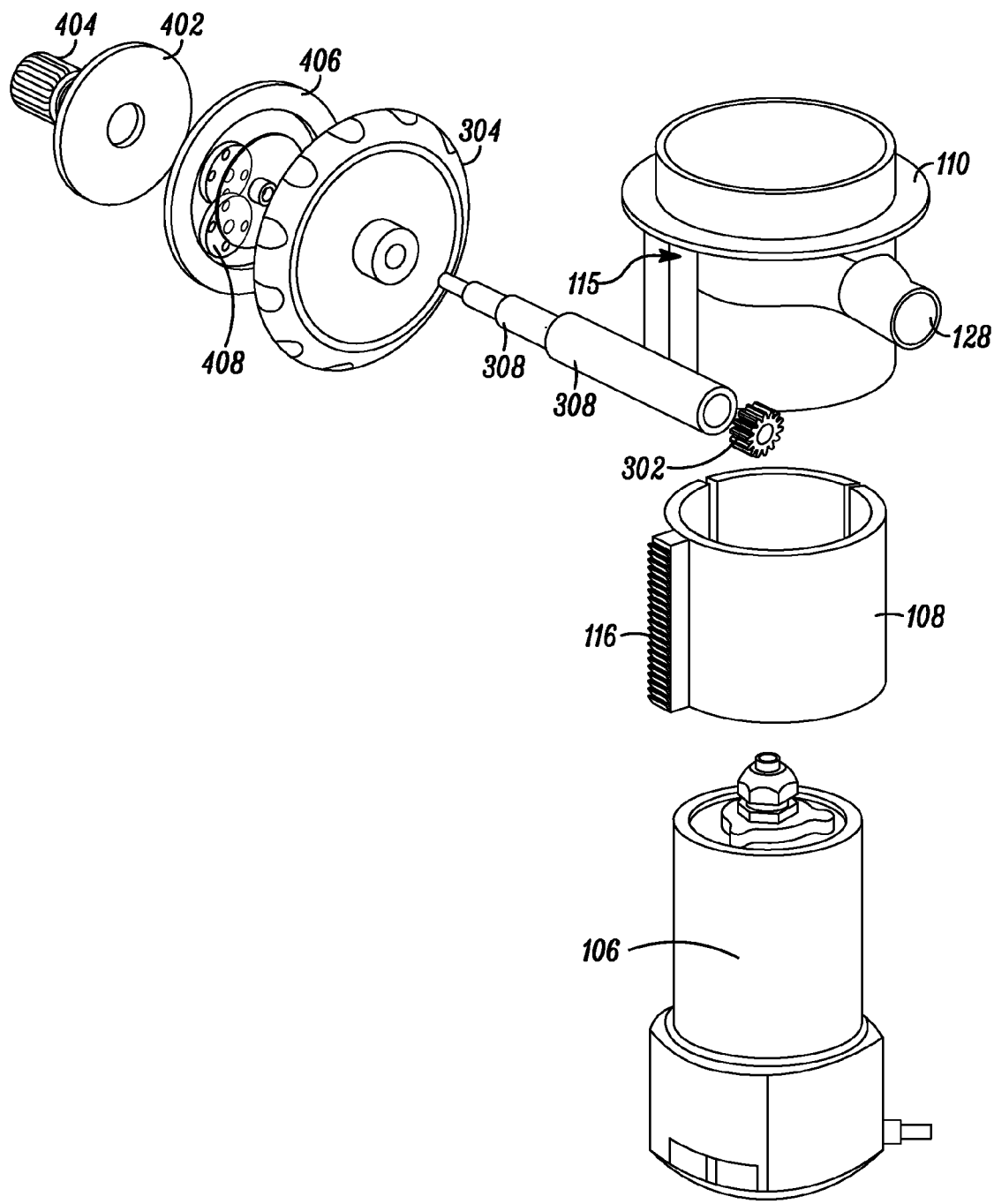
FIG. 5 is another exploded perspective view of the router, sleeve, mounting can, and height adjustment mechanism according to an example embodiment.
Figure 6:
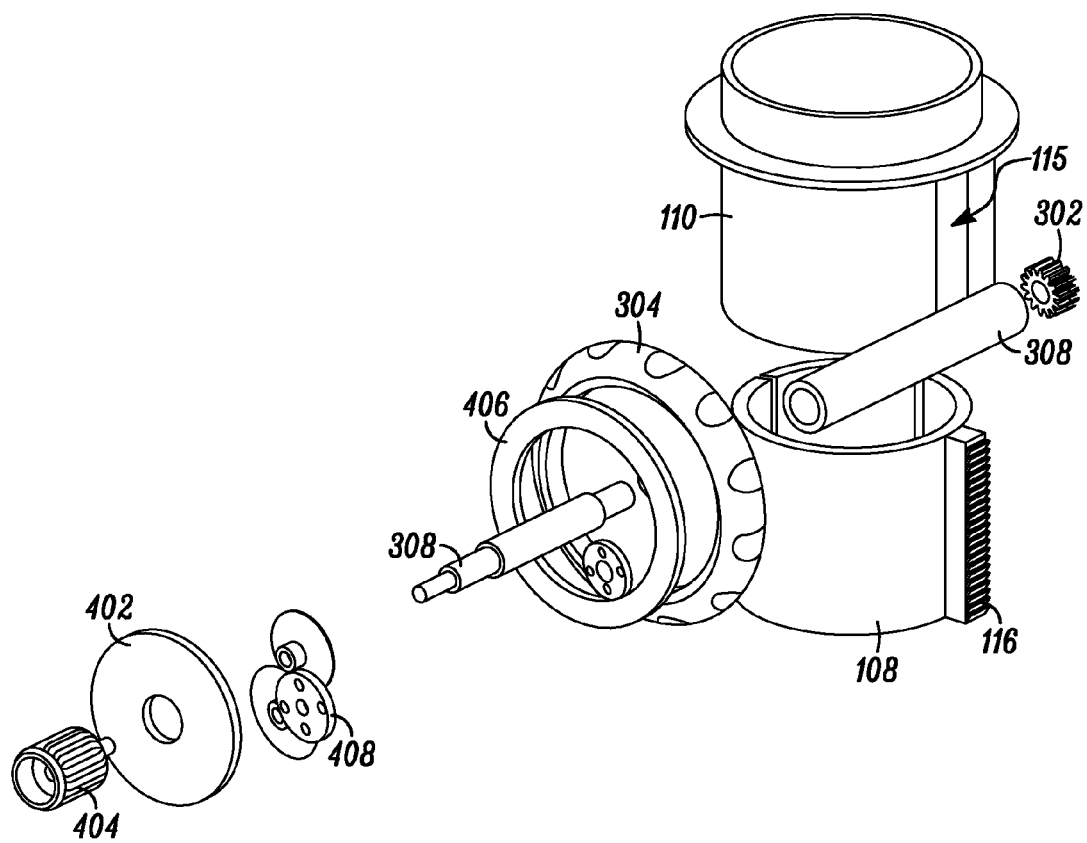
FIG. 6 is an exploded perspective view of the sleeve, mounting can, and height adjustment mechanism according to an example embodiment.

FIGS. 4, 5, and 6 show exploded perspective views of the router 106, sleeve 108, mounting can 110, and a height adjustment mechanism according to an example embodiment. This view shows the mounting can 110, sleeve 108, and router 106, prior to the mounting can 110 and router 106 being received by the sleeve 108.

The views of FIGS. 4, 5, and 6 also show an embodiment of the height adjustment mechanism in greater detail than the view shown in FIG. 3. This embodiment includes the coarse adjustment knob 304 which translates rotation to the pinion 302 through the drive shaft 308. Additionally, this embodiment may include a measurement indicator 402. The measurement indicator 402 may be disk-shaped and may be placed over the coarse adjustment knob 304. The measurement indicator 402 may include indicia (not shown) of rotation angles of the coarse adjustment knob 304, or may include indicia indicating the extension of the router bit 112 (not shown) beyond the table top 102 (not shown) based on the rotations of the coarse adjustment knob 304 and pinion 302.

The height adjustment mechanism may also include a fine height adjustment knob 404. The fine height adjustment knob 404 may spin freely on the pinion 302, and may be configured to cause the pinion 302 to move in smaller increments than the coarse height adjustment knob 304. For example, the fine height adjustment knob 404 may be configured to cause the pinion 302 and coarse height adjustment knob 304 to rotate once for every ten rotations of the fine height adjustment knob 404.

The height adjustment mechanism may further include a sun gear 406. The sun gear 406 may comprise a disk sandwiched between the coarse height adjustment knob 304 and the measurement indicator 402, and may create a recess between the coarse height knob and the measurement indicator 402 in which a planetary gear reduction 408 may reside. The planetary gear reduction 408 may be bolted to the coarse height adjustment knob 304, and may include a plurality of gears configured to translate rotation of the fine height adjustment knob 404 into rotation of the coarse height adjustment knob 304. The planetary gear reduction 408 may cause the coarse adjustment knob 304 to rotate less than once for every rotation of the fine height adjustment knob 404, such as, for example, causing the coarse height adjustment knob 304 to rotate once for every twenty rotations of the fine height adjustment knob 404.

FIG. 4.1 is a perspective view of the router table 100 showing the coarse height adjustment knob 304 and the fine height adjustment knob 404 according to an example embodiment.

FIG. 4.2 is a lower perspective view of the router table 100 showing the router 106 mounted in the mounting can 110, the driveshaft 308, the coarse height adjustment knob 304, and the fine height adjustment knob 404 according to an example embodiment.

FIG. 4.3 is a front view of the router table 100 showing the router 106 mounted in the mounting can 110 and a portion of the driveshaft 308 according to an example embodiment.

FIG. 4.4 is a perspective view of the mounting can 110, driveshaft 308, coarse height adjustment knob 304, and fine height adjustment knob 404 according to an example embodiment.

FIG. 4.5 is a perspective view of the driveshaft 308, coarse height adjustment knob 304, and fine height adjustment knob 404 according to an example embodiment.

FIGS. 4.6 and 4.7 are perspective views of the driveshaft 308, coarse height adjustment knob 304, fine height adjustment 404, and planetary gear reduction 408 according to an example embodiment.

FIG. 6.1 is an exploded perspective view of the sleeve 108 and two collets 602 according to an example embodiment. The collets 602 may be ring-shaped and configured to receive a router 106 (not shown). In this example embodiment, different sized collets 602 may be used to mount different sized routers 106 to the sleeve 108.

The collets 602 may be tapered to match a taper of the sleeve 108. Differently sized collets 602 may each have the same outside diameter to match the sleeve 108, but may have different inside diameters to accommodate different sized routers.

Each collet 602 may include a plurality of, such as three, apertures 604 for receiving fasteners (not shown). The apertures 604 may be shaped to receive fasteners, such as screws or bolts, which may extend through the collet 604 and into the sleeve 108, thereby securing the collet 604 to the sleeve 108. In the example embodiment shown in FIG. 6.1, the fasteners may each extend through one collet 604, through the sleeve 108, and through the collet 604 on the opposite side of the sleeve 108. In this example embodiment, the fasteners exert equal and balanced pressure on each of the collets 604 because the fasteners are directly coupled to each of the collets 604 instead of the sleeve 108.

The collets 602 may each include a compression aperture 606. The compression aperture 606 be a space between ends of each collet 602, in which example the collets 602 are not fully circular. The compression aperture 606 enables the collet 602 to adjust its radius slightly to accommodate the router 106 by compression of the collet.

FIGS. 6.2-6.4 are perspective views of the router 106 mounted in the sleeve 108 according to an example embodiment. These perspective views show the collets 602 secured to the sleeve 108 by fasteners 608.

FIG. 6.5 is a perspective view of the router 106 mounted in the sleeve and two collets 602 according to an example embodiment. These collets 602 may be used to accommodate a different sized router 106 than that shown in FIG. 6.5.

FIG. 6.6 is a perspective view of two collets according to an example embodiment.

Figure 7:
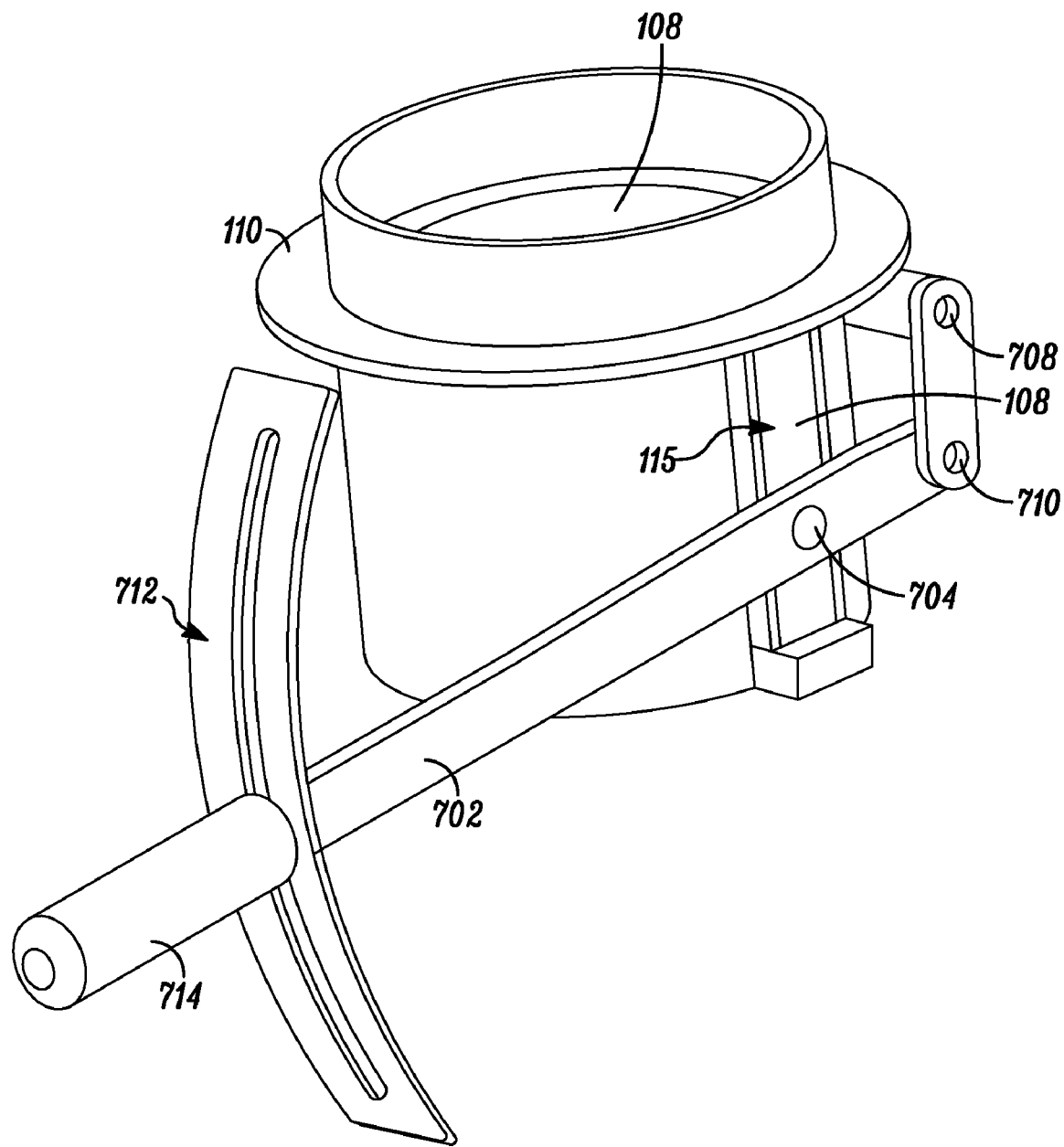
FIG. 7 is a perspective view of a sleeve and mounting can using a lever as the height adjustment mechanism according to an example embodiment.

FIG. 7 is a perspective view of a sleeve 108 and mounting can 110 using a lever 702 as the height adjustment mechanism 117 according to an example embodiment. In this embodiment, the lever 702 is pivotally connected to the sleeve 108 at a fulcrum point 704 through the slot 115 in the mounting can 110. The slot 115 in the mounting can 110 allows the fulcrum point 704, and hence the sleeve 108, to move vertically within the mounting can 110. The lever 702 may be pivotally connected to the mounting can 110 at a pivot point 708. The pivot point 708 may allow the lever 702 to rotate with respect to the mounting can 110. A lever joint 710 between the fulcrum point 704 and the pivot point 708 may allow the lever 702 to bend, enabling the fulcrum point 704 to move vertically within the slot 115 while the lever 702 rotates with respect to the lever joint 710 and/or the pivot point 708.

The height adjustment mechanism may include a lever slot 712 through which the lever 702 extends. The lever slot 712 may be curved to correspond to the rotation of the lever 702. The lever slot 712 may have a limited length to prevent the lever 702 from exceeding a desired angle of rotation.

The lever 702 may include a handle 714 on a side of the lever slot 712 opposite from the mounting can 110. The handle 714 may have a diameter greater than a width of the lever slot 712 to prevent the handle 714 from moving horizontally through the lever slot 712, protecting a user's fingers. The handle 714 may include a locking mechanism to lock the lever 702 in place with respect to the lever slot 712. For example, the handle 714 may include a trigger (not shown) configured to lock the handle 714 to material surrounding the slot. In another embodiment, the handle 714 may be rotationally adjustable to tighten the handle 714 against the material surrounding the lever slot 712.

Figure 8:
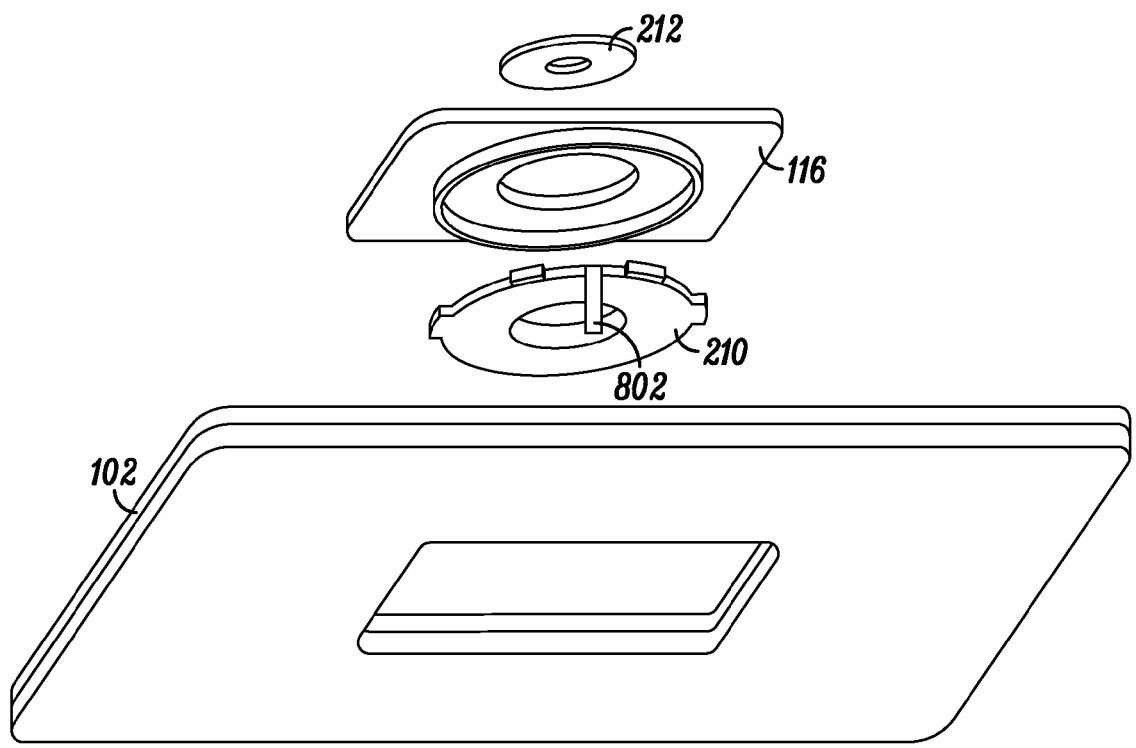
FIG. 8 is a lower side exploded perspective view of an alternate embodiment of the table top of FIG. 1, including an insert plate, mounting plate, and throat plate, according to an example embodiment.

FIG. 8 is a lower side exploded perspective view of the table top 102, insert plate 116, mounting plate 210, and throat plate 212 according to an example embodiment. In this embodiment, the table top 102 is configured to receive the insert plate 116. The mounting plate 210 is configured to be secured to the insert plate 116, such as by frictional engagement. The throat plate 212 may be configured to be secured to the mounting plate 210 by a pair of tabs, as discussed with reference to FIG. 9. One of the tabs, which is shown in FIG. 8, may be a release tab 802. The release tab 802 may be spring-loaded, and may include a trigger which enables a user to release the throat plate 212 by pulling the trigger.

Figure 9:
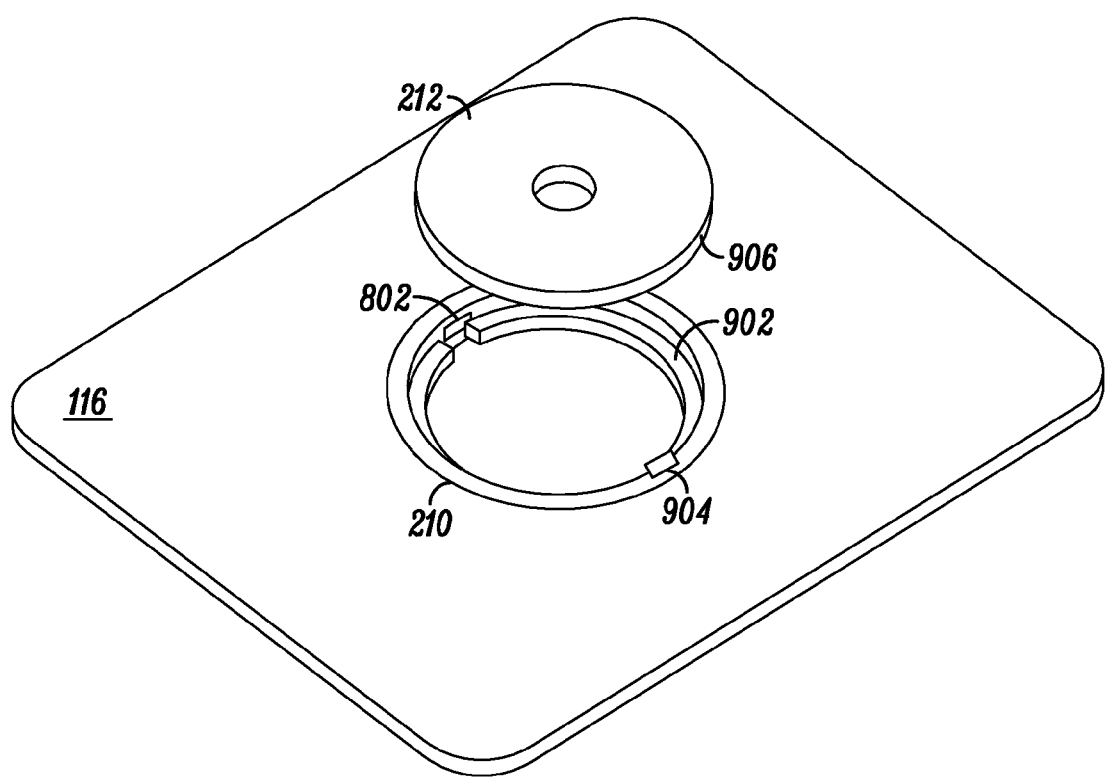
FIG. 9 is an upper side perspective view of the insert plate, mounting plate, and throat plate according to an example embodiment.

FIG. 9 is an upper side perspective view of the insert plate 116, mounting plate 210, and throat plate 212 according to an example embodiment. In the embodiment shown in FIG. 9, the mounting plate 210 includes concentric apertures which form a mounting shelf 902. The mounting shelf 902 may comprise one or a plurality of flanges extending inwardly from the mounting plate 210 in a circular or semi-circular manner. The mounting shelf 902 may be configured to allow the throat plate 212 to rest on the mounting shelf 902 with a top surface of the throat plate 212 even with a top surface of the insert plate 116.

The mounting plate 210 may include one or more fixed tabs 904 extending inwardly from the mounting plate 210. The fixed tab(s) 904 may be on a side of the mounting plate 210 opposite from the release tab 802. In some embodiments, the fixed tab(s) 904 may not be fixed, and may include a trigger or other mechanism enabling a user to pull the fixed tab(s) 904 outward.

The throat plate 212 may include a groove 906 extending around a perimeter of the throat plate 212. The groove 906 may be configured to receive the fixed tab(s) and the release tab 802. For example, a user may mount the throat plate 212 onto the mounting plate 210 by holding the release tab 802 back, sliding the fixed tab(s) 904 into the groove 906, laying the throat plate 212 along the mounting shelf 902, and releasing the release tab 802 to allow the release tab 802 to enter and engage the groove 906. The release tab 802 may apply pressure to the groove 906 of the throat plate 212 to its spring-loaded mechanism. This pressure on the groove 906 of the throat plate 212 may lock the throat plate 212 in place and prevent the throat plate 212 from rattling.

In an example embodiment, the groove 906 may include a flat spot or depression (not shown). The release tab 802 may engage the flat spot or depression and prevent the throat plate 212 from rotating.

The throat plate 212 may be removed from the mounting plate 210 by pulling the release tab 802 back so that the release tab 802 exits the groove 906, and pulling the throat plate 212 away from the fixed tab 904.

FIG. 9.1 is a top perspective view of a portion of the insert plate 116, a portion of the mounting can 110 with an aperture for receiving the throat plate 212 (not shown), and a portion of the router 106 according to an example embodiment. In this embodiment, the throat plate 212 may be mounted directly to the mounting can 110 without the mounting plate 210 (not shown).

FIG. 9.2 is a lower perspective view of the mounting can 110 showing a mechanism for securing the throat plate 212 (not shown) according to an example embodiment.

FIGS. 9.3 and 9.4 are side perspective views of the mounting can 110 showing the mechanism for securing the throat plate 212 (not shown) according to an example embodiment.

FIG. 9.5 is a side perspective view of the mounting can 110 showing a clamp lock according to an example embodiment.

FIGS. 9.6 and 9.7 are upper side perspective views showing the throat plate 212 engaged with the mounting can 110 according to an example embodiment.

FIG. 9.7 is an upper perspective view showing the throat plate 212 engaged with the mounting can 110 according to an example embodiment.

FIG. 9.8 is an upper side perspective view showing a user lock the throat plate 212 into the mounting can 110 according to an example embodiment.

FIG. 9.9 is an upper side perspective view showing the throat plate 212 resting on the mounting can 110 according to an example embodiment.

In the example embodiment shown in FIGS. 9.2-9.9, the throat plate 212 may be mounted directly to the mounting can 110 without the mounting plate 210 (not shown). The mounting can 110 may also be secured directly to the insert plate 116 (not shown) without the mounting plate 210.

Figure 10:
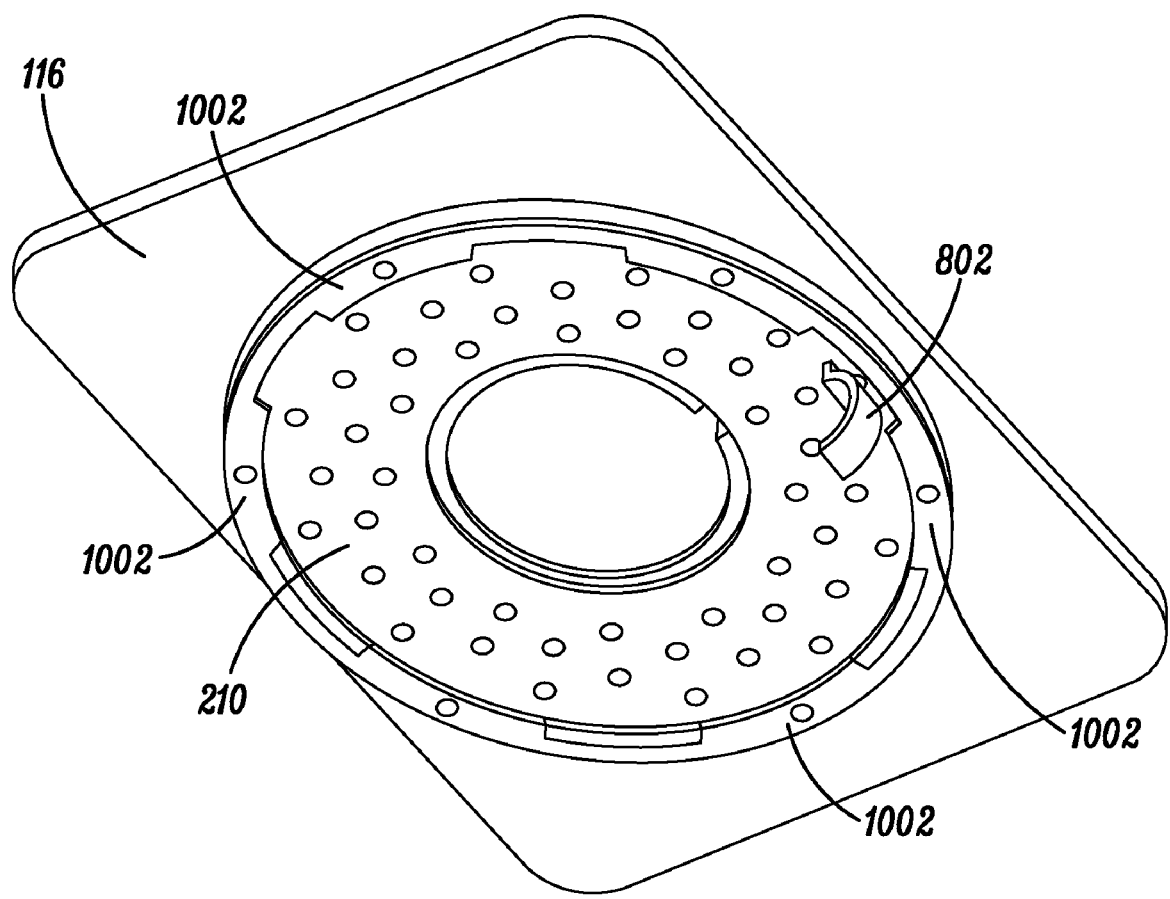
FIG. 10 is a lower perspective view of the insert plate and mounting plate according to an example embodiment.
Figure 11:
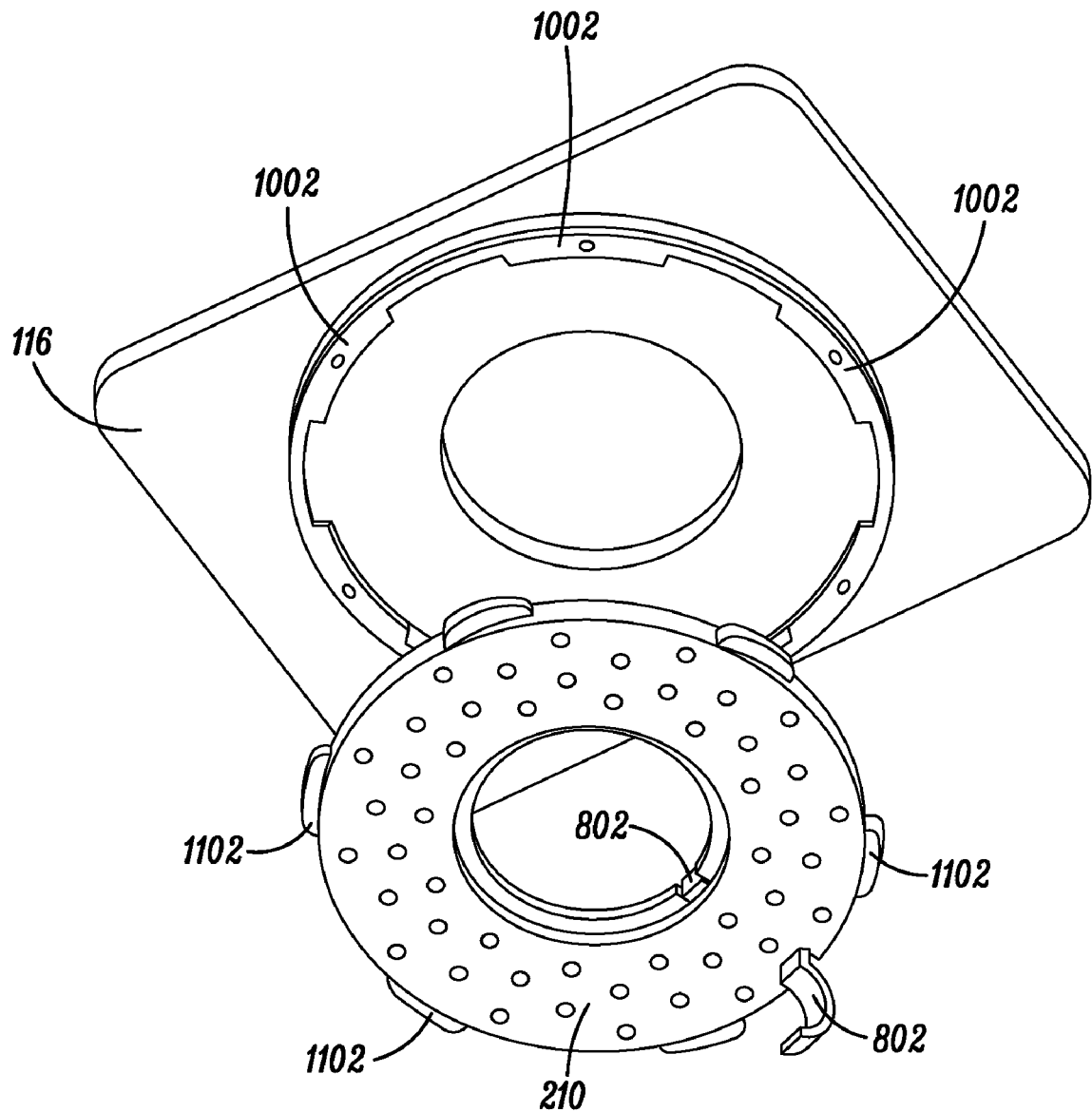
FIG. 11 is a lower exploded perspective view of the insert plate and mounting plate according to an example embodiment.

FIG. 10 is a lower perspective view of the insert plate 116 and mounting plate 210 according to an example embodiment. In this example embodiment, the insert plate 116 includes a plurality of insert plate tabs 1002 arranged in a circular manner. The plurality of insert plate tabs 1002 may be located on a bottom portion of the insert plate 116, and may extend in a generally horizontal direction toward a center of the insert plate 116. The plurality of insert plate tabs 1002 may be configured to receive and support the mounting plate 210 by frictional engagement, in an example embodiment.

FIG. 11I is a lower exploded perspective view of the insert plate 116 and mounting plate 210 according to an example embodiment. In this example, the mounting plate 210 includes a plurality of mounting plate tabs 102. The mounting plate tabs 102 may extend outwardly from the mounting plate 210 in a direction which is generally parallel to the plane of the mounting plate 210. The mounting plate tabs 102 may, however, be angled away from this plane in such a manner that one end of each of the mounting plate tabs 1102 extends toward one side of the plane and the other end of each of the mounting plate tabs 1102 extends toward the other side of the plane. The mounting plate tabs 1102 may be configured to frictionally engage the insert plate tabs 1002 of the insert plate 116, which may also be angled.

The mounting plate tabs 1102 may be configured to mate with the insert plate tabs 1002. In an example embodiment, the mounting plate 210 may be rotationally mounted to the insert plate 116.

In an example embodiment, the mounting plate 210 may include a plurality of mounting holes (not shown) configured to mount various routers 106 to the mounting plate 210 by passing fasteners such as bolts through the mounting holes in the mounting plate 210. Different routers 106 may have fasteners in different positions; the mounting plate 210 may have a plurality of mounting holes configured to receive fasteners from a plurality of different router 106 types.

In another example embodiment, the mounting plate 210 may not include mounting holes. The mounting plate 210 may include mounting markings (not shown) on the mounting plate 210 or on a clear plastic overlay (not shown) configured to guide a user to drill mounting holes corresponding to fasteners of the router 106. The mounting markings may, for example, be coded by various symbols or colors to guide a user in drilling only the mounting holes needed for the router 106 he intends to mount to the mounting plate 210.

Figure 12:
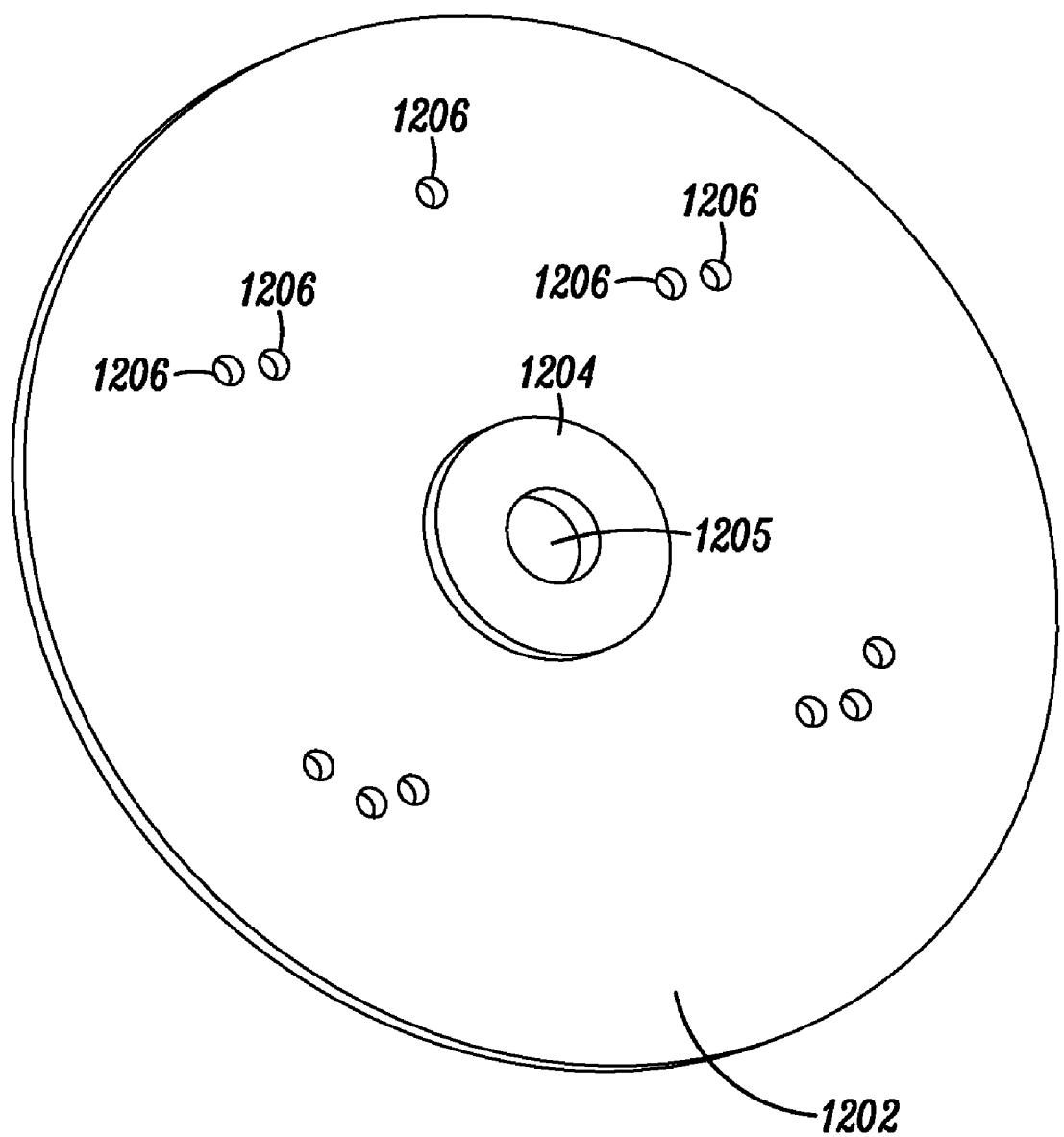
FIG. 12 is a perspective view of a router marking plate according to an example embodiment.

FIG. 12 is a perspective view of a router marking plate 1202 according to an example embodiment. This example embodiment of the router marking plate 1202 may be used with an embodiment of the mounting plate 210 which does not include mounting holes or mounting markers.

The router marking plate 1202 may be disk-shaped, and may comprise a soft material such as plastic, or may be made of metal or other rigid material. The router marking plate 1202 may include a fitting circle 1204 near a center of the router marking plate 1202 which extends in a direction perpendicular to a plane of the router marking plate 1202 and is shaped to be received by the throat 214 of the throat plate 212. The fitting circle 1204 may include an aperture 1205 through which the router bit 112 may extend when the router marking plate 1202 rests on the throat plate 212.

The router marking plate 1202 may also include a plurality of mounting holes 1206. The mounting holes 1206 may extend through the router marking plate 1202 and may be configured to receive fasteners such as bolts or screws (not shown). The mounting holes 1206 may serve to guide the mounting of the router 106 to the mounting plate 210 in embodiments which secure the router 106 to the mounting plate 210 or another component of the table top 102. The mounting holes 1206 may serve as guides for the fasteners for ease of installation of the router 106. Or, the mounting holes 1206 may serve as guides to enable a user to drill holes in locations on the mounting plate 210 corresponding to fasteners such as bolts attached to the router 106. For example, in an embodiment in which the mounting plate 210 does not have holes shaped to receive fasteners such as bolts, a user may use the router marking plate 1202 as a guide to drill holes in the mounting plate 210 which correspond to the fasteners of the router 106.

Figure 13A:
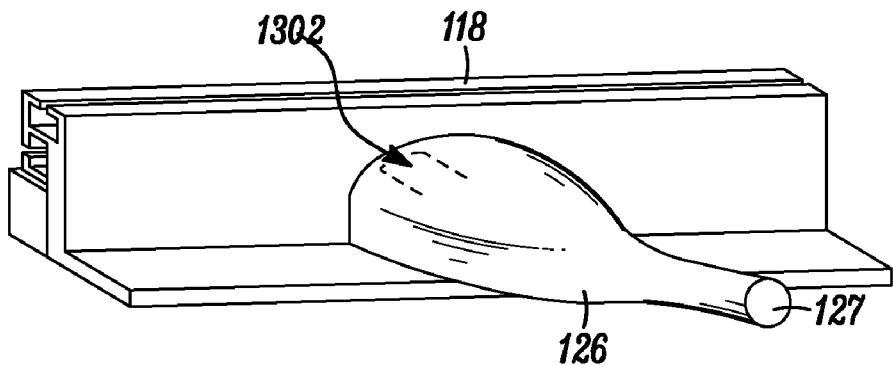
FIG. 13A is a side perspective view of a fence and fence dust collector according to an example embodiment.

FIG. 13A is a side perspective view of the fence 118 and fence dust collector 126 according to an example embodiment. The fence dust collector 126 may have a pouch-like shape and be secured to the fence 118 on an opposite side of the fence from the insert plate 116. The fence dust collector 126 may be secured to the fence 118 in a vicinity of, such as around, a fence hole 1302. The fence hole 1302 may extend through the fence 118 at a location near a center of the fence 118. The fence dust collector 126 may be secured to the fence 118 near a center of the fence 118.

The fence dust collector 126 may include a fence vacuum port 127. The fence vacuum port 127 may be attached to a vacuum hose of a vacuum (not shown in FIG. 13A).

Figure 13B:
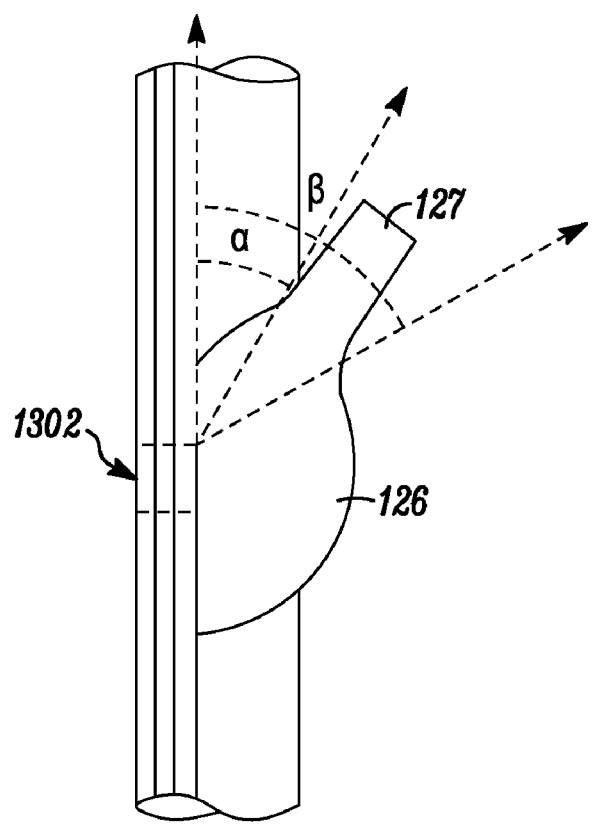
FIG. 13B is a top view of the fence and fence dust collector of FIG. 13A according to an example embodiment.

FIG. 13B is a top view of the fence 118 and fence dust collector 126 according to an example embodiment. In this example, the fence vacuum port 127 is angled between a first angle $\alpha$ of, for example, thirty degrees, and a second angle $\beta$ of, for example, sixty degrees away from the fence 118. When dust particles are ejected from the router bit 112, the dust particles may follow the angle of the fence vacuum port 127 and follow a path to a vacuum (not shown) with minimal physical resistance. This angle may be a function of the router bit 112 spinning against the workpiece.

Figure 13C:
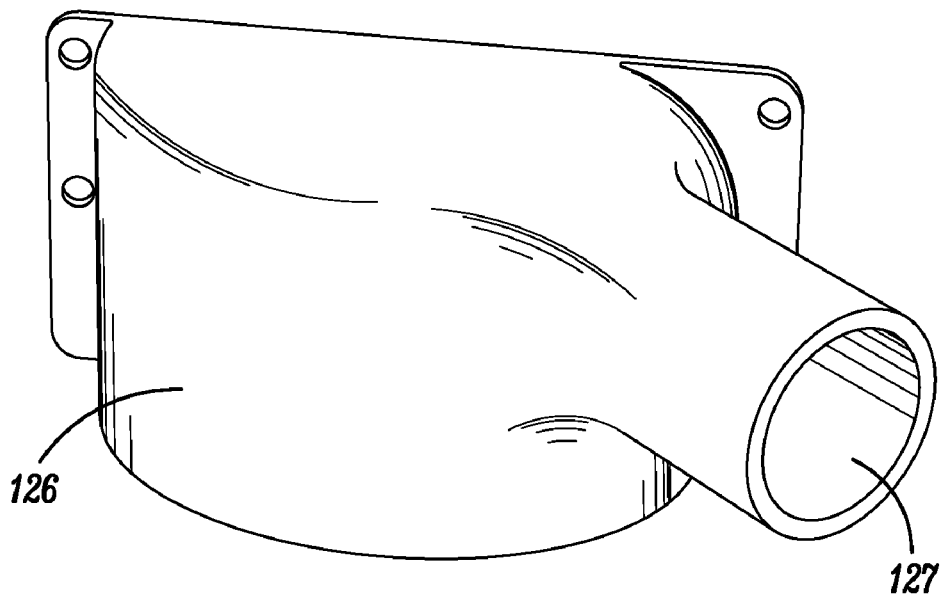
FIG. 13C is a perspective view of the fence dust collector according to an example embodiment.

FIG. 13C is a perspective view of the fence dust collector 126 according to an example embodiment. In this example, the fence vacuum port 127 extends away from the fence 118 in a direction which is parallel to a plane of the table top 102. The angle at which the fence vacuum port 127 extends away from the fence 118 may be the same as that shown in and described with reference to FIG. 13B.

Figure 13D:
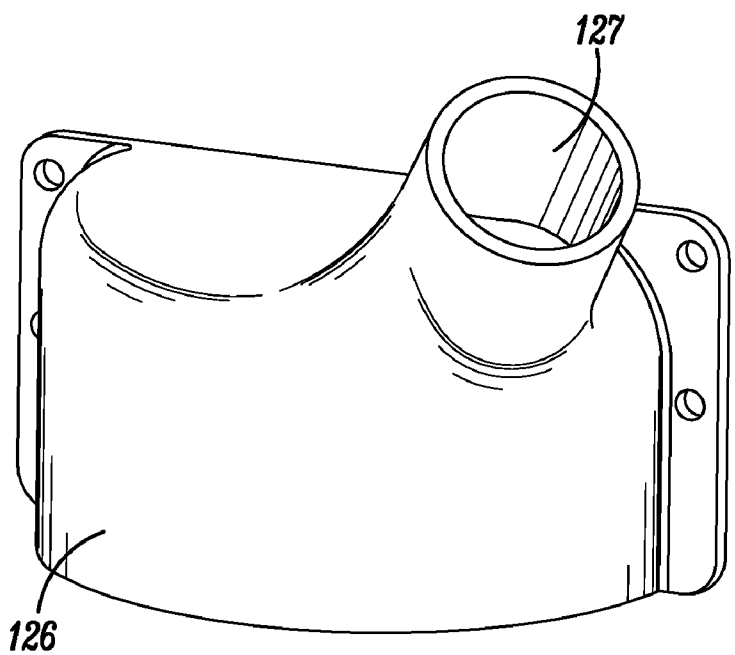
FIG. 13D is a perspective view of the fence dust collector according to another example embodiment.

FIG. 13D is a perspective view of the fence dust collector 126 according to another example embodiment. In this example, the fence vacuum port 127 extends away from both the fence 118 and the table top 102. The angle at which the fence vacuum port 127 extends away from the fence 118 may be the same as that shown in and described with reference to FIG. 13B.

FIG. 14 is a top perspective view of the table top 102 and fence 118 according to an example embodiment. The fence 118 in the example embodiment shown in FIG. 14 extends across the table top 102 in direction B. In this example, the first end portion 203a and the second end portion 203b are each secured to the table top 102 by geared mechanisms. In the example shown in FIG. 14, the table top 102 includes tracks 202 extending in direction A, to which the end portions 203a, 203b are secured. The table top 102 further includes an accessory gage slot 208 extending in direction A, which may be used to may be used to attach, position, and/or guide accessories such as, for example, a miter gauge.

The fence 118 may include an adjustment mechanism to move the fence along direction A. The adjustment mechanism may be configured to move the first end portion 203a and the second end portion 203b an equal distance with respect to the tracks 202. The adjustment mechanism may include a fence adjustment knob 120. The fence adjustment knob 120 may be configured to drive the adjustment mechanism in response to rotation of the fence adjustment knob 120.

The router table 100 may also include at least one, such as two, subfences 1402. The subfence 1402 may be secured to the fence 118 and extend in a similar direction as the fence 118, direction B. The subfence(s) 1402 may be configured to independently move toward or away from the fence 118.

Figure 15:
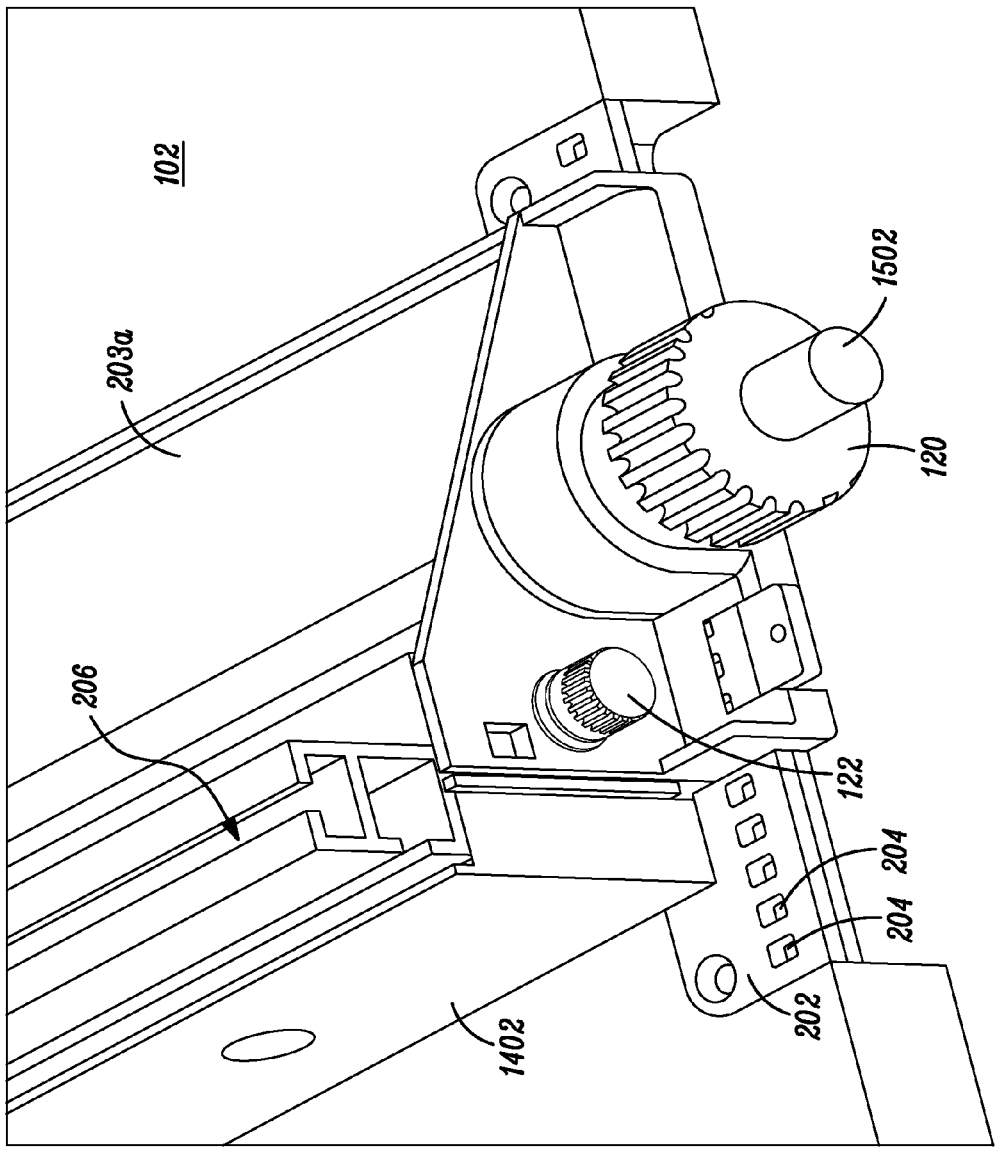
FIG. 15 is a perspective view of a first end of the fence according to an example embodiment.

FIG. 15 is a perspective view of a first end 203a of the fence 118 according to an example embodiment. This perspective view shows slots 204 of the track 202 to which a pinion (not shown) of the first end 203a may engage. This view also shows a fine fence adjustment knob 1502 which may be used for fine adjustment of the fence 118. For example, the adjustment mechanism may include gears configured to cause the fence adjustment knob 120 to rotate in response to rotation of the fine fence adjustment knob 1502 with a ratio of less than one.

The first end 203a may also include a subfence adjustment knob 122. The subfence adjustment knob 122 may be configured to cause the subfence 1402 to move toward or away from the fence 118. One example of the configuration of the subfence adjustment knob 122 and the subfence 1402 is described below with reference to FIGS. 17 and 18.

FIG. 16 is an upper side perspective view of the fence 118 according to an example embodiment. This embodiment includes components similar to the components described with reference to FIGS. 14 and 15.

Figure 17:
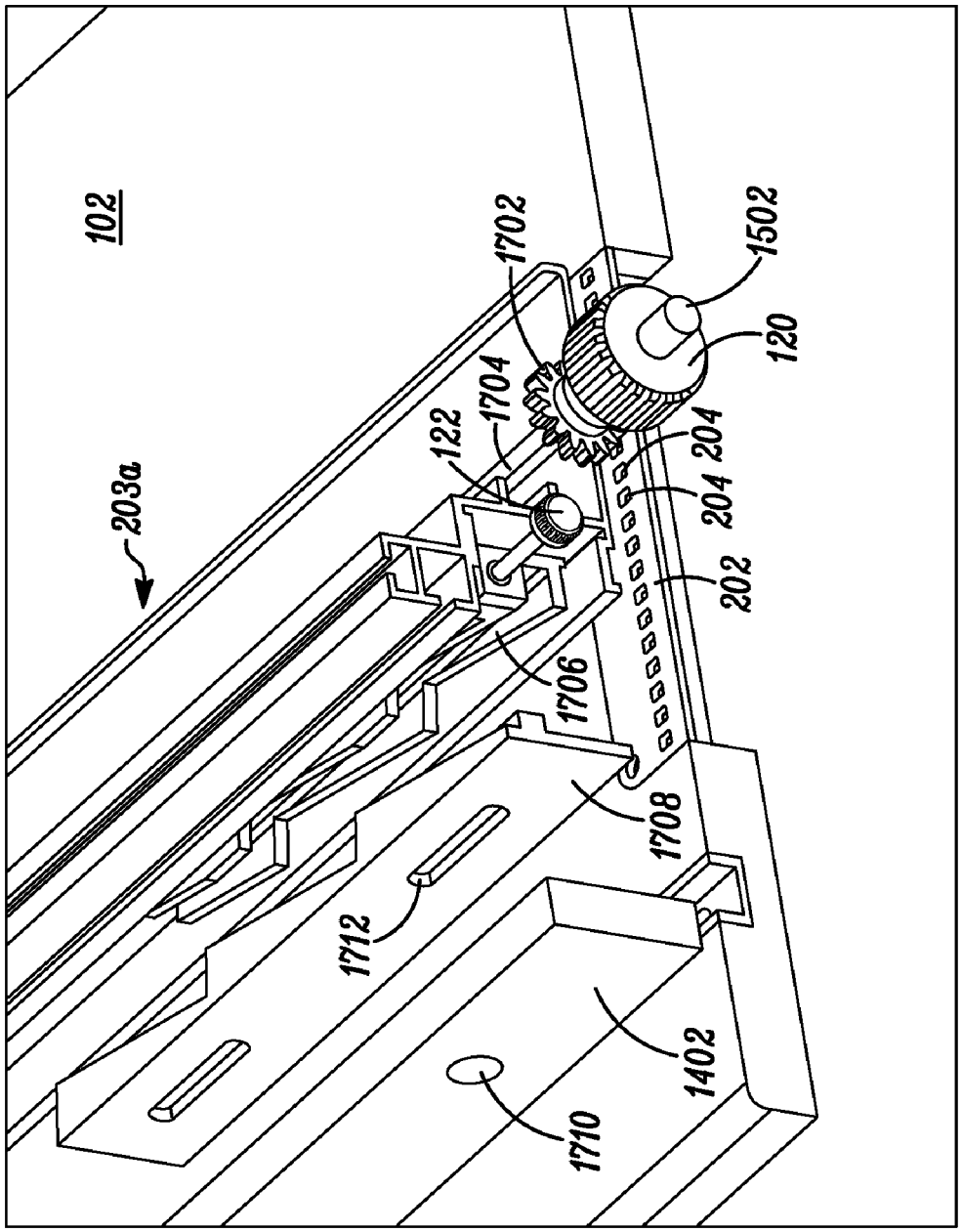
FIG. 17 is an exploded perspective view of the fence according to an example embodiment.

FIG. 17 is an exploded perspective view of the first end portion 203a of the fence 118 according to an example embodiment. In this example embodiment, the adjustment mechanism includes the fence adjustment knob 120, the fine fence adjustment knob 1502, and the track 202 and slots 204 discussed above. This example of the adjustment mechanism further includes a pinion 1702 and a driveshaft 1704. In this example, the fence adjustment knob 120 and/or the fine fence adjustment knob 1502 may drive the pinion 1702 along the track 202, causing the first end portion 203a to move in forward or reverse along the table top 102. The fence adjustment knob 120 and/or the fine fence adjustment knob 1502 may also drive the driveshaft 1704, which may in turn drive a pinion or other mechanism on the second end portion 203b (not shown) and move the second end portion 203b in forward or reverse along the table top 102. The fence adjustment knob 120 and/or the fine fence adjustment knob 1502 may drive the adjustment mechanism to cause the first end portion 203a and the second end portion 203b to move in tandem across the table top 102.

In the example embodiment shown in FIG. 17, a first ramp 1706 and a second ramp 1708 may be sandwiched between the subfence 1402 and the fence 118. The first ramp 1706 may include at least one, or a plurality of, wedges configured to mate with at least one, or a plurality of, wedges on the second ramp 1708. The subfence 1402 may include a hole 1710 shaped to receive a fastener such as a bolt (shown in FIG. 18B), and the second ramp 1708 may include a slot 1712 shaped to receive the fastener such as the bolt. The fastener may secure the subfence 1402 and second ramp 1708 to the first ramp 1706 and the fence 118.

FIG. 17.1A is a perspective view of the fence track, fence drive shaft, fence pinion and associated gears according to an example embodiment. This example shows the fence pinions 1702 mechanically coupled to each other by the fence drive shaft 1704, and the fence pinions 1702 mechanically coupled to the fence tracks 202 by meshing of the teeth of the fence pinion 1702 with the track slots 204.

In this example, the fine adjustment knob 1502 may be mechanically coupled to the fence pinion 1702 by at least three interlocking gears, such as a fine adjustment gear 1714, an intermediate gear 1716, and a pinion gear 1718. For example, the fine adjustment knob 1502 may be coupled to the fine adjustment gear 1714 by a mechanical connection which causes the fine adjustment gear 1714 to rotate at the same rate as the fine adjustment knob 1714. The fine adjustment gear 1714 may be mechanically coupled to the intermediate gear 1716 by interlocking of the teeth of the fine adjustment gear 1714 and the intermediate gear 1716. The gear ratio between the fine adjustment gear 1714 and the intermediate gear 1716 may be such that the intermediate gear 1716 undergoes less than a full rotation for each rotation of the fine adjustment gear 1714. Or, the gear ratio may allow the intermediate gear 1716 to undergo one or more rotations for each rotation of the fine adjustment gear 1714, and the intermediate gear 1716 may serve to cause the pinion gear 1718 to rotate in the same direction as the fine adjustment gear 1714.

The intermediate gear 1716 may be mechanically coupled to the pinion gear 1718 by interlocking of the teeth of the intermediate gear 1716 and the pinion gear 1718. The gear ratio between the intermediate gear 1716 and the pinion gear 1718 may be such that the pinion gear 1718 rotates less than once for each rotation of the intermediate gear 1716. The mechanical coupling between the pinion gear 1718 and the fine adjustment gear 1714 may cause the pinion gear 1718 to rotate less than once for each rotation of the fine adjustment gear 1714. Rotation of the pinion gear 1718 may cause the fence pinion 1702 to rotate, which in turn may cause the fence 118 to move across the table top 102 (not shown in FIG. 17.1A).

FIG. 17.1B is a side view of the fence pinion 1702 and associated gears 1714, 1716, 1718 according to the example embodiment shown in FIG. 17.1A. As shown in this example, the intermediate gear 1716 allows the pinion gear 1718 to rotate in the same direction as the fine adjustment gear 1714.

This may allow a user to adjust the fence 118 by rotating either the fence fine adjustment knob 1502 or the fence adjustment knob 120 (not shown in FIG. 17.1B); rotating either the fence fine adjustment knob 1502 or the fence adjustment knob 120 in a clockwise direction may cause the fence 118 to move to the right (from the perspective of the user), whereas rotating either the fence fine adjustment knob 1502 or the fence adjustment knob 120 in a counter-clockwise direction may cause the fence 118 to move to the left. By coupling the gears 1714, 1716, 1718 in such a manner that rotating the fence fine adjustment knob 1502 or fence adjustment knob 120 in the same direction causes the fence 118 to move in the same direction, the fence 118 may be easier for a user to adjust.

FIG. 17.2 is a perspective side view of a fence 118 according to an example embodiment which includes a clamp lever 1720. This example may not include an intermediate gear 1716. In this example, rotating the fence fine adjustment knob 1502 may cause the fence 118 to move in a direction opposite to that of a similar rotation of the fence adjustment knob 120 (not shown in FIG. 17.2).

The fence 118 may also include the clamp lever 1720 configured to secure the fence 118 in place by frictional engagement with an edge of the table top 102 (not shown in FIG. 17.2). The clamp lever 1720 may be hingedly attached to the fence 118 to flex along a vertical plane with respect to the table top 102, and may be mechanically coupled to a clamp lever 1720 (not shown) on the opposite side of the fence 118. The mechanical coupling between the two clamp levers 1720 may cause both clamp levers 1720 to move up or down in tandem. A user may secure the fence 118 to the table top 102 by pressing one or both clamp levers 1720 down against the table top 102, and may free the fence 118 for adjustment by pulling one or both clamp levers 1720 up and away from the table top 102.

FIG. 17.3 is a perspective view of an example embodiment of a fence 118 which includes a measurement indicator 1722. The measurement indicator 1722 may be visible through an aperture of the fence 118, according to an example embodiment. The measurement 1722 may include indicia which indicate measurements, such as numbers and markings which indicate inches or centimeters, for example.

In an example embodiment, the measurement indicator 1722 may include a tape measure secured to the table top 102. The measurement indicator 1722 may, for example, be secured to the table top 102 by fasteners, or by dovetails on each end which may slide back and forth within slots in the table top 102.

In the example shown in FIG. 17.3, the fence 118 includes the fine fence adjustment knob 1502, but not the fence adjustment knob 120. The fence 118 also may not include the intermediate gear 116. A user may make fine adjustments to the position of the fence 118 by rotating the fine fence adjustment knob 1502, and may make coarse adjustments to the position of the fence 118 by pushing or pulling on the fence 118 with his or her hands, according to an example embodiment.

FIG. 17.4 is a perspective view of the fence 118 according to another example embodiment. In this example, the fence 118 may include a single fence adjustment knob 120. In this example, the fence adjustment knob 120 may not be directly coupled to the fence drive shaft 1704 (not shown in FIG. 17.4), but may be coupled to the fence drive shaft 1704 via an adjustment knob gear 1724, a large idle gear 1726 a small idle gear 1728, and a drive shaft gear 1730. In the example shown in FIG. 17.4, the adjustment knob gear 1724 may be directly coupled to the fence adjustment knob 120, and the large idle gear 1726 may be directly coupled to the fence adjustment knob gear 1724. The large idle gear 1726 and small idle gear 1728 may be mounted on a pin 1732 which passes through the fence 118 for stability. The small idle gear 1728, which may rotate with the large idle gear 1726, may be directly coupled to the drive shaft gear 1730. The drive shaft gear 1730, fence pinion 1702, and fence drive shaft 1704 may rotate independently of the fence adjustment knob 120 and adjustment knob gear 1724. In an example embodiment, the adjustment knob gear 1724 may have a smaller radius than the large idle gear 1726, and the small idle gear 1728 may have a smaller radius than the drive shaft gear 1730, causing the fence drive shaft 1704 to rotate fewer times than the fence adjustment knob 120 according to a selected gear ratio, such as three-to-one. The fence 118 may also include measurement indicia 1734 coupled to the fence adjustment knob 120; the measurement indicia 1734 may or may not rotate independently of the fence adjustment knob 120.

Figure 18A:
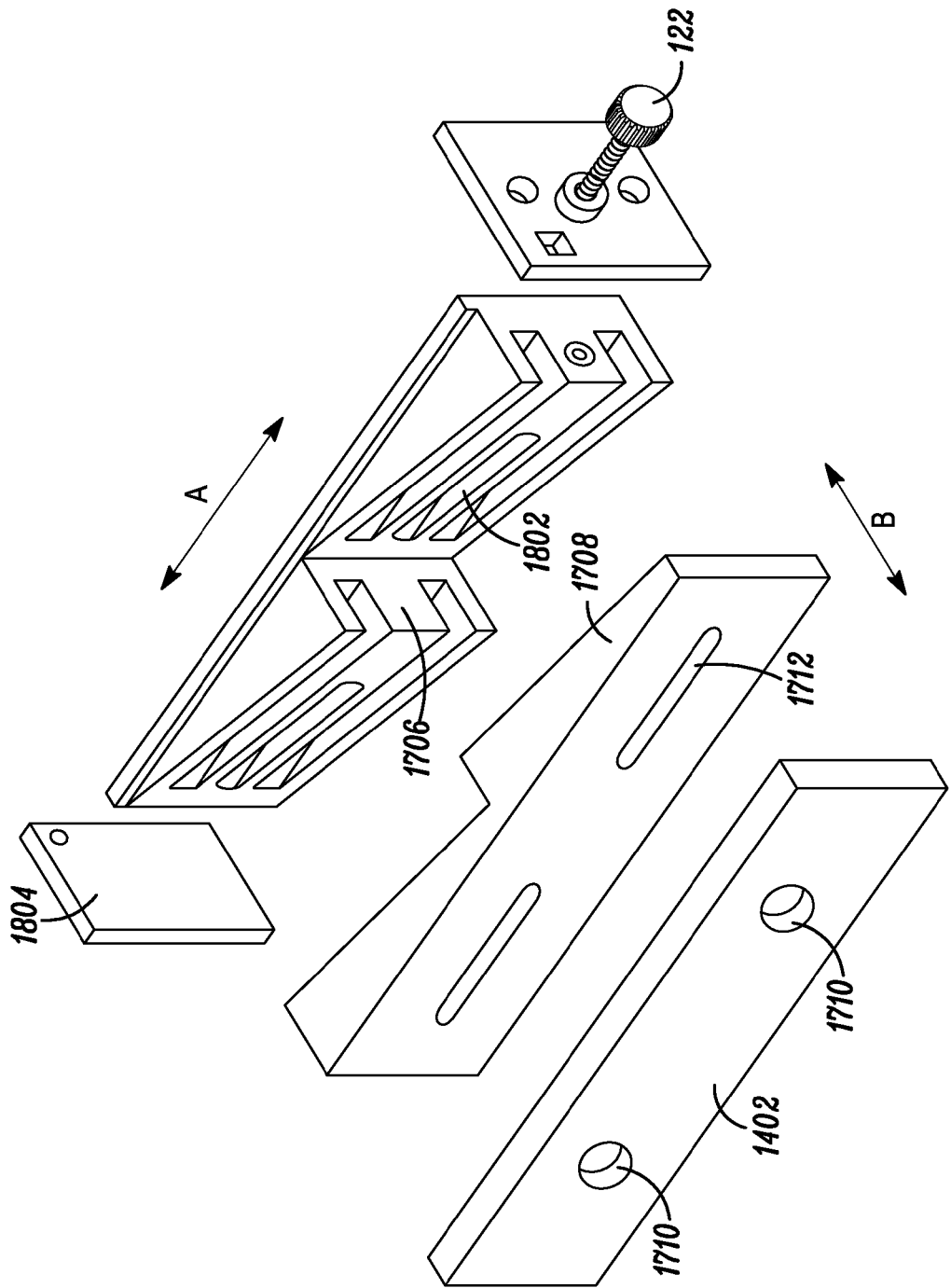
FIG. 18A is an exploded perspective view of the fence, ramps, and a subfence according to an example embodiment.

FIG. 18A is an exploded perspective view of the fence 118, ramps 1706, 1708, and the subfence 1402 according to an example embodiment. In this example embodiment, the subfence adjustment knob 122 may drive the first ramp 1706 laterally along direction A, such as by a threaded mechanism. The first ramp 1706 may include at least one, or a plurality of, slots 1802 shaped to receive the fastener which secures the subfence 1402, second ramp 1708, and first ramp 1706 to the fence 118 (not shown in FIG. 18A).

In the example shown in FIG. 18A, lateral movement of the first ramp 1706 relative to the second ramp 1708 may force the second ramp 1708 to move away from the first ramp 1706 along direction B, forcing the subfence 1402 to move away from the fence 118 along direction B. The subfence 1402 may be held toward the fence 118 by the fastener, which may be spring-loaded, or which may be rigid and require adjustment to allow movement or securement of the subfence 1402, second ramp 1708, and first fence 1706.

Figure 18B:
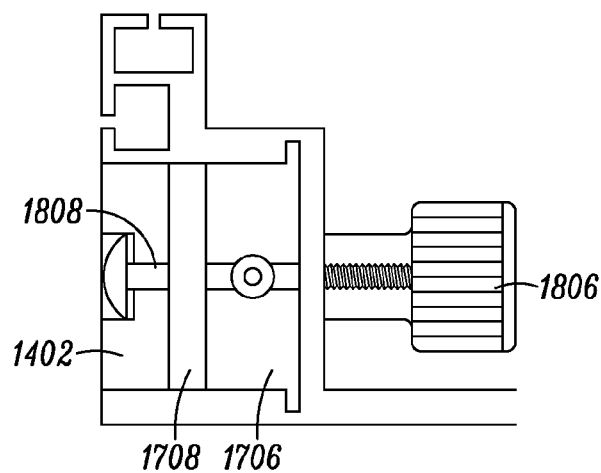
FIG. 18B is a side view of the first end of the fence according to an example embodiment.

FIG. 18B is a side view of the first end 203a of the fence 118 according to an example embodiment. This view shows a fastener head 1806 of a fastener 1808. The fastener 1808 may extend through the first ramp 1706, the second ramp 1708, and the subfence 1402, and may thereby secure the subfence 1402 to the fence 118 (not shown in FIG. 18B). The fastener head 1806 may enable a user to adjust the fastener 1808 and allow movement of the first ramp 1706, the second ramp 1708, and the subfence 1402. In some embodiments, such as where the fastener 1808 comprises a bolt, the fastener 1808 may rigidly secure the first ramp 1706, second ramp 1708, and subfence 1402, and adjustment to the fastener 1808 may be required to adjust these components. In other embodiments, such as where the fastener 1808 comprises a spring-loaded mechanism, a user may adjust the first ramp 1706, second ramp 1708, and subfence 1402, without manually adjusting the fastener 1808.

Figure 18C:
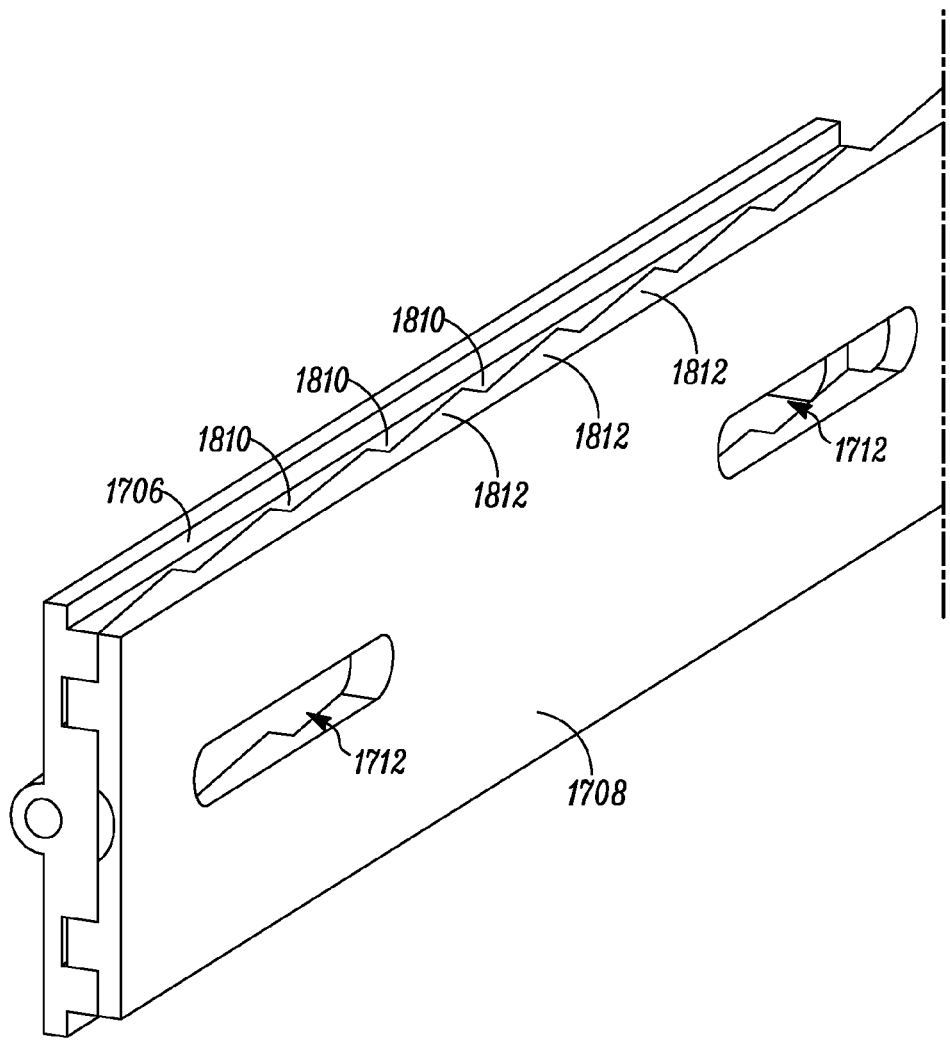
FIG. 18C is a perspective view of the first ramp and second ramp according to another example embodiment.

FIG. 18C is a perspective view of the first ramp 1706 and second ramp 1708 according to another example embodiment. In this example, the first ramp 1706 includes a plurality of teeth or first ramp wedges 1810, and the second ramp 1708 includes a plurality of teeth or second ramp wedges 1812 which are configured to mate with the first ramp wedges 1810. The plurality of first ramp wedges 1810 and second ramp wedges 1812 may enable finer adjustment of the subfence 1402 (not shown in FIG. 18C), according to an example embodiment. In the example shown in FIG. 18C, the second ramp 1708 may include a slot 1712 shaped to receive the fastener such as the bolt; although not shown, the first ramp 1706 may also include the at least one, or a plurality of, slots 1802 shaped to receive the fastener which secures the subfence 1402, second ramp 1708, and first ramp 1706 to the fence 118.

Figure 19:
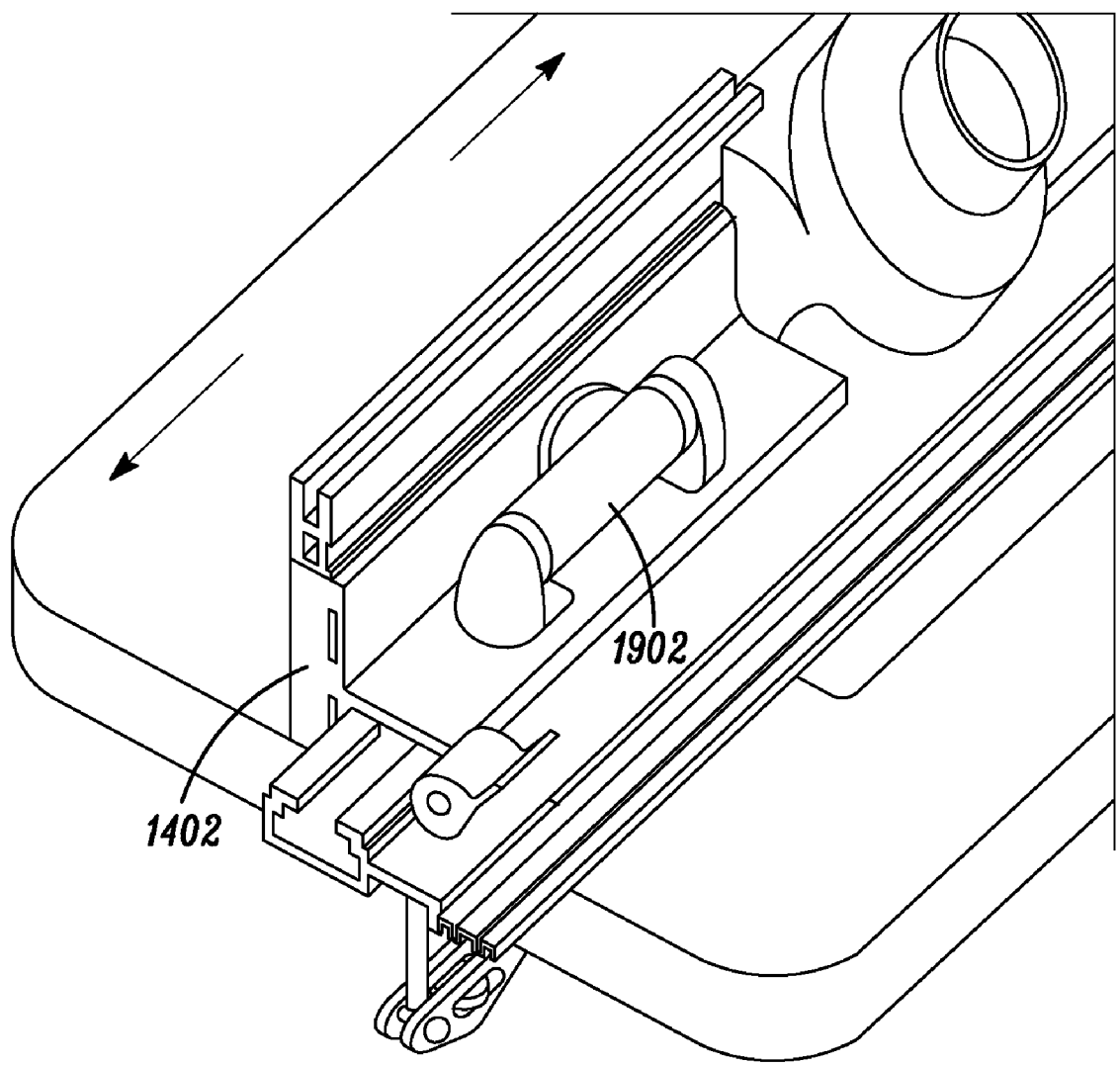
FIG. 19 is an upper side perspective view of the first end of the fence showing a clamp according to an example embodiment.

FIG. 19 is an upper side perspective view of the first end 203a of the fence 118 showing a clamp 1902 version of the fastener 1808 according to an example embodiment. In this embodiment, a user may press on the clamp 1902 to enable movement of the subfence 1402.

Figure 20:
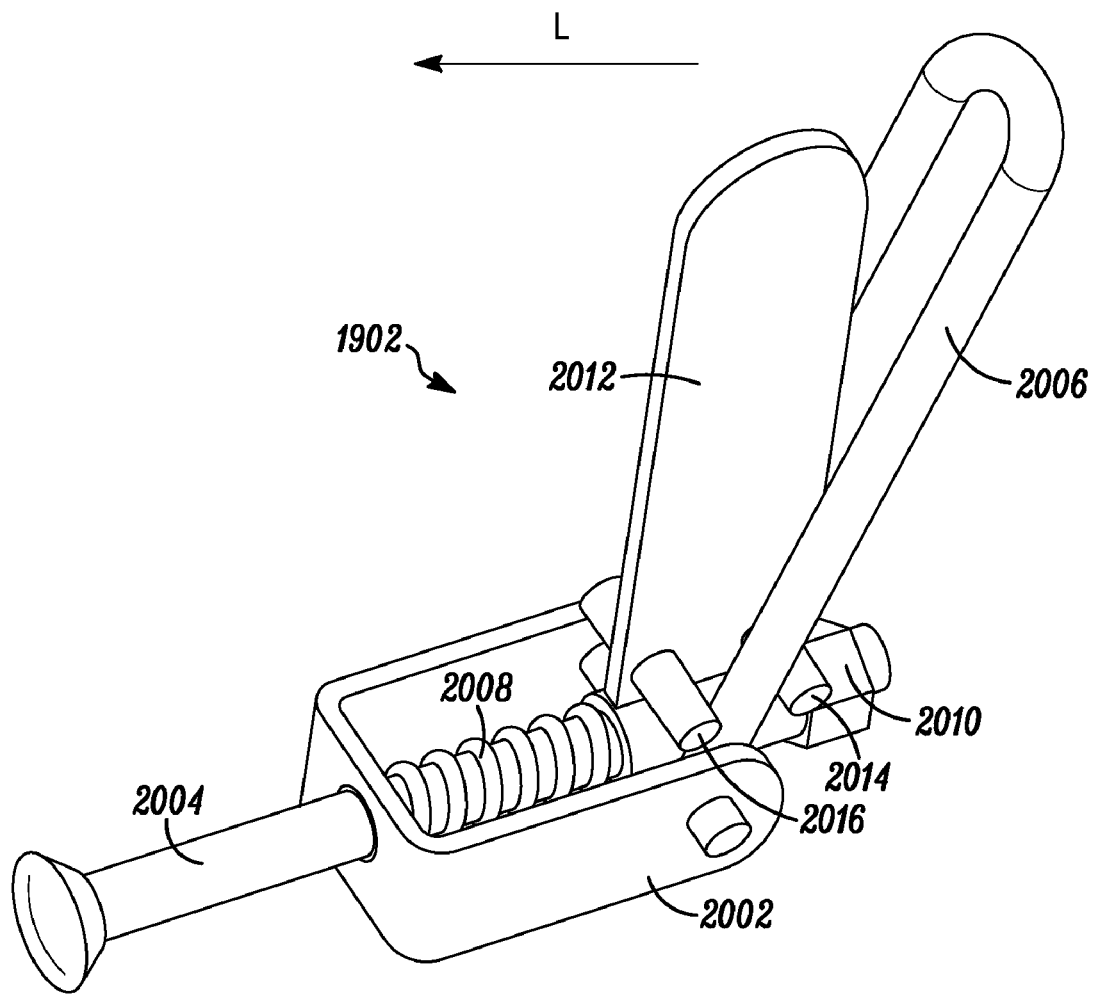
FIG. 20 is a perspective view of a clamp according to an example embodiment.

FIG. 20 is a perspective view of the clamp 1902 according to an example embodiment. In this example, the clamp 1902 may include a housing 2002. The housing 2002 may be made of a rigid material, and may be u-shaped with either rounded or angled corners. A fastener 2004 such as a bolt may extend through the housing 2002. The fastener 2004 may be configured to secure the first ramp 1706, second ramp 1708, and subfence 1402 to the fence 118. The clamp 1902 may include a lever 2006 pivotally attached to the housing 2002. The clamp 1902 may also include a coil 2008 or spring wrapped around a portion of the fastener 2004 which is inside the housing 2002. The fastener 2004 may include a nut 2010, head, or extrusion at one or both ends to prevent objects from sliding off of or away from the fastener 2004.

The clamp 1902 may include a fulcrum support 2012 receiving the fastener 2004. The fulcrum support 2012 may be located between the coil 2008 and the nut 2010. The nut 2010 may prevent the fulcrum support 2012 from sliding off of the fastener 2004, and the coil 2008 may press the fulcrum support 2012 away from the housing 2002.

The fulcrum support 2012 may include a first fulcrum 2014 and a second fulcrum 2016, each extending from the fulcrum support 2012. The lever 2006 may be located between the first fulcrum 2014 and the second fulcrum 2016. The first fulcrum 2014 may be positioned on the fulcrum support 2012 farther from the coil 2008 than the second fulcrum 2016.

The first fulcrum 2014 may prevent the lever 2006 from falling backward. The second fulcrum 2016 may enable the lever 2006 to move forward along the fastener 2004 against the coil 2008. When a user presses the lever 2006 in direction 'L', the lever 2006 may rotate about the housing 2002, press against the second fulcrum 2016, and force the fulcrum support 2012 forward against the coil 2008. This may allow the fastener 2004 to move in direction L relative to the housing, loosening the securement of the first ramp 1706, second ramp 1708, and subfence 1402, in an example implementation.

Figure 21:
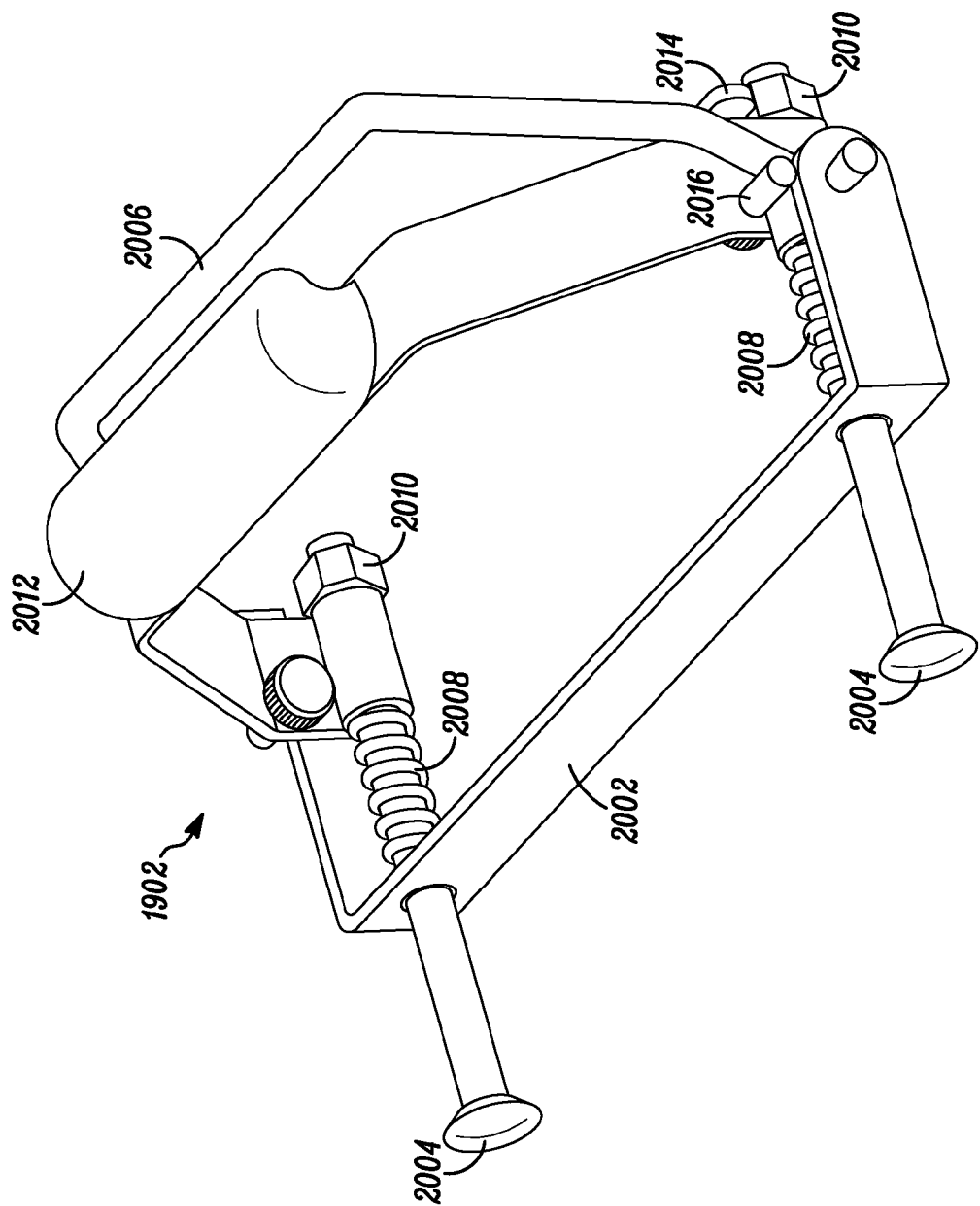
FIG. 21 is a perspective view of an alternative example embodiment of the clamp of FIG. 20.

FIG. 21 is a perspective view of an alternative example embodiment of a clamp 1902. In this example embodiment, the clamp 1902 includes a plurality of fasteners 2004, a plurality of coils 2008, and a plurality of nuts 2010. The components and functionalities of the clamp 1902 shown in FIG. 21 are similar to the components and functionalities of the clamp 1902 shown in FIG. 20.

FIG. 21.1 is a perspective view of another alternative example embodiment of the clamp 1902 of FIGS. 20 and 21. In this example embodiment, the clamp 1902 may include a handle 2102 hingedly attached to a sliding block 2104 of the clamp 1902. The sliding block 2104 may be configured to slide laterally within a groove 2105 extending along the fence to allow adjustment of the subfence 1402, as discussed above.

The handle 2102 may be configured to swing in a first direction, such as down relative to the table top 102 (not shown), to lock the subfence 1402 in position, and to swing in a second direction, such as up relative to the table top 102, to unlock the subfence 1402. The clamp 1902 may include trunnions 2106 located in cavities of the handle 2102; the trunnions 2106 may be configured to pull T-bolts 2108 (shown in FIG. 21.2) toward the handle 2102 when the handle 2102 is pushed down, which T-bolts 2108 in turn may pull the subfence 1402 toward the handle 2102, locking the subfence 1402 against the fence 118. In an example embodiment, the trunnions 2106 may be eccentrically shaped, and/or may include eccentric pivot drawbolts configured to lock the handle 2102 in the down position with the subfence 1402 locked against the fence 118. The cavities of the handle 2102 may also include springs configured to hold the handle 2102 in an elevated position when the handle 2102 has not been pushed down into the locked position. The cavities may also include adjustment nuts which may be configured to adjust the position of the T-bolts 2108 with respect to the handle 2102.

FIG. 21.2 is another perspective view of the example embodiment of the clamp 1902 shown in FIG. 21.1. This view shows the T-bolts 2108 extending through the fence 118; the T-bolts 2108 may be secured to the subfence 1402, such as by a ball-and-socket joint.

FIG. 21.3 is a perspective view showing the fence 118 according to an example embodiment. In this example, the fence 118 may include slots 2110 configured to receive the T-bolts 2108 shown in FIG. 21.2. The slots 2110 may correspond to the first ramp slot 1802 and the second ramp slot 1712. The subfence 1402 may include flanges 2112 configured to receive the T-bolts 2108. The flanges 2112 may be configured to allow the T-bolts 2108 to secure the 1402 to the fence 118. The slots 2110 may be configured, in conjunction with the T-bolts 2108, to prevent the two subfences 1402 from touching in the middle of the fence 118, according to an example embodiment.

Figure 22A:
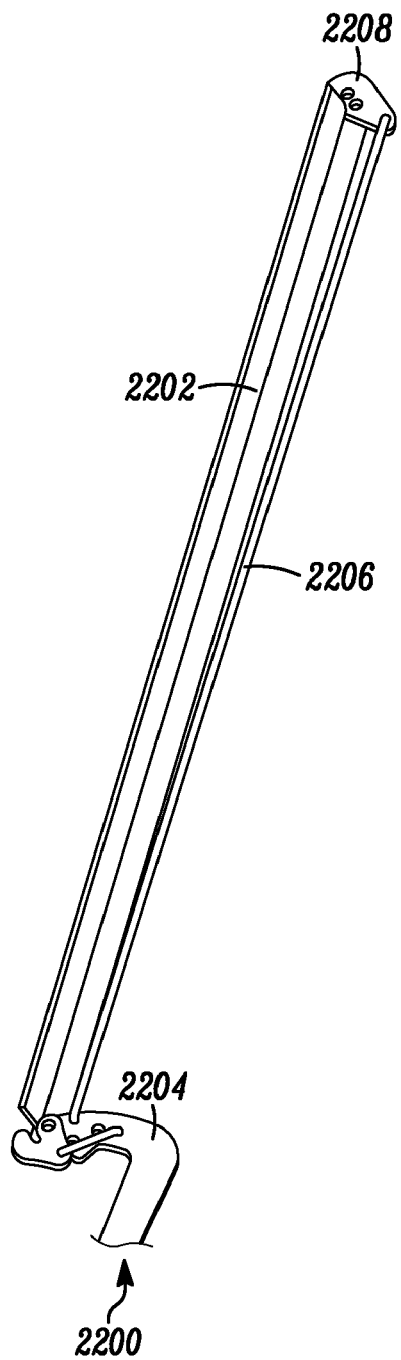
FIGS. 22A and 22B are perspective views of a fastener according to an example embodiment.
Figure 22B:
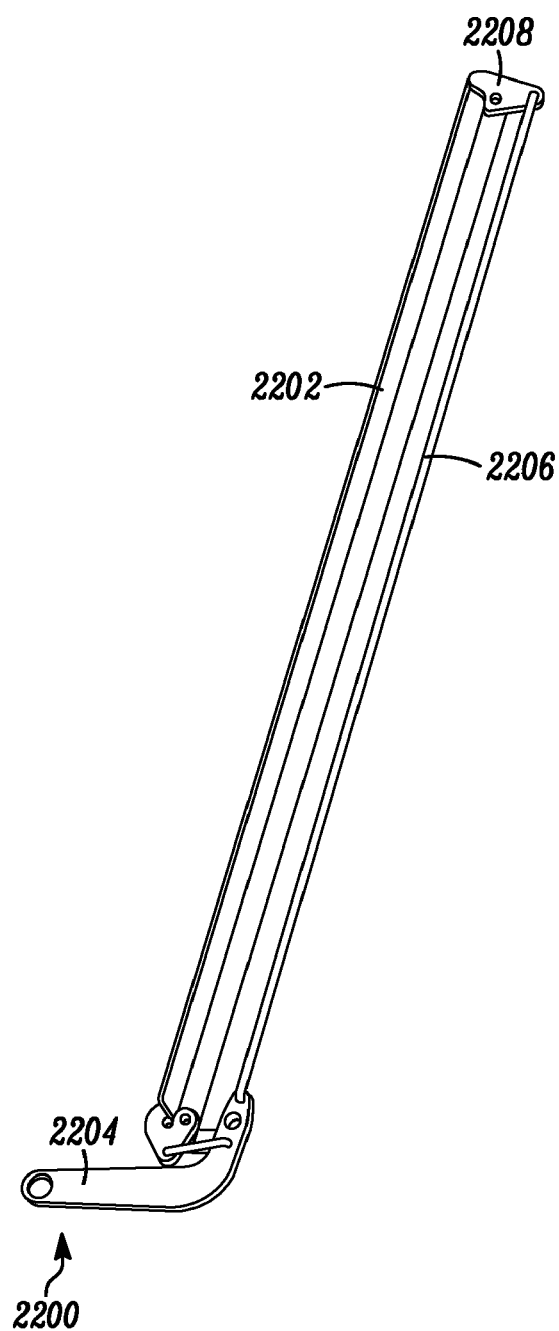

FIGS. 22A and 22B are perspective views of a fastener 2200 according to an example embodiment. The fastener 2200 shown in FIGS. 22A and 22B may, in an example implementation, be used as the fastener 1808 which secures the first ramp 1706, second ramp 1708, and subfence 1402 to the fence 118.

The fastener 2200 may include a shaft 2102 and a handle 2104 pivotally connected to the shaft 2102. The shaft 2102 may be an elongated member made of a rigid material. The handle 2104 may have a first, longer end, adapted to be gripped by a user, and a shorter end attached to a cord 2106. The cord 2106 may, in an example embodiment, be made of an elastic material. The cord 2106 may be attached to the handle 2104 at a first end and to a support 2108 at a second end. The support 2108 may be located at an end of the shaft 2102 opposite from the handle 2104. Pivoting the handle 2104 may change the distance between the location on the handle 2104 at which the cord 2106 is attached and the support 2108. Thus, pivoting the handle 2104 may tighten or loosen the cord 2106.

Figure 23:
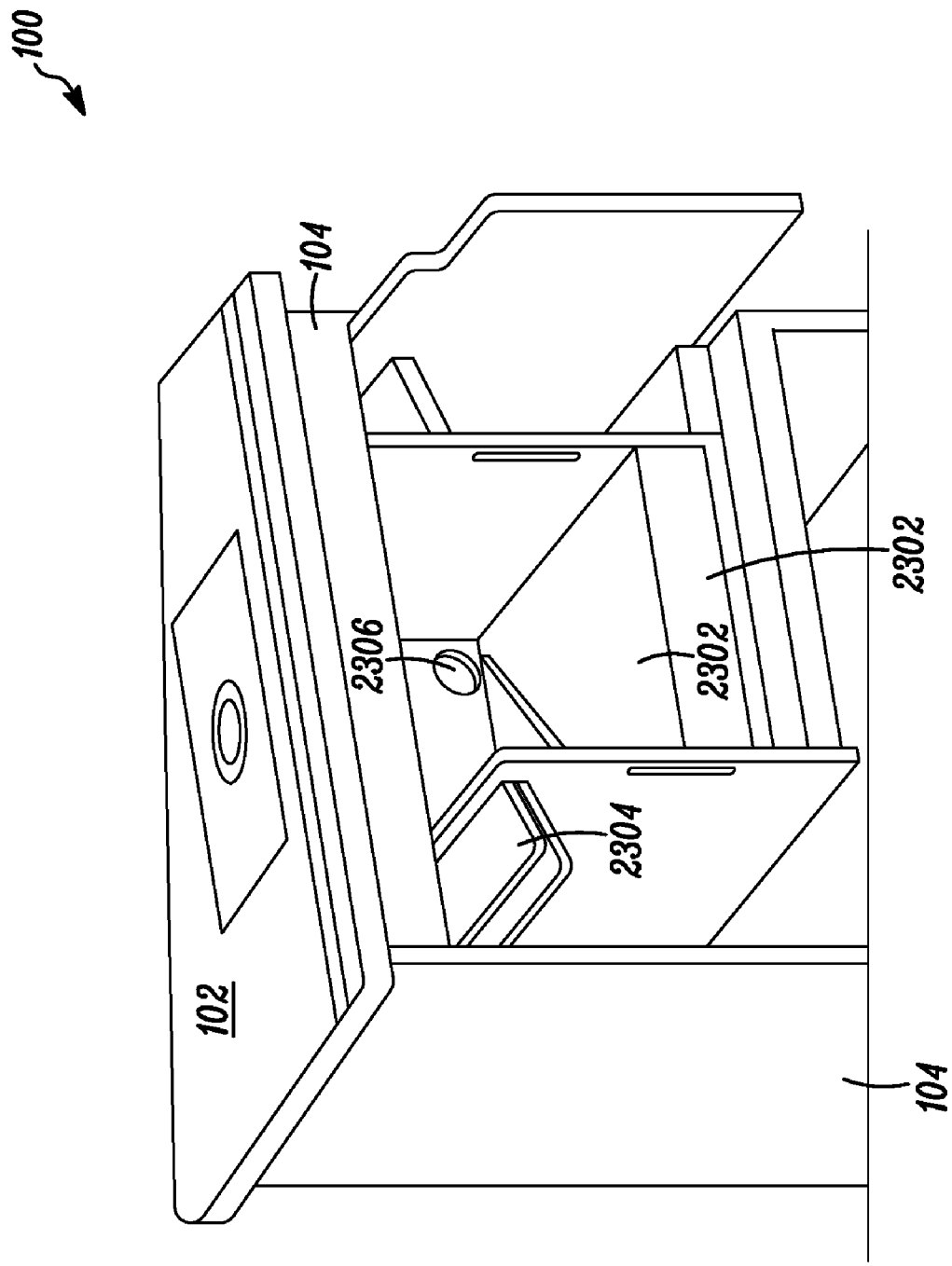
FIG. 23 is a perspective view of a router table according to an example embodiment.

FIG. 23 is a perspective view of a router table 100 according to an example embodiment. In this example, the router table 100 may include at least one, such as a plurality of, shelves 2302. The shelves 2302 may lie in a plane substantially parallel to the table top 102, and may be supported by the support members 104. In an example embodiment, the shelves 2302 may be supported by the support members 104 by attachment to the support members 104 or by connection to a member which is attached to the support members 104. In another example embodiment, the shelves 2302 may be supported by a member which is attached to the table top 102.

The router table 100 may also include inserts 2304. The inserts 2304 may be grooves or recesses on a member located between the support members 104. The member on which the inserts 2304 are located may be connected to the shelves 2302 or to a member(s) attached to the shelves 2302, or to the table top 102 or to a member(s) attached to the table top 102. The inserts 2304 may used to store tools, such as a bit or a wrench, which may be useful in performing routing operations.

At least one of the support members 104 may include an aperture 2306. The aperture 2306 may allow a vacuum tube to extend from outside the router table 100 to the mounting can vacuum port 128.

Figure 24:
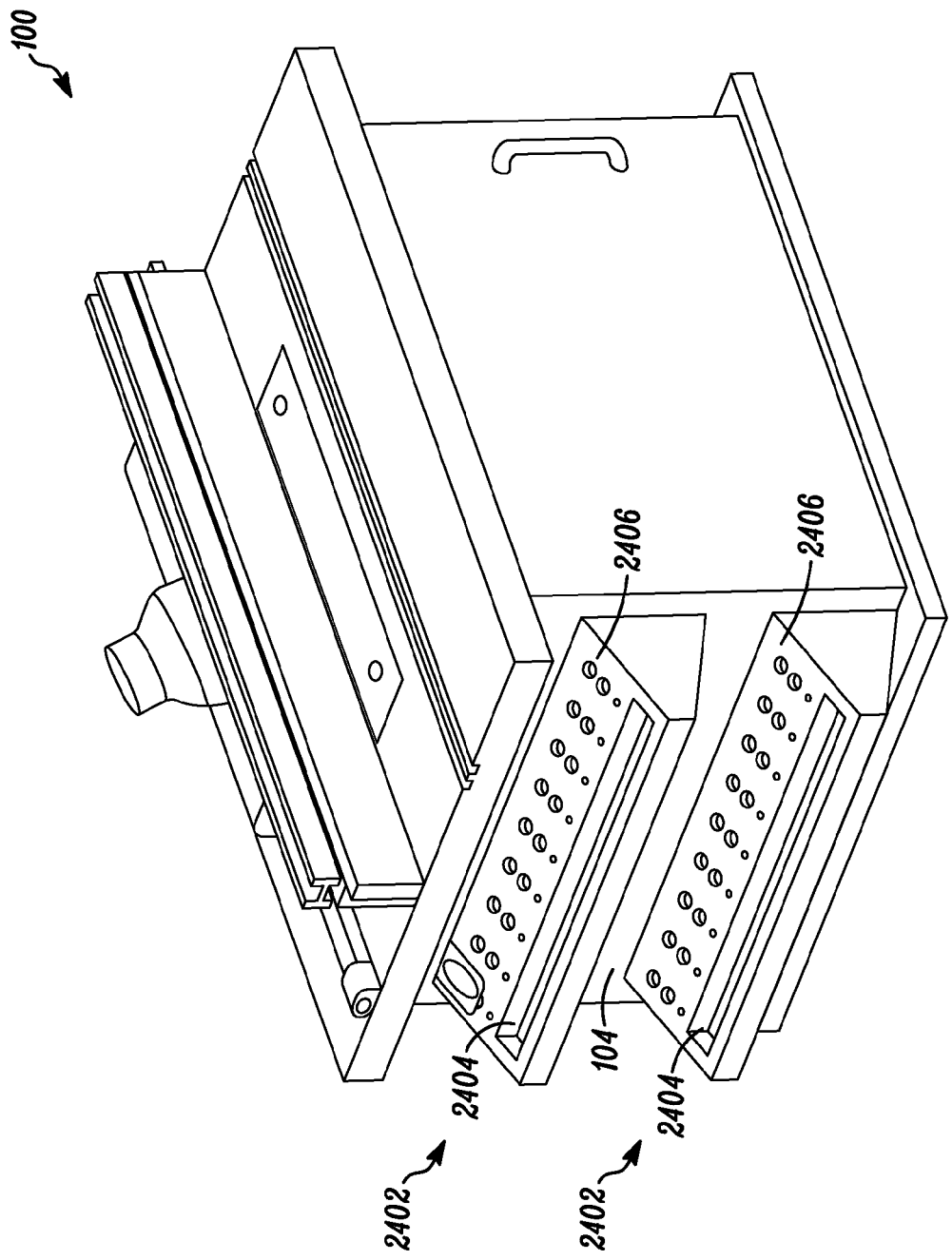
FIG. 24 is a perspective view of a router table according to another example embodiment.

FIG. 24 is a perspective view of a router table 100 according to another example embodiment. In this embodiment, the router table 100 includes one or more side shelves 2402. The side shelves 2402 may extend from one or more support members 104. The side shelves 2402 may include one or more shelf slots 2404 and/or one or more shelf recesses 2406. The shelf slots 2404 and shelf recesses 2406 may be used for storing tools, such as a bit or a wrench.

FIGS. 24.1 and 24.2 are perspective views of a router table 100 according to another example embodiment.

Figure 25A:
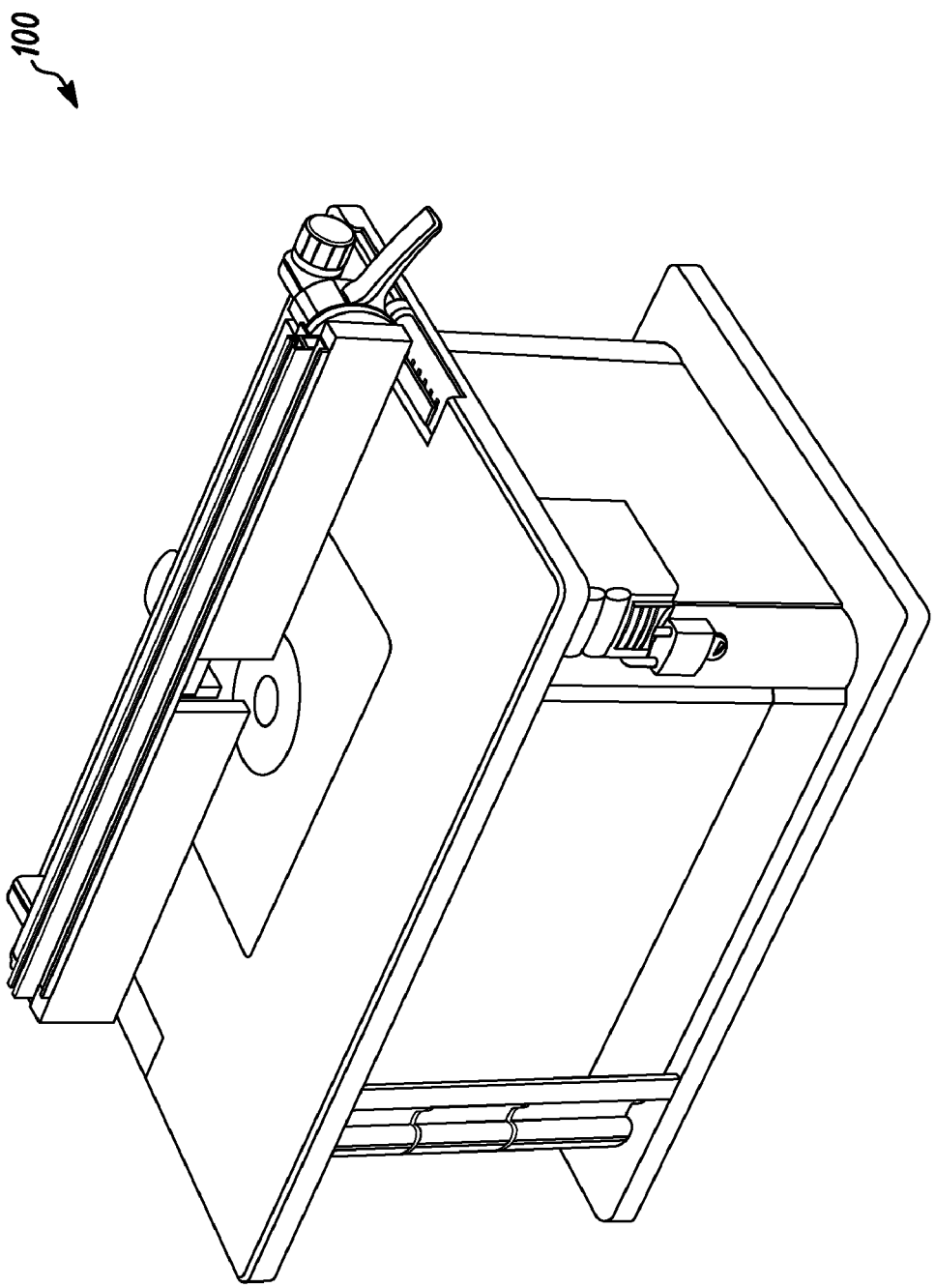
FIG. 25A is a perspective view of the router table according to another example embodiment.
Figure 25B:
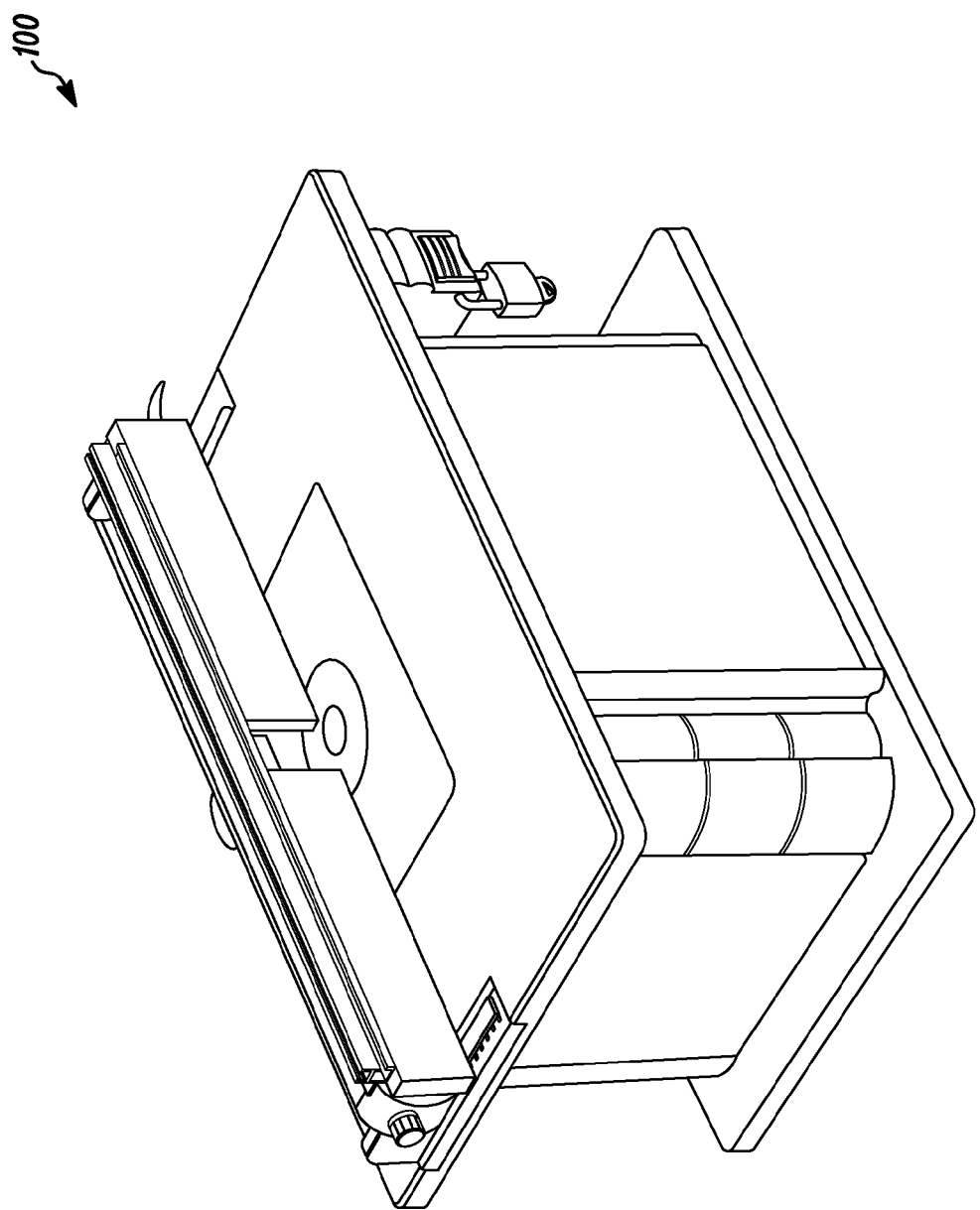
FIG. 25B is another perspective view of the router table according to the example embodiment shown in FIG. 25A.

FIG. 25A is a perspective view of the router table 100 according to another example embodiment. FIG. 25B is another perspective view of the router table 100 according to the example embodiment shown in FIG. 24A While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A router table comprising:
a table top having an aperture and a plurality of support members, the support members being configured to support the table top;
a fence extending across the table top in a first direction, the fence including a first end portion engaged to a first portion of the table top by a first gear mechanism and a second end portion engaged to a second portion of the table top by a second gear mechanism, the first gear mechanism and the second gear mechanism being coupled to each other by a driveshaft;
an adjustment mechanism configured to drive at least one of the first gear mechanism, the second gear mechanism, and the driveshaft;
at least one subfence extending across a portion of the table top in the first direction and configured to move toward or away from the fence; and
at least two ramps located between the fence and the at least one subfence with each of the ramps including wedges, wherein the wedges of one of the ramps are configured to mate with the wedges of the other ramp.

2. The router table of claim 1, wherein the first gear mechanism and the second gear mechanism comprise rack and pinion mechanisms.

3. The router table of claim 1, wherein the table top further includes an accessory gage slot.

4. The router table of claim 1, wherein the adjustment mechanism is configured to move the first end portion and the second end portion an equal distance.

5. The router table of claim 1, wherein:
the at least one subfence is configured to receive a fastener;
the fence includes a slot configured to receive the fastener; and
the at least one subfence is secured to the fence by the fastener.

6. The router table of claim 1, wherein:
the adjustment mechanism includes a fence adjustment knob and a fine fence adjustment knob; and
the adjustment mechanism is configured to cause the fence to move a first distance per rotation of the fence adjustment knob rotation and a second distance per rotation of the fine fence adjustment knob, the second distance being less than the first distance.

7. The router table of claim 1, wherein the first end portion of the fence is engaged to a first track of the table top by the first gear mechanism and the second end portion of the fence is engaged to a second track of the table top by the second gear mechanism.

8. The router table of claim 1, wherein the adjustment mechanism includes at least one knob coupled to the drive shaft by interlocking gears.

9. The router table of claim 1, further comprising a clamp lever configured to secure the fence in place by frictional engagement with the table top.

10. The router table of claim 1, wherein the fence includes a measurement indicator.

11. A router table comprising:
a table top having an aperture and a plurality of support members, the support members being configured to support the table top;
a fence extending across the table top;
an adjustment mechanism including a first knob and a second knob, the first knob being configured to cause the fence to move a first distance across the table top per rotation of the first knob and the second knob being configured to cause the fence to move a second distance across the table top per rotation of the second knob;
at least one subfence extending in a direction substantially parallel to the fence and configured to move toward or away from the fence; and
at least two ramps located between the fence and the at least one subfence with each of the ramps including wedges, wherein the wedges of one of the ramps are configured to mate with the wedges of the other ramp.

12. The router table of claim 11, wherein the adjustment mechanism is configured to move the fence toward or away from the aperture.

13. The router table of claim 11, wherein the at least one subfence includes independently adjustable subfences.

14. The router table of claim 11, further comprising:
at least two tracks;
wherein the adjustment mechanism is configured to cause two end portions of the fence to move along the at least two tracks in tandem.

15. The router table of claim 11, further comprising a vacuum port extending through a hole in the fence.

16. The router table of claim 11, further comprising:
a mounting can attachable to the table top in a vicinity of the aperture; and
a sleeve engaged to the mounting can, the sleeve being configured to receive a router and to position a router bit of the router along an axis extending through the aperture.

17. The router table of claim 1,
wherein the at least two ramps and the at least one subfence are secured to the fence by a fastener.

18. The router table of claim 11, wherein the aperture is a circular aperture.

19. The router table of claim 1, wherein the aperture is a circular aperture.

* * * * *

UNITED STATES PATENT AND TRADEMARK OFFICE
CERTIFICATE OF CORRECTION

| | | |
|---|---|---|
| PATENT NO. | : 7,921,888 B2 | Page 1 of 1 |
| APPLICATION NO. | : 12/027109 | |
| DATED | : April 12, 2011 | |
| INVENTOR(S) | : Thomas Sommerville et al. | |

It is certified that error appears in the above-identified patent and that said Letters Patent is hereby corrected as shown below:

In column 23, line 46, in claim 1, after "across" delete "a portion of".

Signed and Sealed this
Twenty-eighth Day of June, 2011

David J. Kappos
*Director of the United States Patent and Trademark Office*